(12) United States Patent
Kumasaka et al.

(10) Patent No.: US 12,066,811 B2
(45) Date of Patent: Aug. 20, 2024

(54) MACHINE TOOL, INPUT ASSISTANCE METHOD FOR MACHINE TOOL, AND NON-TRANSITORY COMPUTER-READABLE STORAGE MEDIUM

(71) Applicant: Yamazaki Mazak Corporation, Niwa-gun (JP)

(72) Inventors: Takuya Kumasaka, Niwa-gun (JP); Yuuki Yamamoto, Niwa-gun (JP); Takuro Katayama, Niwa-gun (JP); Morikuni Kimura, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 186 days.

(21) Appl. No.: 17/393,410

(22) Filed: Aug. 4, 2021

(65) Prior Publication Data
US 2021/0365005 A1   Nov. 25, 2021

Related U.S. Application Data

(63) Continuation of application No. PCT/JP2019/028860, filed on Jul. 23, 2019.

(51) Int. Cl.
*G05B 19/4093* (2006.01)
*G05B 19/18* (2006.01)
(Continued)

(52) U.S. Cl.
CPC ..... *G05B 19/40938* (2013.01); *G05B 19/182* (2013.01); *G05B 19/4063* (2013.01);
(Continued)

(58) Field of Classification Search
None
See application file for complete search history.

(56) References Cited

U.S. PATENT DOCUMENTS

| 7,577,492 B2 * | 8/2009 | Kamiya ............. G05B 19/4093 700/83 |
| 10,689,128 B2 * | 6/2020 | Conaway ............... G06Q 50/40 |

(Continued)

FOREIGN PATENT DOCUMENTS

| CN | 101796463 | 8/2010 |
| CN | 104768706 | 7/2015 |

(Continued)

OTHER PUBLICATIONS

The International Preliminary Report on Patentability (Chapter I) with translation of Written Opinion for corresponding International Application No. PCT/JP2019/028860, Feb. 3, 2022.
(Continued)

*Primary Examiner* — Carlos R Ortiz Rodriguez
(74) *Attorney, Agent, or Firm* — MORI & WARD, LLP

(57) ABSTRACT

An input assistance method includes: a plurality of steps in which setting-information based on which the machine tool is configured to be controlled to machine a workpiece so as to make a product is input. A setting step in which a selected information is to be input is selected among the plurality of steps. The selected information of the plurality of steps constitutes the setting-information. A setting interface via which the selected information is input is displayed. Whether inputting the selected information has been completed is determined. Information indicating that inputting the selected information has been completed is displayed, when inputting the selected information is determined to have been completed. The plurality of steps includes a first step in which a shape of the product is input and a second step in which a shape of the workpiece and a material of the workpiece are input.

24 Claims, 25 Drawing Sheets

(51) Int. Cl.
    *G05B 19/4063*     (2006.01)
    *G05B 19/4099*     (2006.01)

(52) U.S. Cl.
    CPC . *G05B 19/40933* (2013.01); *G05B 19/40935* (2013.01); *G05B 19/4099* (2013.01)

(56) References Cited

U.S. PATENT DOCUMENTS

| | | | |
|---|---|---|---|
| 2001/0012021 | A1 | 8/2001 | Nishiyama et al. |
| 2010/0305745 | A1 | 12/2010 | Iriguchi et al. |
| 2014/0025192 | A1 | 1/2014 | Seya et al. |
| 2015/0293524 | A1 | 10/2015 | Sato et al. |
| 2016/0011583 | A1 | 1/2016 | Matsubara et al. |
| 2016/0096171 | A1 | 4/2016 | Michida |

FOREIGN PATENT DOCUMENTS

| | | |
|---|---|---|
| CN | 105103066 | 11/2015 |
| EP | 3147736 | 3/2017 |
| JP | 4044169 B2 | 9/1998 |
| JP | 2000-126937 | 5/2000 |
| JP | 2000-284819 | 10/2000 |
| JP | 2002-073128 | 3/2002 |
| JP | 2003-022110 | 1/2003 |
| JP | 2013-069166 | 4/2013 |
| JP | 2014-021648 | 2/2014 |
| JP | 2018-112894 | 7/2018 |
| WO | WO 2015/029414 | 3/2015 |

OTHER PUBLICATIONS

International Search Report for corresponding International Application No. PCT/JP2019/028860 Oct. 21, 2019.
Written Opinion for corresponding International Application No. PCT/JP2019/028860 Oct. 21, 2019.
Supplementary European Search Report for corresponding EP Application No. 19938209.4-1202, Aug. 18, 2021.
European Office Action for corresponding EP Application No. 19938209.4-1202, Sep. 13, 2021.
Chinese Office Action for corresponding CN Application No. 201980082664.8, Jul. 12, 2023.
European Office Action for corresponding EP Application No. 19938209.4-1202, Jun. 15, 2023.
Chinese Office Action for corresponding CN Application No. 201980082664.8, Feb. 28, 2024.

\* cited by examiner

MACHINE TOOL, INPUT ASSISTANCE METHOD FOR MACHINE TOOL, AND NON-TRANSITORY COMPUTER-READABLE STORAGE MEDIUM

CROSS-REFERENCE TO RELATED APPLICATIONS

The present application is a continuation application of International Application No. PCT/JP2019/028860, filed Jul. 23, 2019. The contents of this application are incorporated herein by reference in their entirety.

BACKGROUND OF THE INVENTION

Field of the Invention

The present invention relates to a machine tool, an input assistance method for a machine tool, and a non-transitory computer-readable storage.

Discussion of the Background

JP4044169B discloses a method for displaying an information setting screen in a numerical controller. When a user generates a program for machining a product, the method includes asking the user to input information necessary in each of machining processes.

SUMMARY OF THE INVENTION

According to one aspect of the present disclosure, an input assistance method for a machine tool includes displaying a plurality of steps in which setting-information based on which the machine tool is configured to be controlled to machine a workpiece so as to make a product. The plurality of steps include a first step, a second step, a third step, and a fourth step. In the first step, a shape of the product is input. In the second step, a shape of the workpiece and a material of the workpiece are input. In the third step, information regarding how to contain an entirety of the product in the workpiece is input. In the fourth step, a holding portion of the workpiece which is to be held by the machine tool is input. A setting step in which a selected information is to be input is selected among the plurality of steps. The selected information of the plurality of steps constitutes the setting information. A setting interface via which the selected information is input. Whether inputting the selected information has been completed is determined. When the selected information is determined to have been completed, information indicating that inputting the selected information has been completed is displayed.

According to another aspect of the present disclosure, a machine tool includes a display and a processor. The display is configured to display a plurality of steps and a setting interface. In the plurality of steps, setting-information based on which the machine tool is configured to be controlled to machine a workpiece so as to make a product is input. The plurality of steps include a first step, a second step, a third step, and a fourth step. In the first step, a shape of the product is input. In the second step, a shape of the workpiece and a material of the workpiece are input. In the third step, information regarding how to contain an entirety of the product in the workpiece is input. In the fourth step, a holding portion of the workpiece which is to be held by the machine tool is input. Via the setting interface, a selected information corresponding to a setting step is input. The setting step is selected from the plurality of steps. The processor is configured to determine whether inputting selected information has been completed. When inputting the selected information is determined to have been completed, the display is configured to display information indicating that inputting the selected information is determined to have been completed.

According to further aspect of the present disclosure, a non-transitory computer-readable storage medium stores a program for causing a computer to execute processing including displaying a plurality of steps in which setting-information based on which the machine tool is configured to be controlled to machine a workpiece so as to make a product. The plurality of steps include a first step, a second step, a third step, and a fourth step. In the first step, a shape of the product is input. In the second step, a shape of the workpiece and a material of the workpiece are input. In the third step, information regarding how to contain an entirety of the product in the workpiece is input. In the fourth step, a holding portion of the workpiece which is to be held by the machine tool is input. A setting step in which a selected information is to be input is selected among the plurality of steps. The selected information of the plurality of steps constitutes the setting information. A setting interface via which the selected information is input. Whether inputting the selected information has been completed is determined. When the selected information is determined to have been completed, information indicating that inputting the selected information has been completed is displayed.

According to further aspect of the present disclosure, an input assistance method for a machine tool includes displaying a plurality of steps in which setting-information based on which the machine tool is configured to be controlled to machine a workpiece so as to make a product. A setting step in which a selected information is to be input is selected among the plurality of steps. The selected information of the plurality of steps constitutes the setting information. A setting interface via which the selected information is input. Whether inputting the selected information has been completed is determined. When the selected information is determined to have been completed, information indicating that inputting the selected information has been completed is displayed. A call interface via which the setting interface is called is displayed without an call interface via which another setting interface than the setting interface is called being displayed, another selected information corresponding to another step than the setting step being set via the another setting interface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
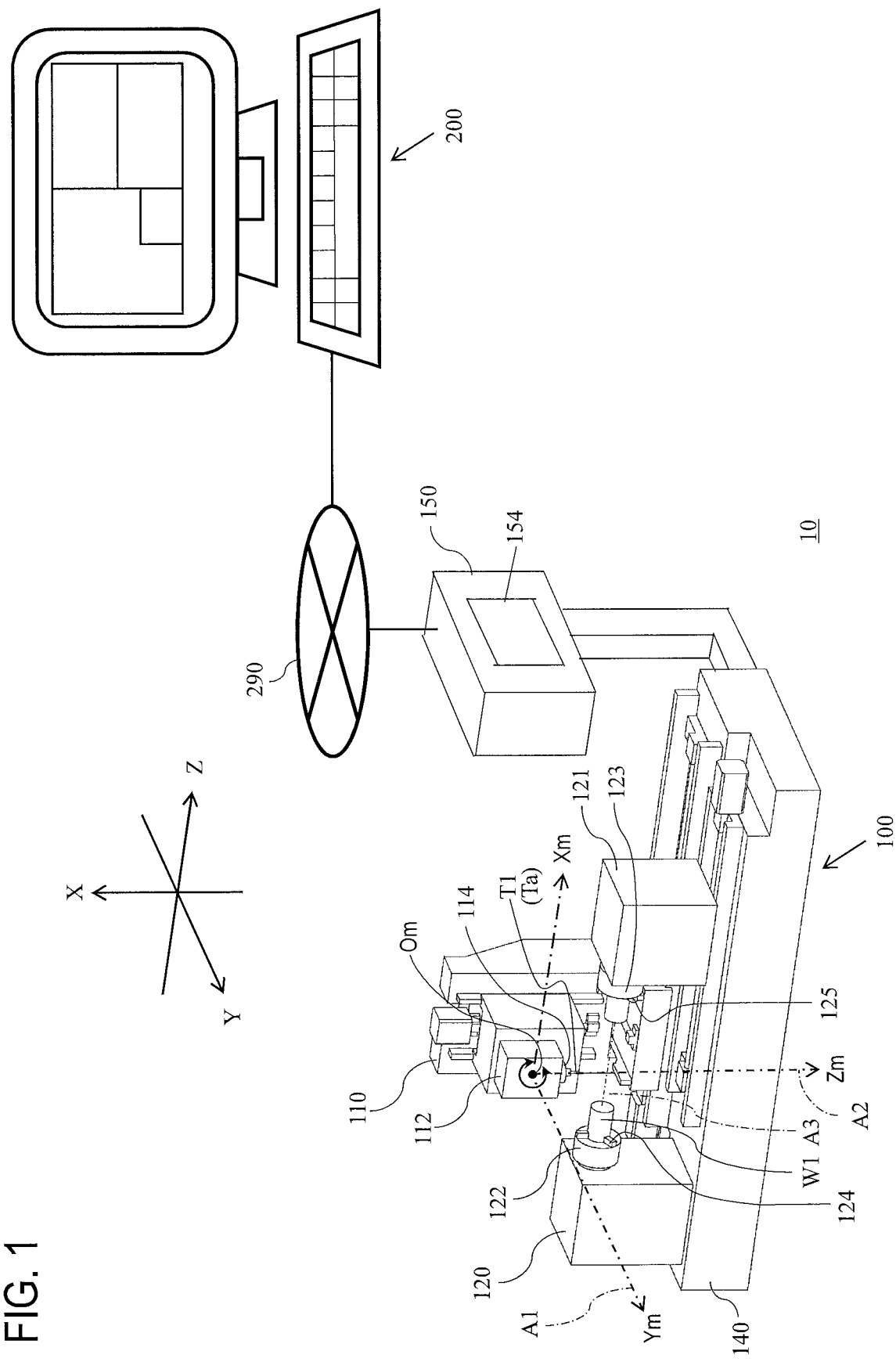
FIG. 1 illustrates: a schematic configuration of a machine tool according to an embodiment; and a schematic configuration of a system including a computer for generating a machining program for the machine tool.

The present invention will now be described with reference to the accompanying drawings. In the drawings, like reference numerals designate corresponding or identical elements throughout the various drawings.

FIG. 1 illustrates a schematic configuration of a system 10 according to this embodiment of the present invention. The system 10 includes a machine tool 100, a computer 200, and a network 290. The network 290 connects the machine tool 100 and the computer 200 to each other. A non-limiting example of the network 290 is a LAN (local area network) provided in a factory, a plant, or another industrial facility. While the network 290 illustrated is a wired network, the network 290 may be a wireless network. It is to be noted that as illustrated in FIG. 1, the X axis is along the height direction of the machine tool 100, the Y axis is along the depth direction of the machine tool 100, and the Z axis is along the width direction of the machine tool 100. This embodiment is in accordance with a JIS standard in that the Z axis is an axis parallel to rotation axis A3 of a first spindle 122, which holds a workpiece. In this embodiment, this coordinate system will be referred to as workpiece coordinate system.

The machine tool 100 performs machining on a workpiece W1. The machining includes at least one of turning, milling, drilling, threading, reaming, and boring. As illustrated in FIG. 1, the machine tool 100 includes a column 110, a first headstock 120, and a second headstock 121. The column 110, the first headstock 120, and the second headstock 121 are provided on a base 140.

The column 110 is movable in the Y axis direction and the Z axis direction on the base 140. A tool headstock 112 is mounted on the column 110. The tool headstock 112 is movable in the X axis direction relative to the column 110. The tool headstock 112 is swingable, relative to the column 110, about a swinging axis A1, which is along the Y axis direction. A tool spindle 114 is mounted on the tool headstock 112. The tool spindle 114 is rotatable about a rotation axis A2 relative to the tool headstock 112. The rotation axis A2 is orthogonal to the swinging axis A1. The tool spindle 114 is holding a tool Ta, which is a machining tool. As used herein, the term "machining tool" is intended to mean a concept encompassing a turning tool, a milling tool, a drilling tool, a threading tool, a reaming tool, and a boring tool. The machine tool 100 further includes a tool exchanger, not illustrated, that exchanges the tool Ta with another tool. The tool Ta is exchanged as necessary, that is, based on the kind of machining performed on the workpiece W1.

In this embodiment, the intersection between the axis A1 and the axis A2 will be referred to as machine origin Om; the rotation axis A2 will be referred to as Zm axis; the swinging axis A1 will be referred to as Ym axis; an axis perpendicular to the Zm axis and the Ym axis will be referred to as Xm axis; and a coordinate system defined by these axes will be referred to as machine coordinate system. The direction extending from the machine origin Om toward the leading end of a first tool T1 will be regarded as positive direction of the Zm axis. The X axis of the workpiece coordinate system is rotated about the Y axis such that the positive direction of the X axis of the workpiece coordinate system is identical to the positive direction of the Xm axis of the machine coordinate system. This makes the positive direction of the Z axis of the workpiece coordinate system identical to the positive direction of the Zm axis of the machine coordinate system. The positive direction of the Y axis of the workpiece coordinate system will be regarded as the positive direction of the Ym axis of the machine coordinate system.

The first headstock 120 is fixed on the base 140. The first headstock 120 includes the first spindle 122. The first spindle 122 is rotatable about the rotation axis A3. The rotation axis A3 is along the Z axis direction. The first spindle 122 includes a first chuck 124. The first chuck 124 holds a first end of the workpiece W1. The second headstock 121 is provided on the base 140 and movable on the base 140 in directions parallel to the Z axis direction. The second headstock 121 includes a second spindle 123. The second spindle 123 is rotatable about the rotation axis A3. The second spindle 123 includes a second chuck 125. The second chuck 125 holds a second end of the workpiece W1. The second end is opposite to the first end of the workpiece W1 in the Z axis direction. When the machine tool 100 machines the second end of the workpiece W1, the first chuck 124 holds the workpiece W1. When the machine tool 100 machines the first end of the workpiece W1, the second chuck 125 holds the workpiece W1.

The machine tool 100 includes a controller 150. The controller 150 controls rotational motions about the rotation axes, swinging motions about the swinging axis, and movements in the axis directions. The controller 150 is connected to the base 140. It is to be noted that the controller 150 may be connected to another portion of the machine tool 100, or may be provided at a position apart from the base 140 insofar as the controller 150 is capable of transmitting control signals and/or receiving detection results.

Figure 2:
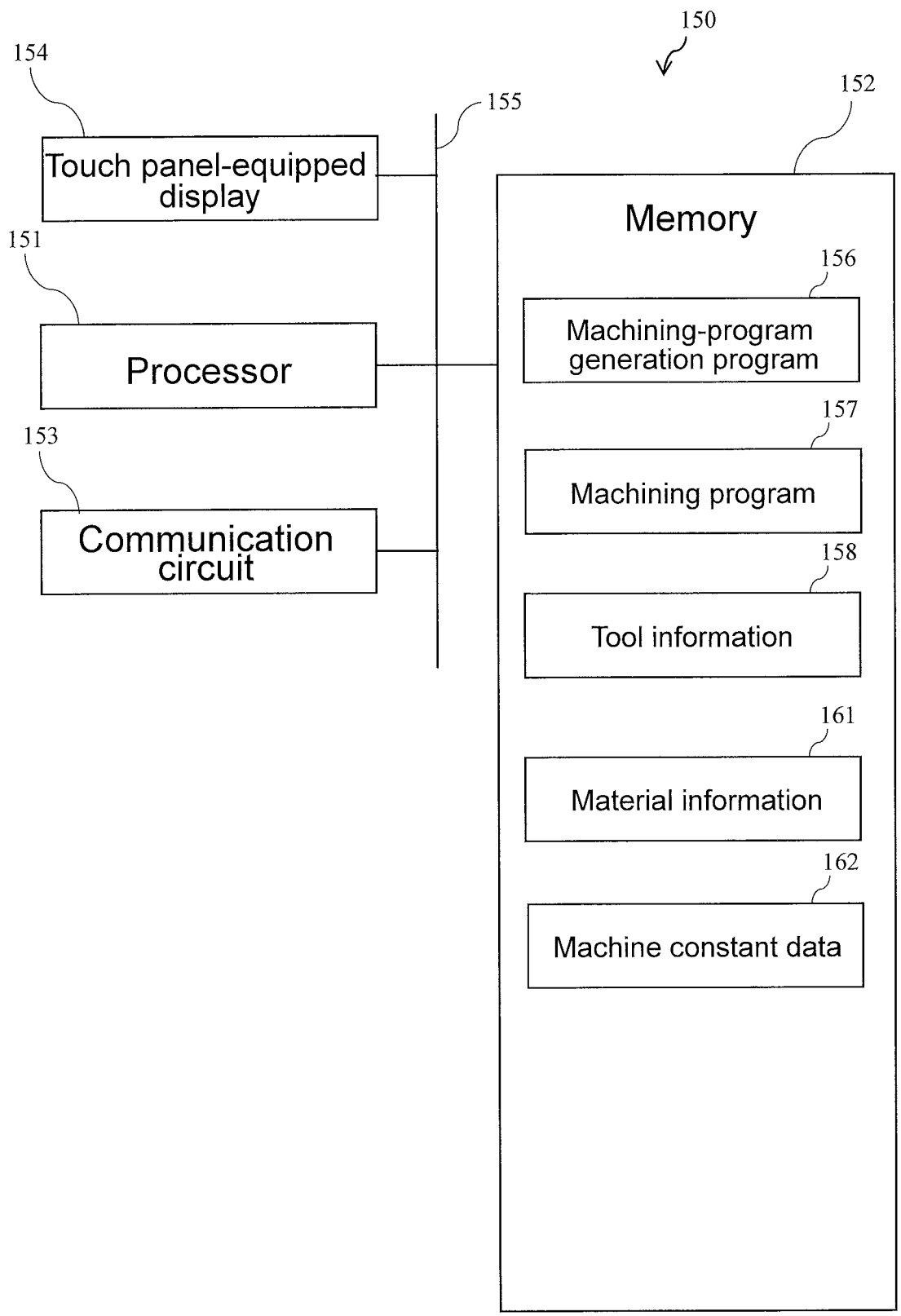
FIG. 2 is a hardware block diagram of a controller.

FIG. 2 is a hardware block diagram of the controller 150. As illustrated in FIG. 2, the controller 150 includes a processor 151, a memory 152, a communication circuit 153, and a touch panel-equipped display 154. The processor 151, the memory 152, the communication circuit 153, and the touch panel-equipped display 154 are connected to each other via a buS155. The memory 152 stores programs necessary for machining, programs necessary for load display, and data necessary for these programs. The processor 151 reads a program stored in the memory 152 and executes the program that has been read. In this manner, the functions of the controller 150 are implemented. The functions implemented by the controller 150 include control of machining. Specifically, the memory 152 stores a machining program 157. The machining program 157 includes a control command for performing machining. The machining program 157 is usually edited in the computer 200, transmitted to the controller 150 via the network 290, and stored in the memory 152. The communication circuit 153 has functions necessary for communicating with the computer 200 via the network 290; specifically, a function of converting a communication packet into data, a function of converting data into a communication packet, and a function of transmitting and receiving communication packets.

In this embodiment, the memory 152 stores tool information 158, which is about tools Ta mountable on the machine tool 100. The tool information 158 includes T numbers corresponding to respective tools Ta, names of respective tools Ta, materials of respective tools Ta, blade characteristics of respective tools Ta, and usage states (wear states) of respective tools Ta. As used herein, the term "blade characteristics" of a tool Ta are intended to encompass nominal diameter of the tool Ta, tool length, tool diameter, axial offset, radial offset, teeth count, cutting edge width, curvature radius of arc of the cutting edge defining its shape (cutting-edge curvature radius) R, blade indexing angle (indexing angle), effective spindle rotation direction, and blade orientation.

As used herein, the term "tool length" is intended to mean the length of the tool Ta in a direction along the rotation axis A2 (this direction will be hereinafter referred to as axial direction), assuming that the tool Ta is mounted on the tool spindle 114 and that the tool Ta is not worn (that is, the tool Ta is a new tool Ta). In other words, the tool length is the length of the tool Ta in the Zm axis direction in the machine coordinate system. As used herein, the term "tool diameter" is intended to mean the diameter of the tool Ta in a direction perpendicular to the rotation axis A2 (this direction will be hereinafter referred to as radial direction), assuming that the tool Ta is mounted on the tool spindle 114 and that the tool Ta is not worn (that is, the tool Ta is a new tool Ta). As used herein, the term "axial offset" is intended to mean the distance between the tool base of the tool Ta and the tool tip of the tool Ta in the axial direction, assuming that the tool Ta is mounted on the tool spindle 114 and that the tool Ta is not worn (that is, the tool Ta is a new tool Ta). As used herein, the term "tool base" of the tool Ta is intended to mean (assuming that the tool Ta is mounted on the tool spindle 114) one of two end points of the tool Ta in the axial direction that belongs to the portion of the tool Ta held by the tool spindle 114. In other words, the axial offset is the distance in the Zm axis direction between the tool base and the tool tip of the tool Ta in the machine coordinate system. As used herein, the term "radial offset" is intended to mean a coordinate value equivalent to the distance between the tool base of the tool Ta and the cutting edge of the tool Ta in the radial direction, assuming that the tool Ta is mounted on the tool spindle 114 and that the tool Ta is not worn (that is, the tool Ta is a new tool Ta). This coordinate value is the Xm coordinate value of the cutting edge of the tool Ta, assuming that the tool headstock 112 is taking the posture illustrated in FIG. 1 and that the tool Ta is mounted on the tool spindle 114.

As used herein, the term "blade indexing angle" is intended to mean whether the cutting edge of the turning tool is pointed toward the first spindle 122 or pointed toward the second spindle 123. At an indexing angle of 0 degrees, the cutting edge of the turning tool is pointed toward the first spindle 122. At an indexing angle of 180 degrees, the cutting edge of the turning tool is pointed toward the second spindle 123. As used herein, the term "effective spindle rotation direction" is intended to mean an effective rotation direction (clockwise or counter-clockwise), as seen from the turning tool, of the spindle toward which the turning tool is pointed. As used herein, the term "blade orientation" is intended to mean whether the turning tool is left-handed or right-handed.

The memory 152 also includes material information 161 and machine constant data 162. The material information 161 is information about the material of the workpiece W1 (to-be-machined material, W1), examples including reference information (such as name and ID), shape (such as outer diameter, inner diameter (when there is a hole), and length), and characteristics (specific machining resistance× (kg/mm$^2$). The machine constant data 162 is a parameter unique to the machine tool 100 used in calculating cutting conditions. Examples of the machine constant data 162 include mechanical efficiency mechanical horsepower HP, and machining allowance (finishing allowance). The tool information 158 is transmitted by the communication circuit 153 to the computer 200 via the network 290. The tool information 158 and the material information 161 are read from the memory 152 at the time when a machining-program generation program 156, described later, is executed. The memory 152 may store the machining-program generation program 156, which is for generating the machining program 157. The functions of the machining-program generation program 156 will be described later.

The touch panel-equipped display 154 may be a single display 154 or may be a combination of a plurality of displays. It is to be noted that the "display" of the touch panel-equipped display 154 is a display example, and the "touch panel" of the touch panel-equipped display 154 is an interface example. It is also to be noted that the touch panel-equipped display 154 may be substituted with a combination of: a display without a touch panel; and input devices provided around the display, examples including buttons, switches, a lever, and a pointing device. In this case, the input devices are interface examples.

Figure 3:
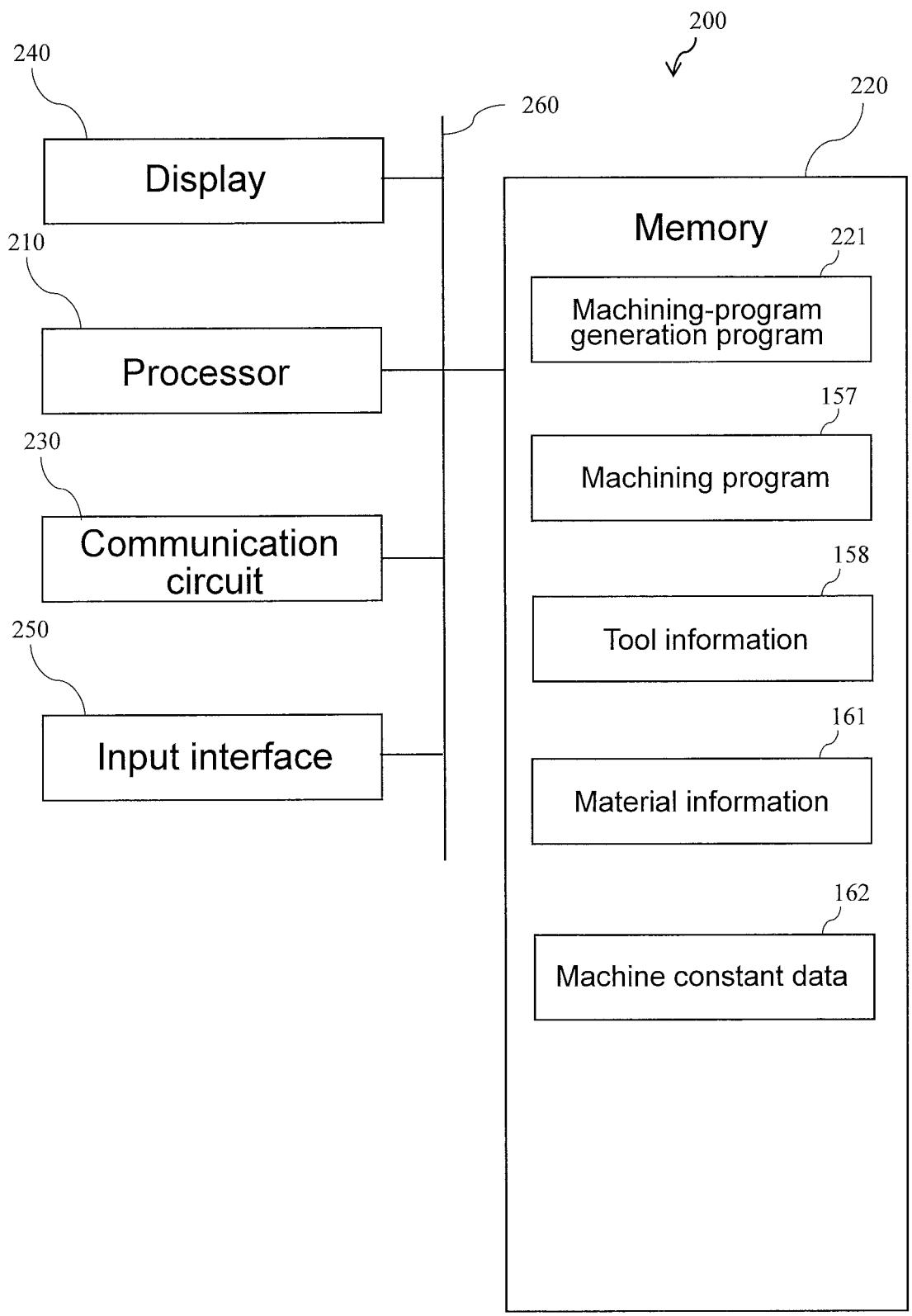
FIG. 3 is a hardware block diagram of the computer.

FIG. 3 is a hardware block diagram of the computer 200. As illustrated in FIG. 3, the computer 200 includes a processor 210, a memory 220, a communication circuit 230, a display 240, and an input interface 250. The processor 210, the memory 220, the communication circuit 230, the display 240, and the input interface 250 are connected to each other via a buS260. The input interface 250 is an interface example. For example, the input interface 250 is a pointing device such as a keyboard and a mouse. It is to be noted that the computer 200 may be a combination in which the display 240 and the input interface 250 are integral to each other. A non-limiting example of such combination is a tablet computer provided with a touch panel-equipped display.

The memory 220 stores the machining program 157, the tool information 158, the material information 161, a machining-program generation program 221, and a program such as an operating system. The machining-program generation program 221 has a function substantially identical to the machining-program generation program 156. It is to be noted, however, that the screen display method for displaying the machining-program generation program 221 may be partially different from the screen display method for displaying the machining-program generation program 156. The processor 210 reads a program stored in the memory 220 and executes the program that has been read. The communication circuit 230 has functions necessary for communicating with the computer 200 via the network 290; specifically, a function of converting a communication packet into data, a function of converting data into a communication packet, and a function of transmitting and receiving communication packets.

The machining program 157 is generated using the machining-program generation program 221, and the computer 200 transmits the machining program 157 thus generated to the controller 150 using the communication circuit 230. Upon execution of the machining-program generation program 221, the computer 200 receives latest tool information 158 from the controller 150 using the communication circuit 230, and updates the tool information 158 stored in the memory 220.

Next, content of the machining program 157 will be described. In this embodiment, the machining program 157 is described in a program code for numerical control of the machine tool 100. In the machining program 157, at least the following units are defined.

(1) Common unit: Material and shape of the workpiece W1.
(2) Basic coordinate unit: Method for setting the workpiece coordinate system and the machine coordinate system.
(3) Machining unit: Machining methods and/or machined shapes of parts of final machined shape.

The common unit, the basic coordinate unit, and the machining unit each have a unit number. The machining unit includes: unit data including information for identifying machining content; a tool sequence for setting tools Ta and cutting conditions for the tools Ta; and a shape sequence specifying a machined shape obtained by the machining in the machining unit. As used herein, the term "tool sequence" is intended to mean a series of machining stages necessary for forming a machined shape of a part specified by the machining unit (such as one bar material and one thread ridge). (That is, a series of stages for forming one shape, including rough processing and finishing processing performed while exchanging tools.) (For example, in the case of hole machining, the series of stages include: spotting; rough processing associated with making a hole using drills in such an order that the tool diameters of the drills gradually become larger; and finishing processing such as reaming) (For further example, in the case of threading, the series of stages include spotting, prepared hole processing, and tapping.) As used herein, the term "shape sequence" is intended to mean an aggregation of segments defined by parameters for determining a machined shape, such as: a start point and an end point of the cutting edge of a tool in the workpiece coordinate system; and a connection relationship indicating how the start point and the end point are connected to each other (such as by way of a line or an arc). It is to be noted, however, that the thread pitch in the threading (tapping) is included in the unit data of the machining unit. In this embodiment, a machining stage in which one tool in the tool sequence is used will be referred to as machining process, which will be described below.

The machining program 157 specifies: at least one tool Ta used in machining work; and at least one machining process in the machining work performed using the at least one tool Ta. The machining process defines: the tool Ta for implementing the process in the machining stage; and cutting conditions for the tool Ta. The cutting conditions for the tool Ta include: machining speed Vc; cutting amount of the tool Ta relative to the workpiece W1; and feed speed of the workpiece W1. The machining speed Vc (m/min) is obtained from the equation $Vc=\pi \times D \times nw/1000$, where nw denotes spindle rotational speed ($min^{-1}$), and D denotes workpiece diameter (mm). In this embodiment, the term "feed speed" is intended to mean feed per revolution f (mm/rev) of a spindle. Parameters defining the machining process include: information for identifying the stage of the machining process (such as rough processing, finishing processing, spotting, prepared hole processing, and tapping); and number indicating the order in which the machining process is performed in the machining unit to which the machining process belongs. For example, assume that the machining program 157 defines: number 1 as rough processing performed as the machining process in the tool sequence; and number 2 as finishing processing performed as the machining process. Under this assumption, the rough processing as the machining process is performed first, and then the finishing processing as the machining process is performed. Also, the tool Ta and the cutting conditions for the tool Ta defined in the machining process are applied to the entire shape sequence in the same machining unit.

General Display Screen

Figure 4:
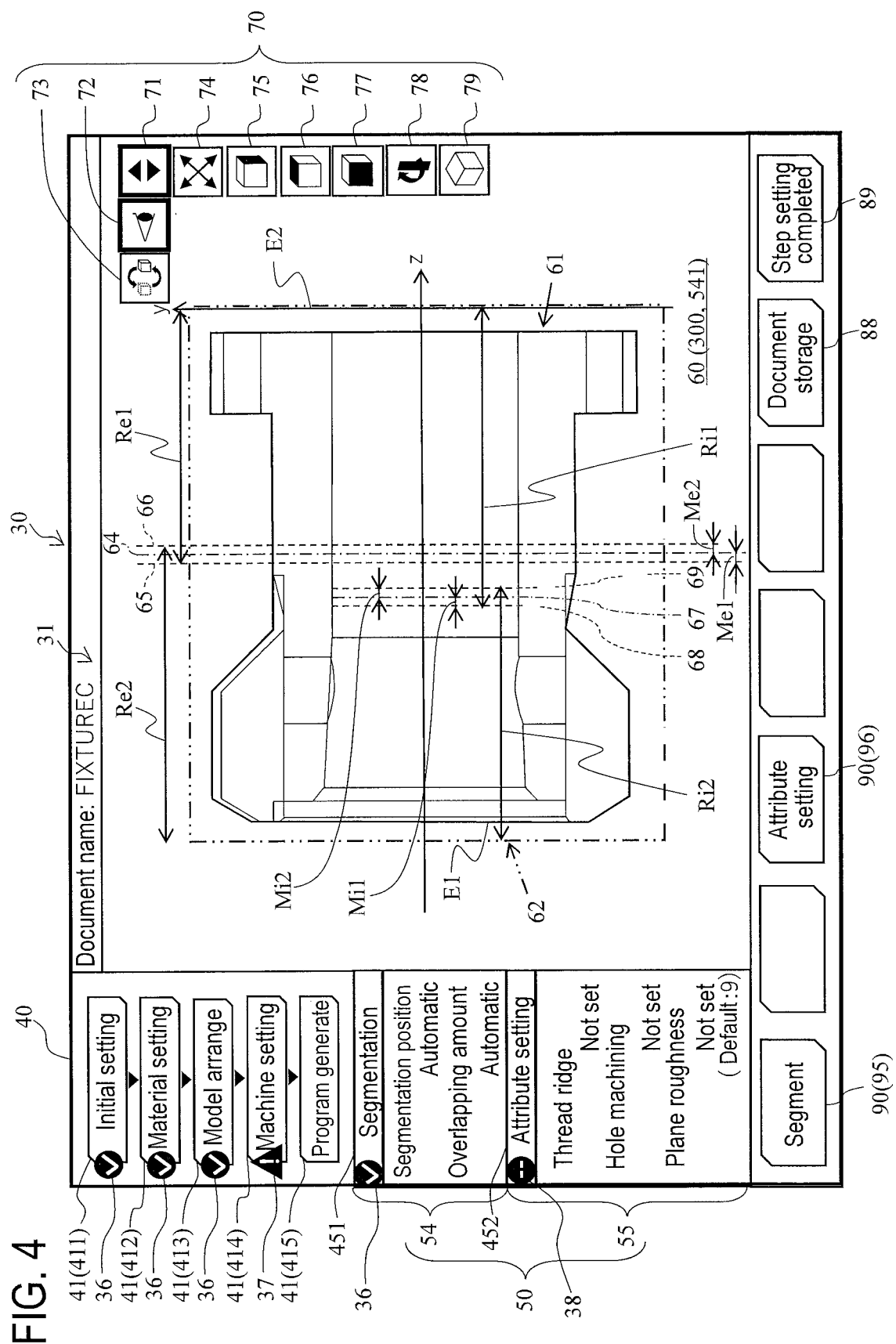
FIG. 4 illustrates an example display screen of a machining-program generation program according to the embodiment.

FIG. 4 illustrates a display screen example, 30, of the machining-program generation program 221 according to this embodiment. The display screen 30 is displayed on the display 240 (154). The display screen 30 displays a step status display window 40, a setting step status display window 50, a 3D (dimension) model display window 60, a document storage interface 88, a step transition interface 89, and a call interface 90.

The step status display window 40 displays a plurality of steps in which setting-information is set in order to control the machine tool 100 to machine the workpiece W1 into a product. The plurality of steps include: a first step of setting the shape of the product (initial setting step 411); a second step of setting the shape and material of the workpiece W1 (material setting step 412); a third step of setting information for identifying the part of the workpiece W1 which the product occupies (model arrangement step 413); and a fourth step of setting: the portion of the workpiece W1 to be held by a machine tool; and the machining direction in which the workpiece is machined W1 (machining setting step 414). As used herein, the term' "product" is intended to mean a product or a constituent part of a product. The plurality of steps may include a fifth step of checking the content of the machining program generated and additionally editing the machining program as necessary (program generation step 415). It is to be noted, however, that the program generation step 415 may be omitted. That is, the plurality of steps may only be made up of the first step, the second step, the third step, and the fourth step. It is to be noted that the setting-information will be detailed later.

The plurality of steps are displayed in button form, 41. When there is a setting step, among the plurality of steps, whose setting-information should be set, the button 41 for the setting step is selected. It is to be noted, however, that the setting steps are automatically selected in an order determined in advance, and that if there is a setting step whose setting-information has already been set, it is possible to manipulate the button 41 for the next setting step to transition to the next setting step. If, however, a determination is made that not all of the setting-information corresponding to a setting step has been set, it is impossible to proceed to the next step. FIG. 4 illustrates a stage in the middle of the machining setting step 414, with the steps up to the model arrangement step 413 completed. That is, in FIG. 4, the setting step is the machining setting step 414. In this case, it is possible to return to the initial setting step 411, the material setting step 412, and the model arrangement step 413 by manipulating the buttons 41 of the steps (such as tapping on the buttons 41 via the touch panel-equipped display 154, or clicking on the buttons 41 with a mouse via the input interface 250). It is impossible, however, for a user to manipulate the button 41 for the program generation step 415, because the button 41 for the program generation step 415 is inactive.

At the left end of each button 41, a check mark is displayed when a determination is made that all of the setting-information corresponding to the setting step has been set. The check mark is information 36 indicating that the setting of the setting-information in the setting step is completed. In the example illustrated in FIG. 4, the information 36 is displayed at the left ends of the buttons 41 of the initial setting step 411, the material setting step 412, and the model arrangement step 413. It is to be noted that the information 36 may be represented by another pictorial symbol or text, or may be represented by: a color inside the button 41 for a step done with setting; text displayed on the button 41; or a visual effect (such as intermittent flashing) on the button 41. It is also to be noted that the position at which the information 36 is displayed may not necessarily be the left end of the button 41 for a step done with setting. Preferably, the position at which the information 36 is displayed is adjacent to the button 41 for a step done with setting, or inside the button 41 for a step done with setting.

As illustrated in FIG. 4, another caution mark is displayed at the left end of the button 41 for the machining setting step 414, which is in the middle of setting. This caution mark is information 37, which indicates that the machining setting step 414 is in the middle of setting. It is to be noted that the information 37 may be represented by another pictorial symbol or text, or may be represented by: a color inside the button 41 for a step that is in the middle of setting; text displayed on the button 41; or a visual effect (such as intermittent flashing) on the button 41. It is also to be noted that the position at which the information 37 is displayed may not necessarily be the left end of the button 41 for a step that is in the middle of setting. Preferably, the position at which the information 37 is displayed is adjacent to the button 41 for a step that is in the middle of setting, or inside the button 41 for a step that is in the middle of setting.

The setting step status display window 50 displays a setting status of setting-information associated with a setting step. FIG. 4 illustrates an example in which the setting step status display window 50 is displaying setting statuses of the setting-information associated with the machining setting step 414. The machining setting step 414 is made up of two sub-steps, namely, a process segmentation sub-step 451 and a machining attribute setting sub-step 452. The setting step status display window 50, therefore, is displaying a setting status 54 of the process segmentation sub-step 451 and a setting status 55 of the machining attribute setting sub-step 452. Content of the setting statuses 54 and 55 will be detailed later.

The 3D model display window 60 displays a computer graphics (CG) image of at least one of the shape of the workpiece W1 corresponding to the setting step and the shape of the product corresponding to the setting step. In FIG. 4, the 3D model display window 60 is displaying a 3D model of the product (product model 61) and a 3D model of the workpiece W1 (workpiece model 62). In FIG. 4, the product model 61 is indicated by solid lines, and the workpiece model 62 is indicated by double-dashed lines, by way of description. The manner of indication, however, will not be limited to the manner illustrated in FIG. 4. The product model 61 and the workpiece model 62 may be wire frames or solid models. Otherwise, the workpiece model 62 may be a solid model displayed in a semi-transparent manner. As illustrated in FIG. 4, the 3D model display window 60 also serves as a setting interface 300, which is for setting setting-information corresponding to a setting step (process segmentation sub-step). In all the steps, the setting interface 300 is automatically displayed if the setting-information corresponding to the setting step is not set yet. The setting interface 300 will be detailed later.

The 3D model display window 60 displays at least one view control icon 70. The at least one view control icon 70 includes an unfold icon 71. When the unfold icon 71 is OFF, the 3D model display window 60 displays the unfold icon 71 alone, among the at least one view control icon 70. When the unfold icon 71 is ON, the 3D model display window 60 displays icons 72 to 79, or displays icons 72, 73, and 80 to 85 illustrated in FIG. 5.

Figure 5:
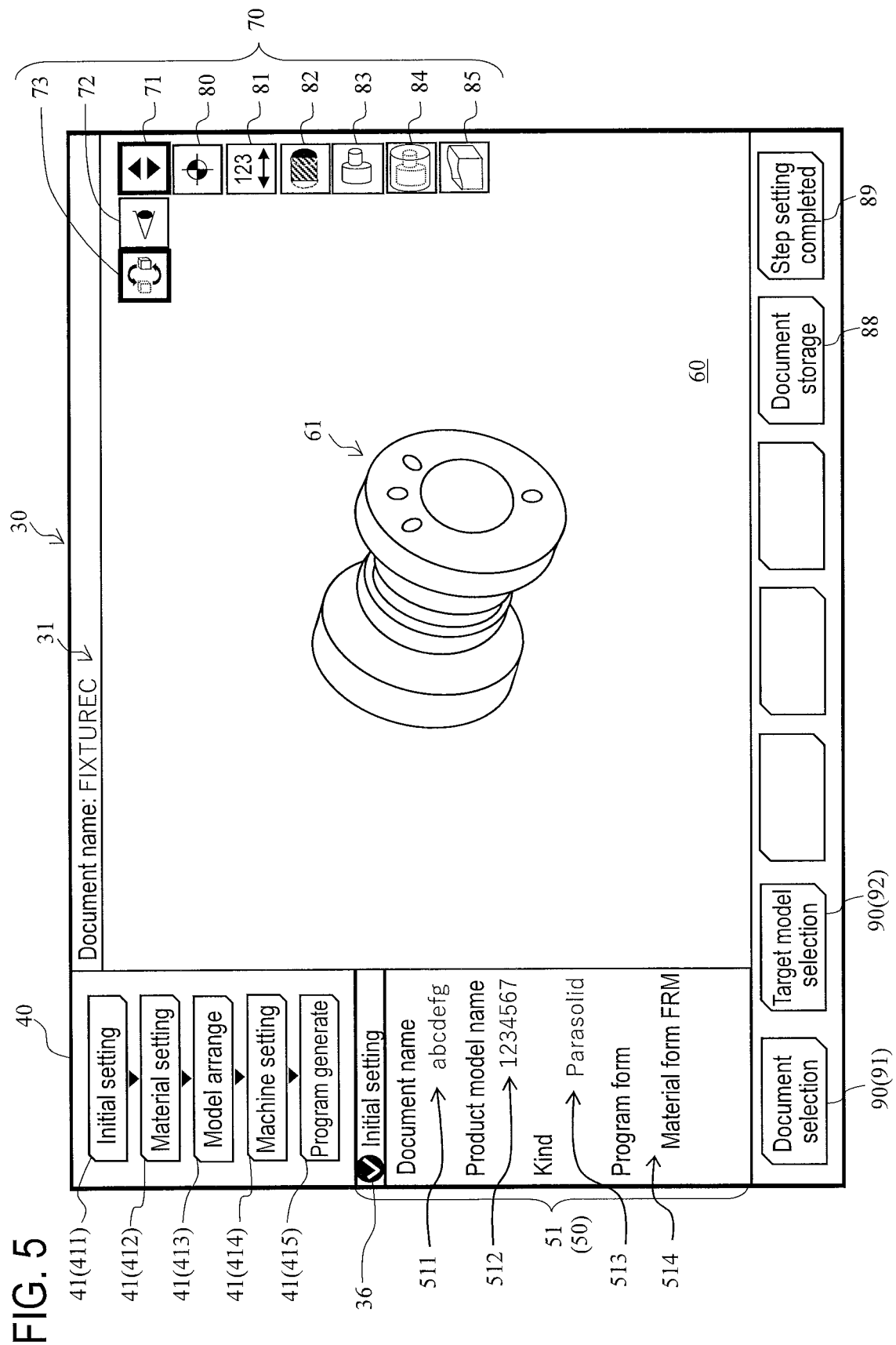
FIG. 5 illustrates an example display screen of an initial setting step.

The at least one view control icon 70 includes a view port control icon 72 and a display item control icon 73. One of the view port control icon 72 and the display item control icon 73 is selectively activated. FIG. 4 illustrates an example in which the view port control icon 72 is activated, and FIG. 5 illustrates an example in which the display item control icon 73 is activated. Referring to FIG. 4, upon activation of the view port control icon 72, the following buttons are displayed: a fitting button 74, a front view representation button 75, a plan view representation button 76, a left side view representation button 77, an opposite view representation button 78, and a diametric perspective representation button 79. That is, the at least one view control icon 70 includes the fitting button 74, the front view representation button 75, the plan view representation button 76, the left side view representation button 77, the opposite view representation button 78, and the diametric perspective representation button 79.

By manipulating the fitting button 74, the product model 61 on display or the workpiece model 62 on display is enlarged or reduced into a size fittable within the 3D model display window 60. By manipulating the front view representation button 75, the product model 61 and/or a front view of the workpiece model 62 (a view of the 3D model as seen from the Z axis negative direction of the workpiece coordinate system) are displayed on the 3D model display window 60. By manipulating the plan view representation button 76, the product model 61 and/or a plan view of the workpiece model 62 (a view of the 3D model as seen from the X axis negative direction of the workpiece coordinate system) are displayed on the 3D model display window 60. By manipulating the left side view representation button 77, the product model 61 and/or a left side view of the workpiece model 62 (a view of the 3D model as seen from the negative Y direction of the workpiece coordinate system) are displayed on the 3D model display window 60. By manipulating the opposite view representation button 78, a view of the product model 61 on display or the workpiece model 62 on display as seen from the opposite direction is displayed on the 3D model display window 60. By manipulating the diametric perspective representation button 79, the product model 61 and/or a diametric perspective of the workpiece model 62 is displayed on the 3D model display window 60. In this diametric perspective, the X axis and the Y axis of the workpiece coordinate system have equal scaling.

Referring to FIG. 5, upon activation of the display item control icon 73, the following buttons are displayed: a coordinate system representation button 80, a measurement representation button 81, a cross-section representation button 82, a product model representation button 83, a workpiece model representation button 84, and a model inapplicability curved surface representation button 85. That is, the at least one view control icon 70 includes the coordinate system representation button 80, the measurement representation button 81, the cross-section representation button 82, the product model representation button 83, the workpiece model representation button 84, and the model inapplicability curved surface representation button 85. By manipulating the coordinate system representation button 80, the coordinate axes of the workpiece coordinate system are displayed on the 3D model display window 60. By manipulating the measurement representation button 81, the lengths of the product model 61 in the X axis direction, the Y axis direction, and the Z axis direction of the workpiece coordinate system are displayed on the 3D model display window 60; alternatively, the length of the product model 61 in its axial direction along the rotation axis A3 and the length of the product model 61 in its radial direction crossing the rotation axis A3 are displayed on the 3D model display window 60. By manipulating the cross-section representation button 82, a cross-sectional view of the product model 61 on display cut along a plane passing the Z axis of the workpiece coordinate system is displayed on the 3D model display window 60. By turning ON the product model representation button 83, the product model 61 is displayed on the 3D model display window 60. By turning OFF the product model representation button 83, the product model 61 disappears from the 3D model display window 60. By turning ON the workpiece model representation button 84, the workpiece model 62 is displayed on the 3D model display window 60. By turning OFF the workpiece model representation button 84, the workpiece model 62 disappears from the 3D model display window 60. When both the product model representation button 83 and the workpiece model representation button 84 are ON, the workpiece model 62 is displayed in a semi-transparent manner so that the product model 61 is visually recognizable.

By manipulating the model inapplicability curved surface representation button 85, a model inapplicability curved surface of the product model 61 is emphasized. The model inapplicability curved surface is a surface, among the surfaces of the product model 61, that is not applicable to any of the following surface models determined in advance: a turning processed surface model, a hole machining processed surface model, and a surface machining processed surface model. As used herein, the term "turning processed surface model" is intended to mean, for example, a surface of a cylinder shape having a center axis identical to the rotation axis A3, a surface of a truncated cone having a center axis identical to the rotation axis A3, and a surface of a torus having a center axis identical to the rotation axis A3. As used herein, the term "hole machining processed surface model" is intended to mean a surface of one full cylinder shape and a surface of one full truncated cone, As used herein, the term "surface machining processed surface model" is intended to mean a flat surface, for example. Thus, a model inapplicability curved surface is a sculptured surface that does not correspond to any of the following surfaces: a turning processed surface formed in a surface of a cylinder shape, a truncated cone, or a torus having a center axis shifted from the rotation axis A3; a flat surface; a cylinder shape surface; a truncated cone surface; and a torus surface. At the time when setting in the model arrangement step 413 is completed, a model inapplicability curved surface can be automatically extracted. A method of extraction will be described later by referring to FIG. 21. For a model inapplicability curved surface, it is impossible to automatically obtain a tool sequence by the machining-program generation program 156. When, therefore, the machining program 157 is automatically generated by the machining-program generation program 156, machining of a model inapplicability curved surface is not performed in the machining program 157. The 3D model display window 60 displays a computer graphics image of a surface of the workpiece W1 that is un-machinable by the automatically generated machining program. This enables the user to check whether the machining program 157 automatically generated by the machining-program generation program 156 corresponds to all the machinings performed on the product.

It is to be noted that size enlargement, size reduction, model translation, and/or model rotation on the 3D model display window 60 can be performed by other than manipulating the at least one view control icon 70, such as by manipulating a known touch panel or a known mouse.

The document storage interface 88 is an interface for storing, in a work file, the content of work performed while the machining program 157 is being generated. The step transition interface 89 is an interface for transitioning to a next setting step. While in FIG. 4 the step transition interface 89 is displayed in button form, the step transition interface 89 may be a user interface other than a button. Upon manipulation of the step transition interface 89 by way of an operation such as tapping and mouse-clicking, the setting step is transitioned to the next setting step, provided that a determination is made that all of the setting-information corresponding to the setting step has been set. When a determination is made that not all of the setting-information corresponding to the setting step has been set, the setting step is not transitioned to the next step, even if the step transition interface 89 is manipulated. It is to be noted that when a determination is made that all of the setting-information corresponding to the setting step has been set, the button 41 for the next step is active; in this case, the button 41 can be regarded as one step transition interface 89. This is because if the button 41 for the next step is inactive, manipulating the buttons 41 does not lead to a transition to the next step, while if the button 41 for the next step is active, manipulating the button 41 leads to a transition to the next step.

The call interface 90 is an interface for calling the setting interface 300. In FIG. 4, in which the setting step is the machining setting step 414, a process segmentation setting call interface 95 and a machining attribute setting call interface 96 are displayed. The process segmentation setting call interface 95 and the machining attribute setting call interface 96 are for calling a process segmentation setting interface 541 and a machining attribute setting interface 551, respectively. The process segmentation setting interface 541 and the machining attribute setting interface 551 are for setting setting-information corresponding to the process segmentation sub-step 451 and the machining attribute setting sub-step 452, which are setting-information corresponding to the machining setting step 414. On the display screen 30, no interfaces are displayed for calling interfaces for setting setting-information corresponding to steps other than the setting step. That is, in FIG. 4, no interfaces are displayed for calling the interfaces for setting setting-information corresponding to the steps other than the machining setting step 414, namely, the initial setting step 411, the material setting step 412, the model arrangement step 413, and the program generation step 415. This not only prevents the user from erroneously making an unintended setting but also enables the user to easily find a correct setting interface 300.

Method for Generating Machining Program 157 Using Machining-Program Generation Program 221

Next, by referring to the display screen 30 and flowcharts, description will be made with regard to methods that use the machining-program generation program 221, namely, an input assistance method and a method for generating the machining program 157. FIG. 5 illustrates an example display screen associated with the initial setting step 411, and FIGS. 19 and 20 are flowcharts of: the input assistance method using the machining-program generation program 221; and the method for generating the machining program 157 using the machining-program generation program 221.

Figure 19:
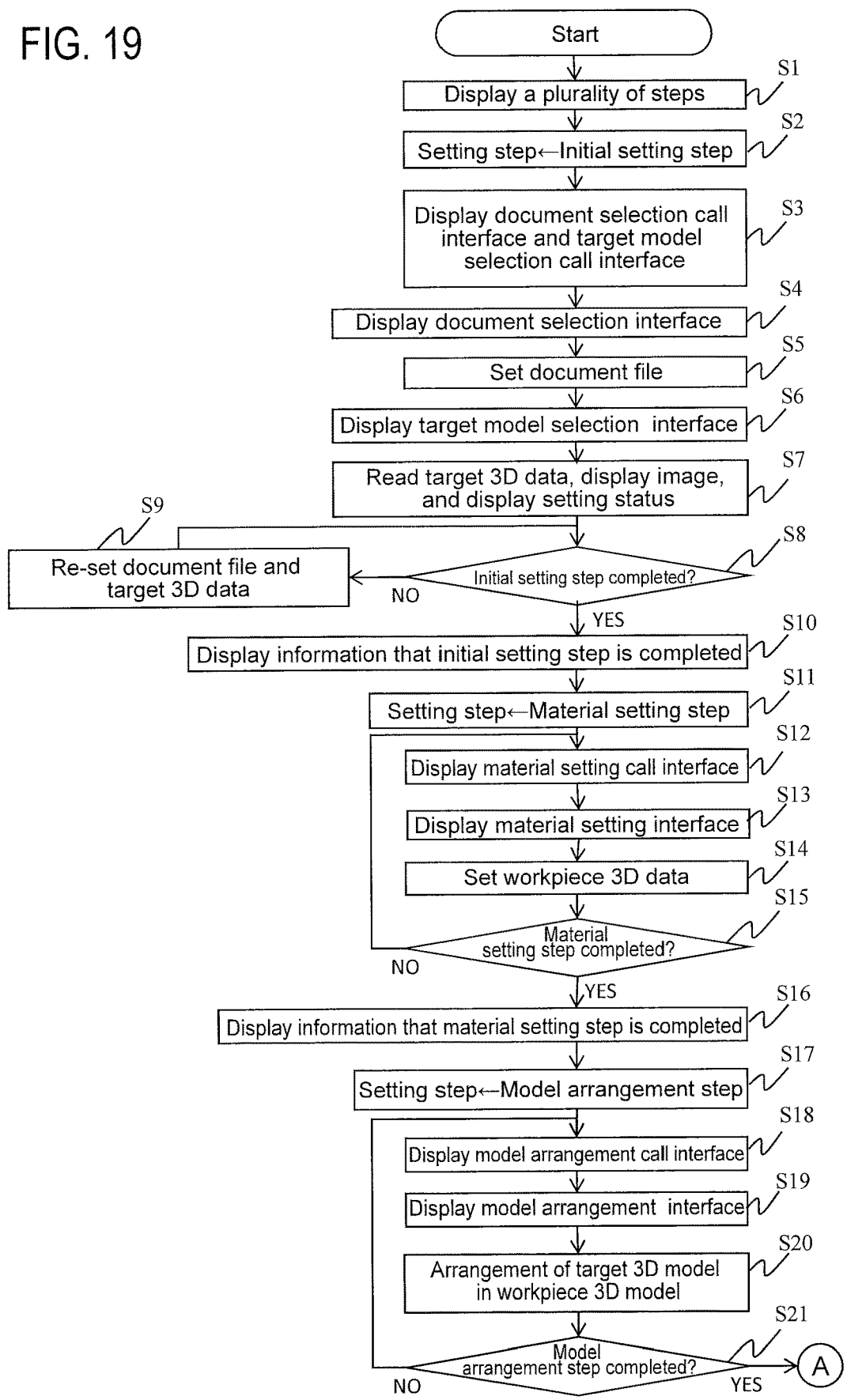
FIG. 19 is a flowchart of: an input assistance method using the machining-program generation program; and a method for generating a machining program using the machining-program generation program.
Figure 20:
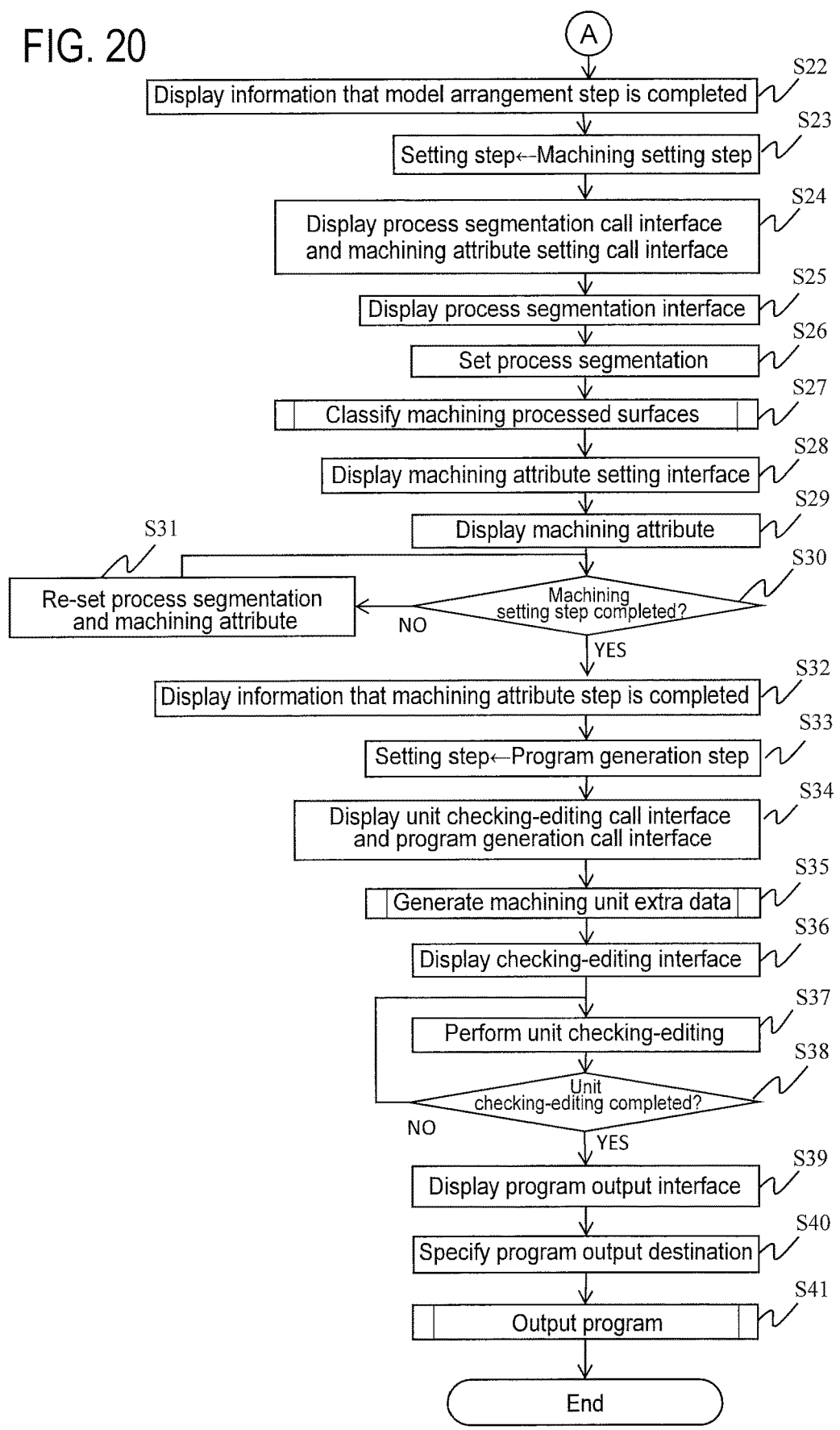
FIG. 20 is a flowchart of: the input assistance method using the machining-program generation program; and the method for generating the machining program using the machining-program generation program.

At step S1 in FIG. 19, the processor 210 (151) performs processing of displaying a plurality of steps (411 to 414) to set setting-information for controlling the machine tool 100 to machine the workpiece W1 into a product. The display 240 (154) displays the plurality of steps (411 to 414) to set setting-information for controlling the machine tool 100 to machine the workpiece W1 to generate the product. At step S2, the processor 210 (151) selects, from the plurality of steps, a setting step whose setting-information should be set. First, the processor 210 (151) selects the initial setting step 411 as the setting step.

At step S3, the processor 210 (151) performs processing of displaying the call interface 90, which is for calling the setting interface 300. The display 240 (154) displays the call interface 90, which is for calling the setting interface 300. Specifically, at the initial setting step 411, the processor 210 (151) performs processing of displaying: a document selection call interface 91, which is for calling a document selection interface; and a product selection call interface 92, which is for calling a product selection interface. While in FIG. 5 the document selection call interface 91 and the product selection call interface 92 are displayed in button form, the document selection call interface 91 and the product selection call interface 92 may be another graphic user interface (GUI) other than buttons.

As used herein, the term "document selection interface" is intended to mean an interface for searching for, selecting, and creating a document file in the computer 200 and/or the controller 150. The document file is a work file used for working purposes in generating the machining program 157. The document selection interface is a user interface equivalent to a typical file manager and will not be elaborated upon by way of illustration. As used herein, the term "product selection interface" is intended to mean an interface for searching for and selecting a 3D CAD (Computer Aided Design) file of the product. The product selection interface is a function equivalent to a typical file manager and will not be elaborated upon by way of illustration.

At step S4, the processor 210 (151) performs processing of displaying the setting interface 300 for setting setting-information corresponding to the setting step (the initial setting step 411). The display 240 (154) displays the setting interface 300 for setting the setting-information corresponding to the setting step (the initial setting step 411) which has been selected from the plurality of steps and whose setting-information should be set. When the setting-information associated with the setting step is not set yet, the processor 210 (151) performs processing of automatically displaying the setting interface 300. When setting-information associated with the setting step is not set yet, the display 240 (154) automatically displays the setting interface 300. Thus, at step S4, when the document file is not set yet, the processor 210 (151) performs processing of automatically displaying the document selection interface. When the document file is not set yet, the display 240 (154) automatically displays the document selection interface. When the document file is already set, the document selection interface may be called by the document selection call interface 91. At step S5, the processor 210 (151) receives the setting of the document file via the document selection interface. Upon receipt of the setting of the document file, the processor 210 (151) performs processing of displaying file name 31 of the document file on the display screen 30. The display 240 (154) displays the file name 31 of the document file.

At step S6, the processor 210 (151) performs processing of displaying the setting interface 300 for setting setting-information corresponding to the setting step (the initial setting step 411). The display 240 (154) displays the setting interface 300 for setting the setting-information corresponding to the setting step (the initial setting step 411) which has been selected from the plurality of steps and whose setting-information should be set. Specifically, the processor 210 (151) performs processing of displaying the product selection interface via the product selection call interface 92. The display 240 (154) displays the product interface via the product selection call interface 92. It is to be noted, however, that when the product is not selected yet, the processor 210 (151) preferably performs processing of automatically displaying the product selection interface. When the product is not selected yet, the display 240 (154) preferably displays the product selection interface via the product selection call interface 92.

At step S7, the processor 210 (151) reads 3D data of a 3D CAD file of the product via the product selection interface. The 3D data includes shape information and color information (displayed color), and a surface shape of the product can be extracted from the 3D data. For example, in a STEP format, which is one 3D CAD file format, a surface of the product is defined by boundary representation. In a STEP format, a surface shape is defined as a plane shape, a cylinder surface shape, a truncated cone surface shape, a toroidal surface shape, and other surface shapes in accordance with standards such as ISO10303-42 and ISO10303-511. This configuration ensures that a surface shape can be extracted from a STEP file using a STEP-format parser. Otherwise, a surface shape can be extracted in a Parasolid format. As illustrated in FIG. 5, the processor 210 (151) performs processing of displaying a computer graphics image (the 3D model display window 60) that represents a shape of the product (the product model 61) and that corresponds to the setting step (the initial setting step 411). The display 240 (154) displays the computer graphics image (the 3D model display window 60) that represents the shape of the product (the product model 61) and that corresponds to the setting step. The processor 210 (151) performs processing of displaying a setting status (the setting step status display window 50) of the setting-information associated with the setting step. The display 240 (154) displays the setting status (the setting step status display window 50) of the setting-information associated with the setting step. In FIG. 5, the setting step status display window 50 is displaying a setting status 51 of the initial setting step 411. Specifically, the setting step status display window 50 is displaying items defined for the document file, namely, a document name 511, a product model name 512, a file kind 513 of the product model, and a program form 514, which has been set in this example. When the document name 511, the product model name 512, the file kind 513 of the product model, and the set program form 514 are defined for the document file, the setting step status display window 50 displays the information 36 indicating that the setting of the document file is completed.

At step S8, the processor 210 (151) performs processing of displaying the step transition interface 89, which is for a transition from the setting step (the initial setting step 411) to the next step (the material setting step 412). The display 240 (154) displays the step transition interface 89, which is for the transition from the setting step (the initial setting step 411) to the next step (the material setting step 412). Upon manipulation of the step transition interface 89, the processor 210 (151) makes a determination, via the setting interface, as to whether all of the setting-information corresponding to the setting step (the initial setting step 411) has been set. When, at the time when the step transition interface 89 is manipulated, the determination is that not all of the setting-information corresponding to the setting step (the initial setting step 411) has been set (No at step S8), the transition to the next step (the material setting step 412) is not permitted. Specifically, the display 240 (154) makes an error display, requesting the document file to be re-set or the 3D CAD file of the product to be re-set (step S9). After the end of step S9, the procedure returns to step S8. When all of the setting-information corresponding to the initial setting step 411 has been set (Yes at step S8), the procedure proceeds to step S10.

Figure 6:
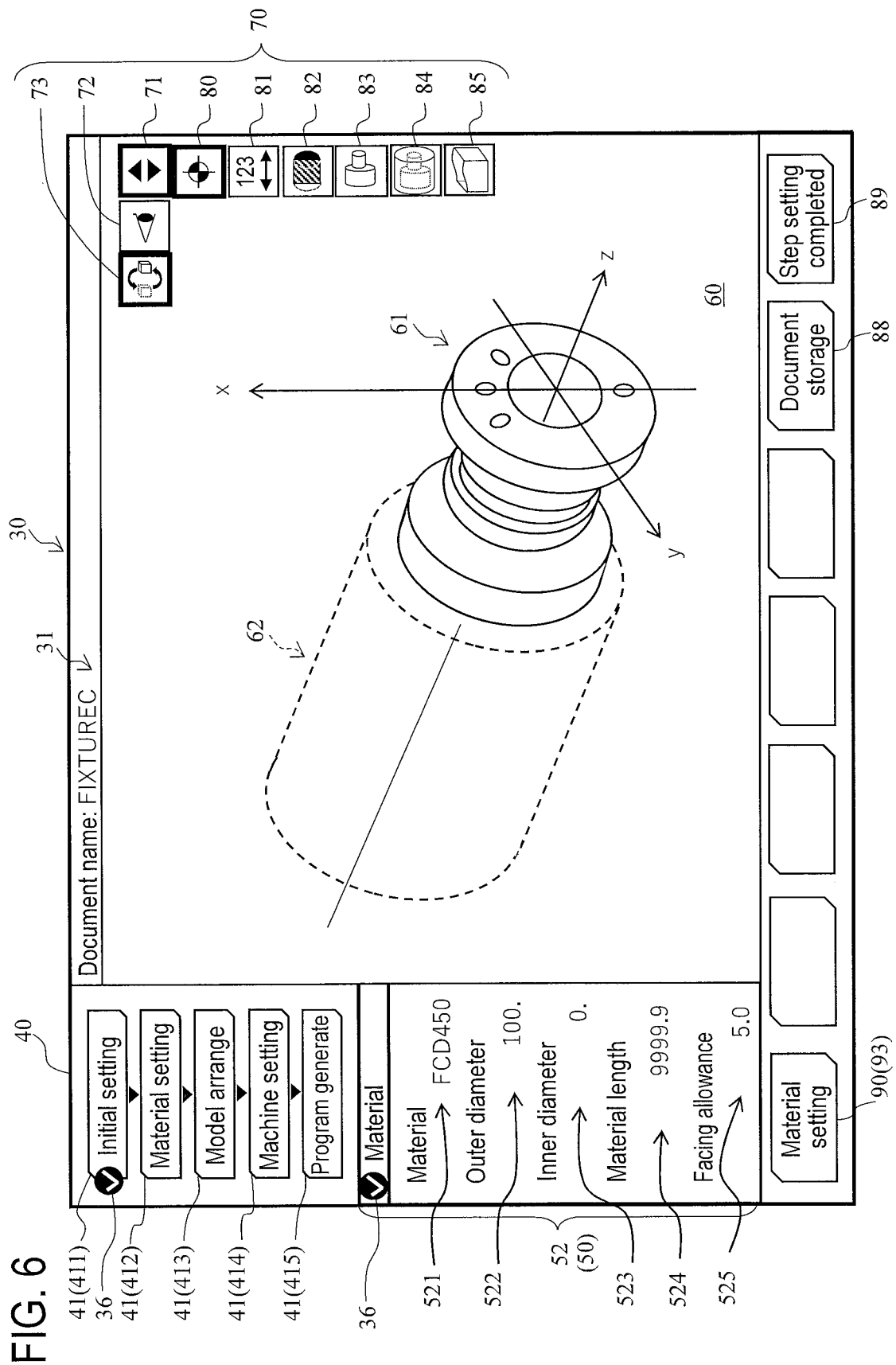
FIG. 6 illustrates an example display screen of a material setting step.

At step S10, when the determination is that all of the setting-information corresponding to the setting step (the initial setting step 411) has been set, the processor 210 (151) performs processing of displaying the information 36 indicating that the setting in the setting step is completed. When the determination is that all of the setting-information corresponding to the setting step (the initial setting step 411) has been set, the display 240 (154) displays the information 36 indicating that the setting in the setting step is completed. Specifically, as illustrated in FIG. 6, in the display screen associated with the material setting step 412, the information 36 is displayed on the button 41 for the initial setting step 411 in the step status display window 40. Next, at step S11, the processor 210 (151) selects, from the plurality of steps, a setting step whose setting-information should be set. At step S11, the processor 210 (151) selects the material setting step 412 as the setting step.

At step S12, the processor 210 (151) performs processing of displaying the call interface 90, which is for calling the setting interface 300. The display 240 (154) displays the call interface 90, which is for calling the setting interface 300. Specifically, at the material setting step 412, the processor 210 (151) performs processing of displaying a material setting call interface 93, which is for calling a material setting interface. While in FIG. 6 the material setting call interface 93 is displayed in button form, this interface may be displayed in any other GUI form.

The material setting interface is an interface for searching for and selecting a material and shape of the workpiece from the material information 161, or for registering a new material and shape in the material information 161. The material setting interface is a user interface equivalent to a typical list box in which selection and addition of items can be made, and will not be elaborated upon by way of illustration. In the material setting interface, at least the following parameters are displayed in a selectable manner: a material name 521, an outer diameter 522, an inner diameter 523, and a material length 524. Also in the material setting interface, a new material name 521, a new outer diameter 522, a new inner diameter 523, a new material length 524, and a new facing allowance 525 can be registered.

At step S13, the processor 210 (151) performs processing of displaying the setting interface 300 for setting setting-information corresponding to the setting step (the material setting step 412). The display 240 (154) displays the setting interface 300 for setting the setting-information corresponding to the setting step (the material setting step 412) which has been selected from the plurality of steps and whose setting-information should be set. When the setting-information associated with the setting step is not set yet, the processor 210 (151) performs processing of automatically displaying the setting interface 300. When the setting-information associated with the setting step is not set yet, the display 240 (154) automatically displays the setting interface 300. Thus, at step S13, when a material and shape of the workpiece is not set yet, the processor 210 (151) performs processing of automatically displaying the material setting interface. When a material and shape of the workpiece is not set yet, the display 240 (154) automatically displays the material setting interface. When a material and shape of the workpiece is already set, the material setting interface may be called by the material setting call interface 93. At step S14, the processor 210 (151) receives the setting of the material and shape of the workpiece via the material setting interface.

At step S14, the processor 210 (151) sets 3D data of the workpiece via the material setting interface. As illustrated in FIG. 6, the processor 210 (151) performs processing of displaying a computer graphics image (the 3D model display window 60) that represents a shape of the workpiece (the workpiece model 62) and a shape of the product (the product model 61) and that corresponds to the setting step (the material setting step 412). The display 240 (154) displays the computer graphics image (the 3D model display window 60) that represents the shape of the workpiece (the workpiece model 62) and the shape of the product (the product model 61) and that corresponds to the setting step. In FIG. 6, the product model 61 is indicated by solid lines, and the workpiece model 62 is indicated by dotted lines. The manner of indication, however, will not be limited to the manner illustrated in FIG. 6. The product model 61 and the workpiece model 62 may be wire frames or solid models. Otherwise, the workpiece model 62 may be a solid model displayed in a semi-transparent manner. The processor 210 (151) performs processing of displaying the setting status (the setting step status display window 50) of the setting-information associated with the setting step. The display 240 (154) displays the setting status (the setting step status display window 50) of the setting-information associated with the setting step. In FIG. 6, the setting step status display window 50 is displaying the setting status 52 of the material setting step 412. Specifically, the setting step status display window 50 is displaying the material name 521, the outer diameter 522, the inner diameter 523, the material length 524, and the facing allowance 525. Further, the setting step status display window 50 displays the information 36 indicating that the setting of the material and shape of the workpiece is completed.

At step S15, the processor 210 (151) performs processing of displaying the step transition interface 89, which is for a transition from the setting step (the material setting step 412) to the next step (the model arrangement step 413). The display 240 (154) displays the step transition interface 89, which is for the transition from the setting step (the material setting step 412) to the next step (the model arrangement step 413). Upon manipulation of the step transition interface 89, the processor 210 (151) makes a determination, via the setting interface, as to whether all of the setting-information corresponding to the setting step (the material setting step 412) has been set. When, at the time when the step transition interface 89 is manipulated, the determination is that not all of the setting-information corresponding to the setting step (the material setting step 412) has been set (No at step S15), the transition to the next step (the model arrangement step 413) is not permitted. Specifically, the display 240 (154) makes an error display, making the procedure return to step S12. When all of the setting-information corresponding to the material setting step 412 has been set (Yes at step S15), the procedure proceeds to step S16.

Figure 7:
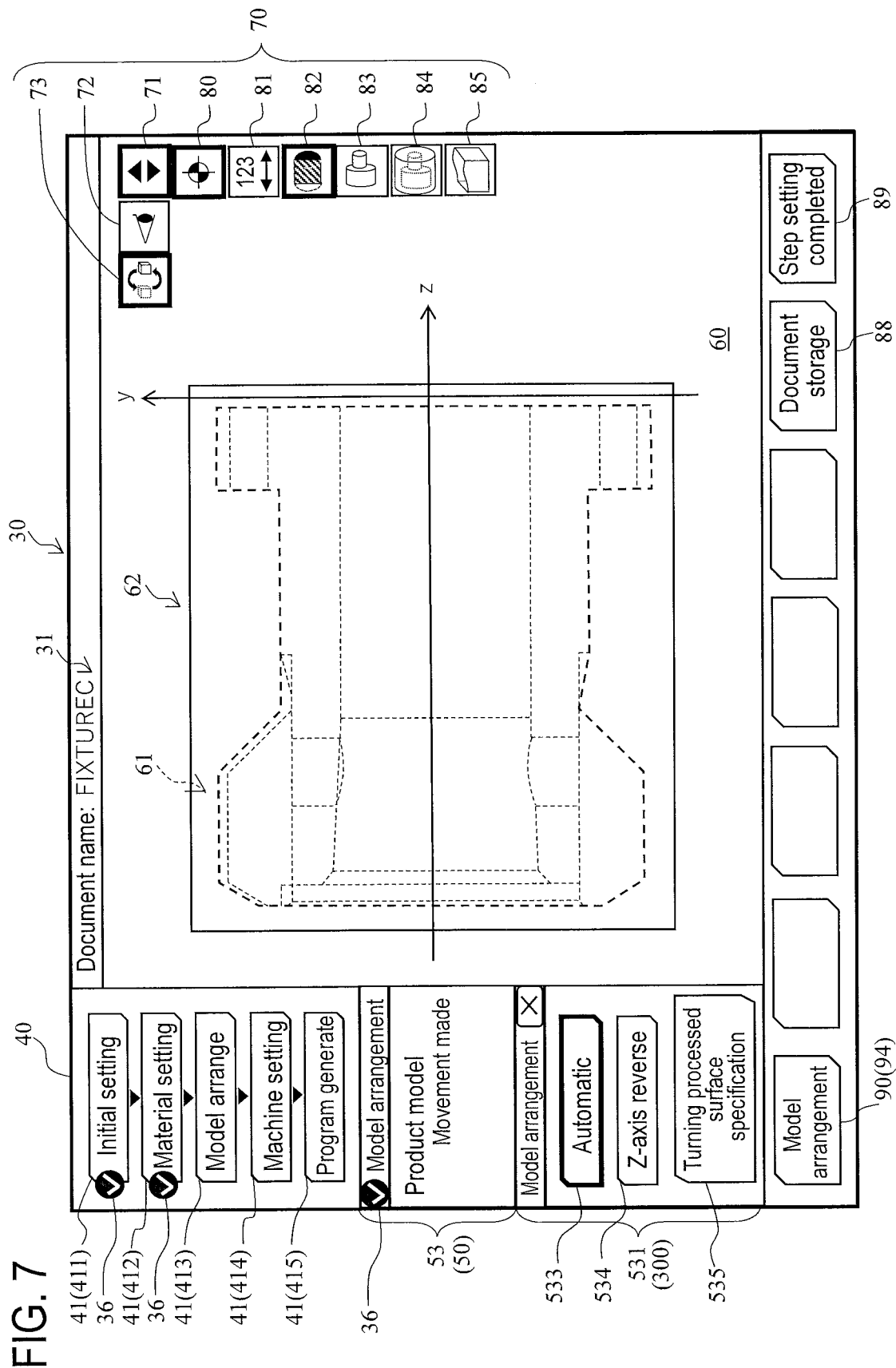
FIG. 7 illustrates an example display screen of a model arrangement step.
Figure 8:
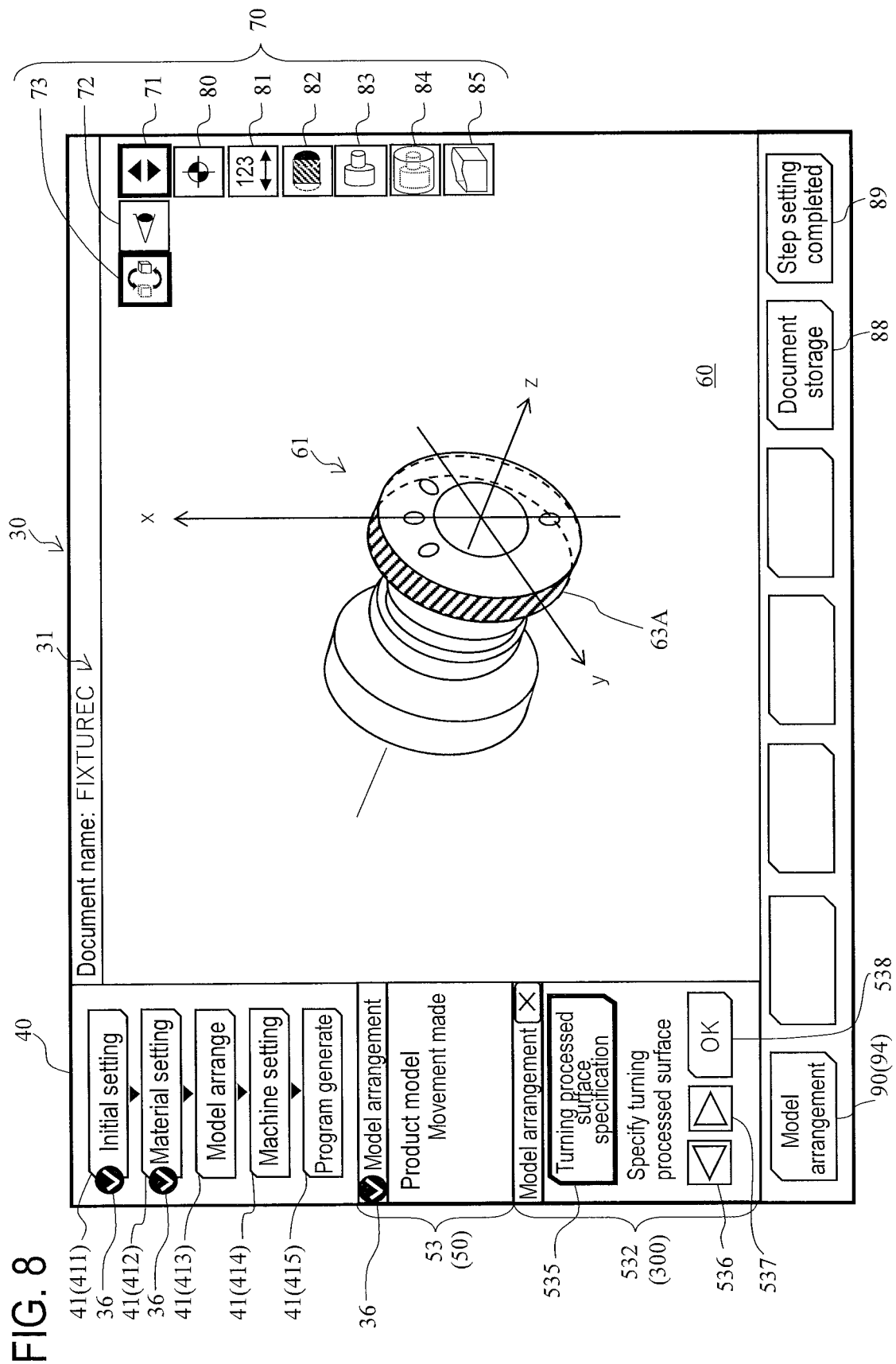
FIG. 8 illustrates an example display screen of a model arrangement step.

At step S16, when the determination is that all of the setting-information corresponding to the setting step (the material setting step 412) has been set, the processor 210 (151) performs processing of displaying the information 36 indicating that the setting in the setting step is completed. When the determination is that all of the setting-information corresponding to the setting step (the material setting step 412) has been set, the display 240 (154) displays the information 36 indicating that the setting in the setting step is completed. Specifically, as illustrated in FIGS. 7 and 8, in the display screen associated with the model arrangement step 413, the information 36 is displayed on the button 41 for the material setting step 412 in the step status display window 40. Next, at step S17, the processor 210 (151) selects, from the plurality of steps, a setting step whose setting-information should be set. At step S17, the processor 210 (151) selects the model arrangement step 413 as the setting step.

At step S18, the processor 210 (151) performs processing of displaying the call interface 90, which is for calling the setting interface 300. The display 240 (154) displays the call interface 90, which is for calling the setting interface 300. Specifically, at the model arrangement step 413, the processor 210 (151) performs processing of displaying a model arrangement call interface 94, which is for calling a model arrangement interface 531. The model arrangement interface 531 is an interface for setting information for identifying a part of the workpiece which the product occupies. While in FIGS. 7 and 8 the model arrangement call interface 94 is displayed in button form, this interface may be displayed in any other GUI form.

At step S19, the processor 210 (151) performs processing of displaying the setting interface 300 for setting setting-information corresponding to the setting step (the model arrangement step 413). The display 240 (154) displays the setting interface 300 for setting the setting-information corresponding to the setting step (the model arrangement step 413) which has been selected from the plurality of steps and whose setting-information should be set. When the setting-information associated with the setting step is not set yet, the processor 210 (151) performs processing of automatically displaying the setting interface 300. When the setting-information associated with the setting step is not set yet, the display 240 (154) automatically displays the setting interface 300. Thus, at step S19, when the information for identifying the part of the workpiece which the product occupies is not set yet, the processor 210 (151) performs processing of automatically displaying the model arrangement interface 531. When the information for identifying the part of the workpiece which the product occupies is not set yet, the display 240 (154) automatically displays the model arrangement interface 531. When the information for identifying the part of the workpiece which the product occupies is already set, the model arrangement interface 531 may be called by the model arrangement call interface 94.

FIG. 7 is a display example of the display screen 30 in which the model arrangement interface 531 is displayed. As illustrated in FIG. 7, the model arrangement interface 531 includes an automatic arrangement setting interface 533, a Z-axis reverse setting interface 534, and a turning processed surface specifying interface 535. While in FIG. 7 the automatic arrangement setting interface 533, the Z-axis reverse setting interface 534, and the turning processed surface specifying interface 535 are displayed in button form, these interfaces may be displayed in any other GUI form, such as drop-down list form.

Upon manipulation of the automatic arrangement setting interface 533 by way of an operation such as tapping and mouse-clicking, the product model 61 is positioned approximately at the center of the workpiece model 62. For example, the processor 210 (151) extracts, from 3D data of the product model 61, a cylinder shape surface or a truncated cone surface of the maximum diameter of the product model 61. Then, the processor 210 (151) arranges the product model 61 and the workpiece model 62 so that the center axis of the cylinder shape surface or the truncated cone surface and the center axis of the workpiece model 62, which has a column shape, match the Z axis of the workpiece coordinate system. The 3D model display window 60 illustrated in FIG. 7 illustrates an example in which the product model 61 and the workpiece model 62 are provided in the above-described arrangement. In FIG. 7, the workpiece model 62 is indicated by solid lines, and the product model 61 is indicated by dotted lines. The manner of indication, however, will not be limited to the manner illustrated in FIG. 7. The product model 61 and the workpiece model 62 may be wire frames or solid models. Also, the workpiece model 62 may be a solid model displayed in a semi-transparent manner. Upon manipulation of the Z-axis reverse setting interface 534 by way of an operation such as tapping and mouse-clicking, the product model 61 is reversed in the 3D model display window 60 in a direction along the Z axis of the workpiece coordinate system.

Upon manipulation of the turning processed surface specifying interface 535 by way of an operation such as tapping and mouse-clicking, a turning processed surface input interface 532 is displayed, as illustrated in FIG. 8. When the turning processed surface input interface 532 is displayed, the workpiece model 62 disappears from the 3D model display window 60. In the automatic arrangement setting interface 533, arrangements are made based on a cylinder shape surface or a truncated cone surface of the maximum diameter of the product model 61. When a turning is performed based on the center axis of another cylinder shape surface or another truncated cone surface, the turning processed surface input interface 532 is used. Otherwise, a combination of the Z-axis reverse setting interface 534 and the turning processed surface specifying interface 535 may be used. In FIG. 8, upon selection of, by way of an operation such as tapping and mouse-clicking, a surface of the product model 61 displayed on the 3D model display window 60, the processor 210 (151) performs processing of emphasizing the selected surface when the selected surface is a cylinder shape surface or a truncated cone surface. In FIG. 8, a machining processed surface 63A is selected and emphasized. In this state, upon manipulation of an OK button 538 of the turning processed surface input interface 532 by way of an operation such as tapping and mouse-clicking, the product model 61 is arranged so that the center axis of the selected machining processed surface 63A matches the Z axis of the workpiece coordinate system. At the same time, the workpiece model 62 is arranged so that the center axis of the workpiece model 62, which has a column shape, matches the Z axis of the workpiece coordinate system. Then, the turning processed surface input interface 532 is changed to the model arrangement interface 531.

Upon manipulation of an arrow button 536 by way of an operation such as tapping and mouse-clicking, cylinder surfaces or truncated cone surfaces of the product model 61 are selected one by one sequentially from the previously selected surface in a direction toward this side of the 3D model display window 60. Upon manipulation of an arrow button 537 by way of an operation such as tapping and mouse-clicking, cylinder surfaces or truncated cone surfaces of the product model 61 are selected one by one sequentially from the previously selected surface in a direction toward the far side of the 3D model display window 60. The 3D model display window 60 displays a two-dimensional image, as seen from a predetermined viewpoint, of the product model 61, which is a three-dimensional model defined in a three-dimensional imaginary space by computer graphics. A direction toward the viewpoint is the direction toward this side of the 3D model display window 60, and a direction away from the viewpoint is the direction toward the far side of the 3D model display window 60. Upon manipulation of the turning processed surface specifying interface 535 by way of an operation such as tapping and mouse-clicking with the turning processed surface input interface 532 in displayed state, none of the surfaces of the product model 61 is selected, and the turning processed surface input interface 532 is changed to the model arrangement interface 531.

At step S20, the processor 210 (151) sets information for identifying a part of the workpiece which the product occupies. As illustrated in FIGS. 7 and 8, the processor 210 (151) performs processing of displaying a computer graphics image (the 3D model display window 60) that represents at least one of the shape of the workpiece (the workpiece model 62) and the shape of the product (the product model 61) and that corresponds to the setting step (the model arrangement step 413). The display 240 (154) displays the computer graphics image (the 3D model display window 60) that represents at least one of the shape of the workpiece (the workpiece model 62) and the shape of the product (the product model 61) and that corresponds to the setting step. The processor 210 (151) performs processing of displaying the setting status (the setting step status display window 50) of the setting-information associated with the setting step. The display 240 (154) displays the setting status (the setting step status display window 50) of the setting-information associated with the setting step. In FIGS. 7, 8, the setting step status display window 50 is displaying a setting status 53 of the model arrangement step 413. FIGS. 7 and 8 illustrate a state in which the automatic arrangement setting interface 533 is manipulated, and its content is displayed as the setting status 53. Further, in FIGS. 7 and 8, the setting step status display window 50 is displaying the information 36 indicating that the model arrangement setting is completed.

At step S21, the processor 210 (151) performs processing of displaying the step transition interface 89, which is for a transition from the setting step (the model arrangement step 413) to the next step (the machining setting step 414). The display 240 (154) displays the step transition interface 89, which is for the transition from the setting step (the model arrangement step 413) to the next step (the machining setting step 414). Upon manipulation of the step transition interface 89, the processor 210 (151) makes a determination, via the setting interface, as to whether all of the setting-information corresponding to the setting step (the model arrangement step 413) has been set. When, at the time when the step transition interface 89 is manipulated, the determination is that not all of the setting-information corresponding to the setting step (the model arrangement step 413) has been set (No at step S21), the transition to the next step (the machining setting step 414) is not permitted. Specifically, the display 240 (154) makes an error display, making the procedure return to step S18. When all of the setting-information corresponding to the model arrangement step 413 has been set (Yes at step S21), the procedure proceeds to step S22 illustrated in FIG. 20.

When, at step S22 in FIG. 20, the determination is that all of the setting-information corresponding to the setting step (the model arrangement step 413) has been set, the processor 210 (151) performs processing of displaying the information 36 indicating that the setting in the setting step is completed. When the determination is that all of the setting-information corresponding to the setting step (the model arrangement step 413) has been set, the display 240 (154) displays the information 36 indicating that the setting in the setting step is completed. Specifically, as illustrated in FIG. 4, the information 36 is displayed on the button 41 for the model arrangement step 413 in the step status display window 40. Next, at step S23, the processor 210 (151) selects, from the plurality of steps, a setting step whose setting-information should be set. At step S23, the processor 210 (151) selects the machining setting step 414 as the setting step.

At step S24, the processor 210 (151) performs processing of displaying the call interface 90, which is for calling the setting interface 300. The display 240 (154) displays the call interface 90, which is for calling the setting interface 300. Specifically, at the machining setting step 414, the processor 210 (151) performs processing of displaying: the process segmentation setting call interface 95, which is for calling the process segmentation setting interface 541; and the machining attribute setting call interface 96, which is for calling the machining attribute setting interface 551. While in FIG. 4 the process segmentation setting call interface 95 and the machining attribute setting call interface 96 are displayed in button form, these interfaces may be displayed in any other GUI form.

The process segmentation setting interface 541 is an interface for setting a process segmentation, which is to segment the process of machining the workpiece W1 into: a first step of machining the workpiece W1 with the workpiece W1 held by the first spindle 122 and with the blade of the turning tool facing the first spindle 122; and a second step of machining a workpiece W2 with the workpiece W2 held by the second spindle 123 and with the blade of the turning tool facing the second spindle 123. The machining attribute setting interface 551 is an interface for specifying machining attributes such as the surface rough of a surface of the product and a method for machining the surface.

At step S25, the processor 210 (151) performs processing of displaying the setting interface 300 for setting setting-information corresponding to the setting step (the process segmentation sub-step 451 of the machining setting step 414). The display 240 (154) displays the setting interface 300 for setting the setting-information corresponding to the setting step (the process segmentation sub-step 451 of the machining setting step 414) which has been selected from the plurality of steps and whose setting-information should be set. When the setting-information associated with the setting step is not set yet, the processor 210 (151) performs processing of automatically displaying the setting interface 300. When the setting-information associated with the setting step is not set yet, the display 240 (154) automatically displays the setting interface 300. Thus, at step S25, when the first step and the second step are not set yet, the processor 210 (151) performs processing of automatically displaying the process segmentation setting interface 541. When the first step and the second step are not set yet, the display 240 (154) automatically displays the process segmentation setting interface 541. When the first step and the second step are already set, the process segmentation setting interface 541 may be called by the process segmentation setting call interface 95.

FIG. 4 illustrates an example in which the process segmentation setting interface 541 is displayed in the 3D model display window 60 in GUI form. FIG. 4 illustrates an initial setting status of the process segmentation seen immediately after the process segmentation setting interface 541 appears. The 3D model display window 60 displays an exterior reference segmentation position 64, a first exterior machining end 65, a second exterior machining end 66, an interior reference segmentation position 67, a first interior machining end 68, and a second interior machining end 69. When the workpiece has no through hole having a center axis extending along the workpiece coordinate system Z axis, the interior reference segmentation position 67, the first interior machining end 68, and the second interior machining end 69 are not displayed.

The exterior reference segmentation position 64 indicates a reference segmentation position between: a first exterior machining region Re1 of the exterior surface of the workpiece, which is subjected to turning at the first step; and a second exterior machining region Re2 of the exterior surface of the workpiece, which is subjected to turning at the second step. It is to be noted, however, that if the first exterior machining region Re1 and the second exterior machining region Re2 are segmented at the exterior reference segmentation position 64, an un-machined portion may be left in the vicinity of the exterior reference segmentation position 64, because of roundness of the cutting edge of the turning tool. In light of this, in order to prevent an un-machined portion from occurring, the first exterior machining region Re1 and the second exterior machining region Re2 are specified such that they partially overlap each other. The first exterior machining end 65 is the end of the first exterior machining region Re1 closer to the first spindle 122, and is provided at a position shifted from the exterior reference segmentation position 64 by a first exterior margin Me1 in the Z axis negative direction of the workpiece coordinate system. The first exterior machining region Re1 is a region defined between the first exterior machining end 65 and a second end E2 of the workpiece (which is the portion held by the second chuck 125 of the second spindle 123). The second exterior machining end 66 is the end of the second exterior machining region Re2 closer to the second spindle 123, and is provided at a position shifted from the exterior reference segmentation position 64 by a second exterior margin Me2 in the Z axis positive direction of the workpiece coordinate system. The second exterior machining region Re2 is a region defined between the second exterior machining end 66 and a first end E1 of the workpiece (which is the portion held by the first chuck 124 of the first spindle 122).

The interior reference segmentation position 67 indicates a reference segmentation position between: a first interior machining region Ri1 of the interior surface of the workpiece, which is subjected to turning at the first step; and a second interior machining region Ri2 of the interior surface of the workpiece, which is subjected to turning at the second step. It is to be noted, however, that if the first interior machining region Ri1 and the second interior machining region Ri2 are segmented at the interior reference segmentation position 67, an un-machined portion may be left in the vicinity of the interior reference segmentation position 67, because of roundness of the cutting edge of the turning tool. Thus, in order to prevent an un-machined portion from occurring, the first interior machining region Ri1 and the second interior machining region Ri2 are specified such that they partially overlap each other. The first interior machining end 68 is the end of the first interior machining region Ri1 closer to the first spindle 122, and is provided at a position shifted from the interior reference segmentation position 67 by a first interior margin Mi1 in the Z axis negative direction of the workpiece coordinate system. The first interior machining region Rif is a region defined between the first interior machining end 68 and the second end E2 of the workpiece. The second interior machining end 69 is the end of the second interior machining region Ri2 closer to the second spindle 123, and is provided at a position shifted from the interior reference segmentation position 67 by a second interior margin Mi2 in the Z axis positive direction of the workpiece coordinate system. The second interior machining region Ri2 is a region defined between the second interior machining end 69 and the first end E1 of the workpiece.

It is to be noted that the symbols, numbers, their leading lines, coordinate axes, and dimension lines associated with the 3D model display window 60 illustrated in FIG. 4 are provided by way of description, and may not necessarily be displayed in the 3D model display window 60 in actual situations. It is also to be noted that the exterior reference segmentation position 64, the first exterior machining end 65, the second exterior machining end 66, the interior reference segmentation position 67, the first interior machining end 68, and the second interior machining end 69 may not necessarily be displayed by dotted lines or single-dashed lines, but may be displayed by lines of different colors. It is also to be noted that the first exterior margin Me1, the second exterior margin Me2, the first interior margin Mi1, and the second interior margin Mi2 may be displayed in stripe patterns. The product model 61 is preferably displayed in a cross-sectional view cut on a plane including the Z axis of the workpiece coordinate system, and the workpiece model 62 is preferably displayed in a semi-transparent manner or in a wire frame, in which case only an exterior shape of the workpiece model 62 is displayed.

In the initial setting status of the process segmentation, the exterior reference segmentation position 64 is automatically determined as a position at which the amount of machining of the first exterior machining region Re1 and the amount of machining of the second exterior machining region Re2 are equal to each other. The interior reference segmentation position 67 is automatically determined as a position at which the amount of machining of the first interior machining region Ri1 and the amount of machining of the second interior machining region Ri2 are equal to each other. The first exterior margin Me1, the second exterior margin Me2, the first interior margin Mi1, and the second interior margin Mi2 are determined as default values determined in advance by the user. The user is able to, on the 3D model display window 60: select the exterior reference segmentation position 64, the first exterior machining end 65, the second exterior machining end 66, the interior reference segmentation position 67, the first interior machining end 68, and the second interior machining end 69 by manipulating any of the lines indicating these items by way of an operation such as double tapping and mouse-clicking; and move the selected item to a desired position by drugging the selected item. It is to be noted that in order to ensure that the first exterior margin Me1 and the second exterior margin Me2 are set at identical values, when one of the first exterior machining end 65 and the second exterior machining end 66 is moved, the other end may be moved accordingly. Similarly, when one of the first interior machining end 68 and the second interior machining end 69 is moved, the other end may be moved accordingly.

It is also possible to, on the 3D model display window 60, specify a surface of the product by way of an operation such as tapping and mouse-clicking after selecting any of the lines indicating the exterior reference segmentation position 64, the first exterior machining end 65, the second exterior machining end 66, the interior reference segmentation position 67, the first interior machining end 68, and the second interior machining end 69, thereby moving the selected line to the position of the specified surface. It is also to be noted that the process segmentation setting interface 541 may be embodied in any other various forms than the above-described form. For example, the process segmentation setting interface 541 may include a window including at least one of: an arrow key for manipulating movement of at least one of the exterior reference segmentation position 64, the first exterior machining end 65, the second exterior machining end 66, the interior reference segmentation position 67, the first interior machining end 68, and the second interior machining end 69; an edit box for inputting the amount of the movement; a form in which the values of the exterior reference segmentation position 64 and the interior reference segmentation position 67 on the Z coordinate of the workpiece coordinate system can be input; a form in which at least one value of the first exterior margin Me1 and the second exterior margin Me2 can be input; and a form in which at least one value of the first interior margin Mi1 and the second interior margin Mi2 can be input. Thus, the process segmentation setting interface 541 may be any interface insofar as the exterior reference segmentation position 64, the first exterior machining end 65, the second exterior machining end 66, the interior reference segmentation position 67, the first interior machining end 68, and the second interior machining end 69 can be determined on the interface.

At step S26, the processor 210 (151) sets information for identifying the process segmentation set in the above-described manner on the process segmentation setting interface 541. As illustrated in FIG. 4, the processor 210 (151) performs processing of displaying a computer graphics image (the 3D model display window 60) that represents the shape of the workpiece (the workpiece model 62) and the shape of the product (the product model 61) and that corresponds to the setting step (the process segmentation sub-step 451 of the machining setting step 414). The display 240 (154) displays the computer graphics image (the 3D model display window 60) that represents at least one of the shape of the workpiece (the workpiece model 62) and the shape of the product (the product model 61) and that corresponds to the setting step. The processor 210 (151) performs processing of displaying the setting status (the setting step status display window 50) of the setting-information associated with the setting step. The display 240 (154) displays the setting status (the setting step status display window 50) of the setting-information associated with the setting step. In FIG. 4, the setting step status display window 50 is displaying the setting status 54 of the process segmentation sub-step 451. The setting step status display window 50 shows that the exterior reference segmentation position 64 and the interior reference segmentation position 67 are automatically set, and that the first exterior margin Me1, the second exterior margin Me2, the first interior margin Mi1, and the second interior margin Mi1 are automatically set.

Further in FIG. 4, the setting step status display window 50 displays the information 36 indicating that the process segmentation sub-step 451 is completed. It is to be noted, however, that when, after the process segmentation sub-step, the buttons 41 for the initial setting step 411, the material setting step 412, and the model arrangement step 413 are manipulated and new settings are made in the initial setting step 411, the material setting step 412, and the model arrangement step 413, then the setting step status display window 50 may display the information 37 as a caution mark indicating that a setting is being made. It is also to be noted that when an improper manual setting is made in the initial setting status of the process segmentation (for example, the exterior reference segmentation position 64 is not provided between the first exterior machining end 65 and the second exterior machining end 66, or the interior reference segmentation position 67 is not provided between the first interior machining end 68 and the second interior machining end 69), then the setting step status display window 50 may likewise display the information 37 as a caution mark indicating that a setting is being made.

Figure 21:
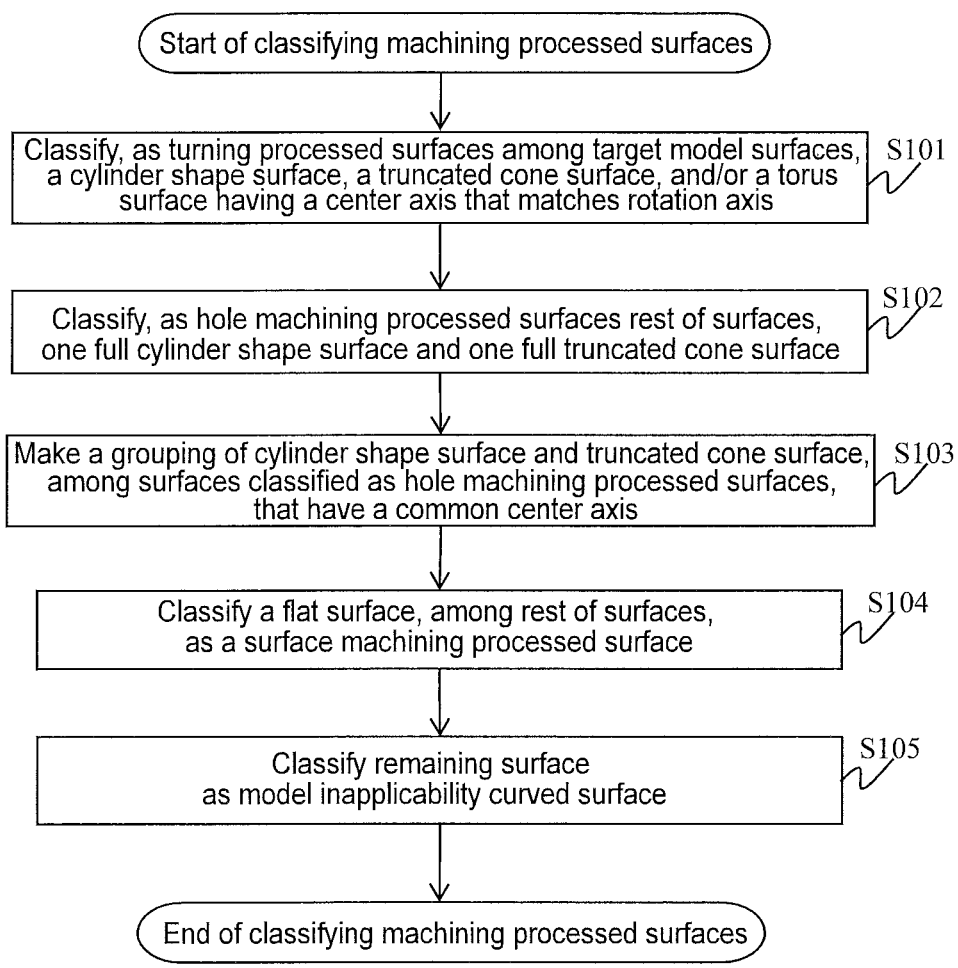
FIG. 21 is a flowchart of a classification method for classifying machining processed surfaces of a product model.

The end of the process segmentation sub-step 451 is determined by manipulating the machining attribute setting call interface 96 by way of an operation such as tapping and mouse-clicking. Another possible example is that the process segmentation setting interface 541 includes an additional window, and that upon detection of a pressing of an OK button in the window, this is determined as the end of the process segmentation sub-step 451. At the time when the process segmentation sub-step 451 is determined as being ended, the positions of the exterior reference segmentation position 64, the first exterior machining end 65, the second exterior machining end 66, the interior reference segmentation position 67, the first interior machining end 68, and the second interior machining end 69 at this time are determined as information for finally identifying the process segmentation. Next, at step S27 in FIG. 20, the machining processed surfaces of the product model 61 extracted from the 3D data of the product model 61 are classified. The step S27 may not necessarily be performed after step S26 but may be performed at any timing after step S20 and before step S28. FIG. 21 is a flowchart of a classification method for classifying the machining processed surfaces of the product model 61.

At step S101, when, among the surfaces of the product model 61, there are a cylinder shape surface, a truncated cone surface, and/or a torus surface having a center axis that matches the rotation axis (the rotation axis A3), the processor 210 (151) classifies these surfaces as turning processed surfaces. At step S102, the processor 210 (151) classifies, among the rest of the surfaces of the product model 61, one full cylinder shape surface and one full truncated cone surface as hole machining processed surfaces. At step S102, the processor 210 (151) determines, from the solid model of the product model 61, whether the interior of a cylinder shape defined by the cylinder shape surface is hollow and whether the interior of a truncated cone defined by the truncated cone surface is hollow. When the interiors are hollow, the processor 210 (151) classifies the one full cylinder shape surface and the one full truncated cone surface as hole machining processed surfaces. At step S103, the processor 210 (151) makes a grouping of a cylinder shape surface and a truncated cone surface, among the surfaces classified as hole machining processed surfaces, that have a common center axis. At step S104, the processor 210 (151) classifies, among the rest of the surfaces of the product model 61, a flat surface as a surface machining processed surface. At step S105, the processor 210 (151), lastly, classifies the remaining surface(s) of the product as a model inapplicability curved surface(s).

Referring again to FIG. 20, at step S28, the processor 210 (151) performs processing of displaying the setting interface 300 for setting setting-information corresponding to the setting step (the machining attribute setting sub-step 452 of the machining setting step 414). The display 240 (154) displays the setting interface 300 for setting the setting-information corresponding to the setting step (the machining attribute setting sub-step 452 of the machining setting step 414) which has been selected from the plurality of steps and whose setting-information should be set. Specifically, the processor 210 (151) performs processing of displaying the machining attribute setting interface 551 via the machining attribute setting call interface 96. The display 240 (154) displays the machining attribute setting interface 551 via the machining attribute setting call interface 96.

Figure 12:
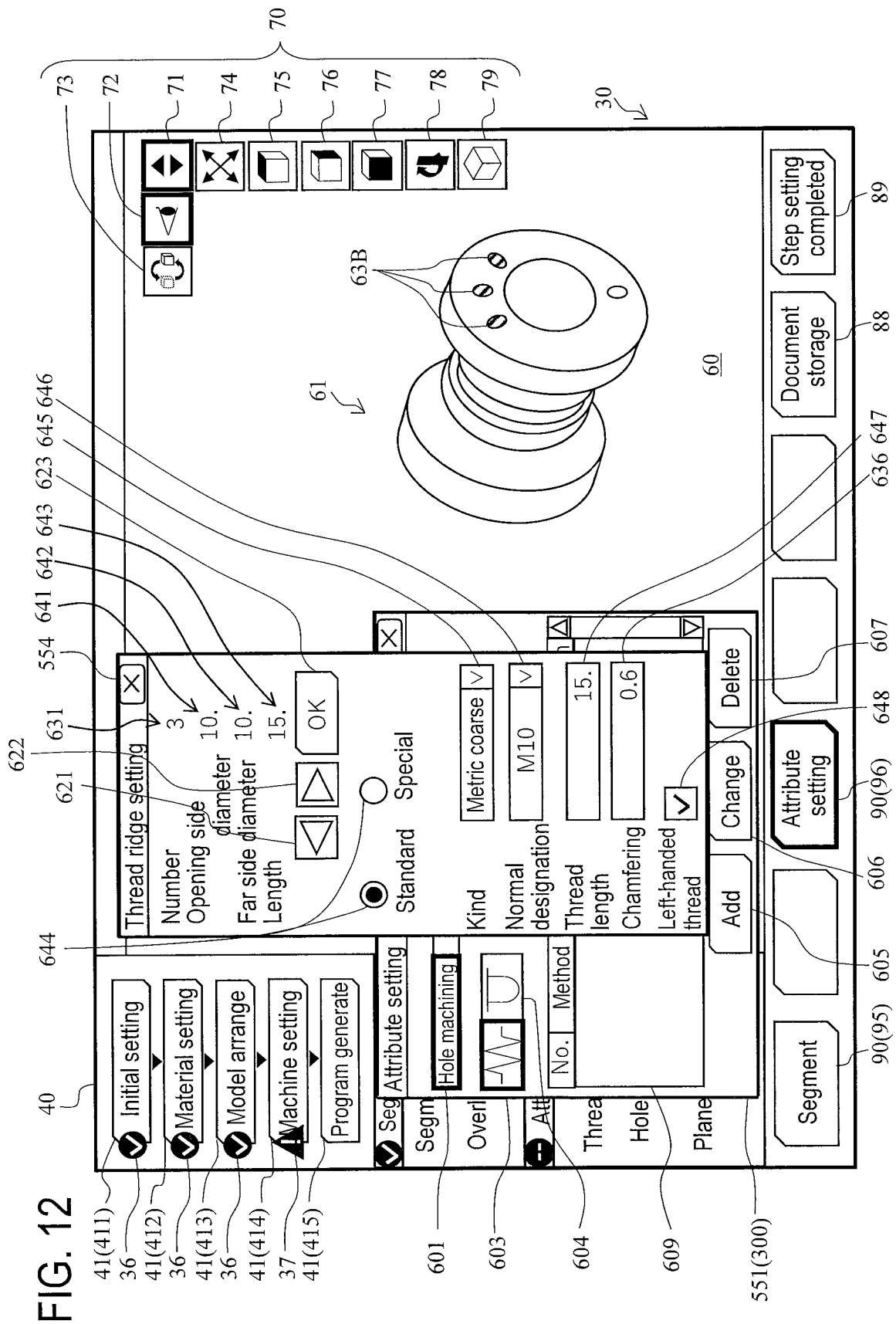
FIG. 12 illustrates an example display screen of a machining attribute setting sub-step.
Figure 13:
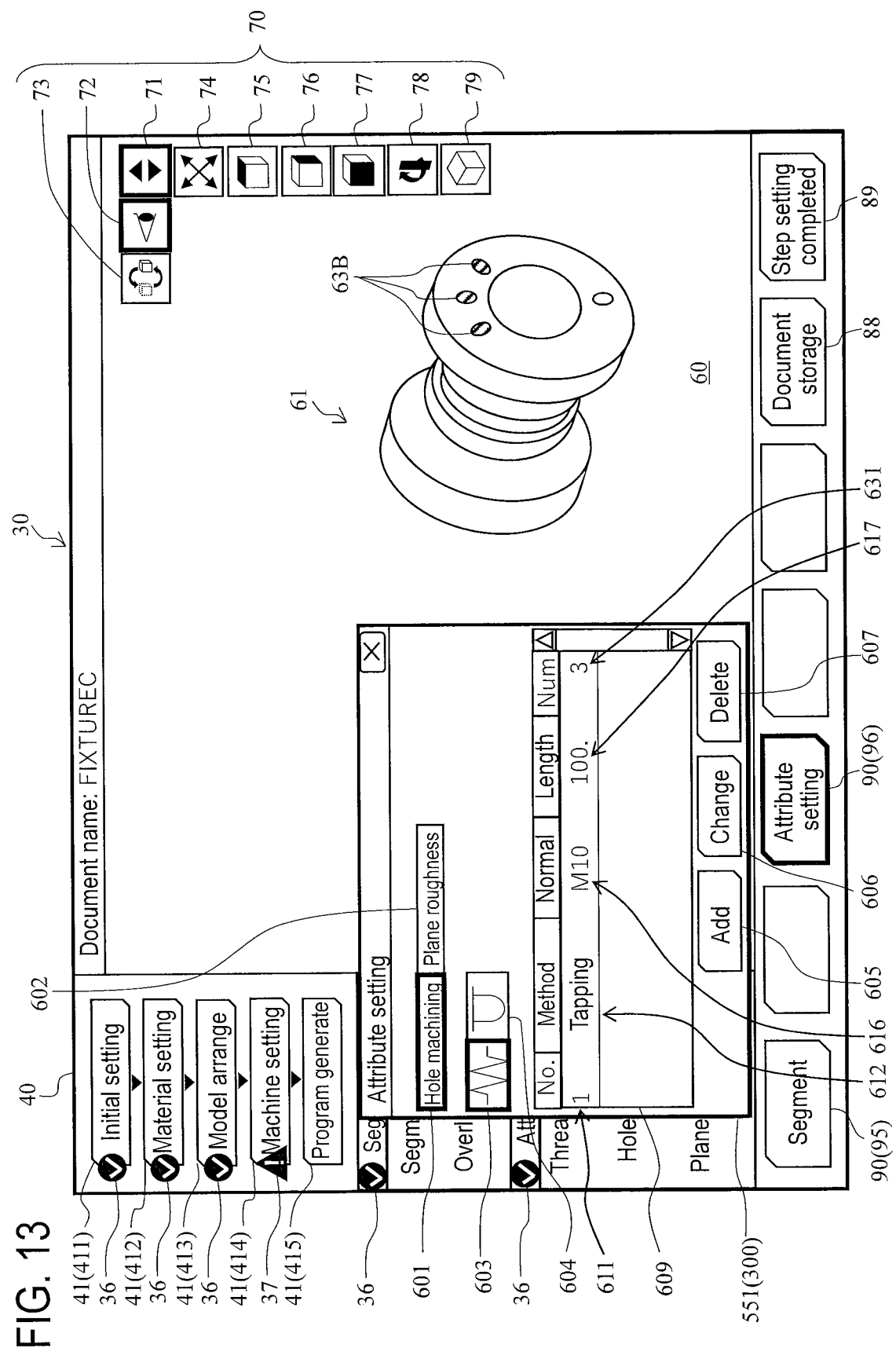
FIG. 13 illustrates an example display screen of a machining attribute setting sub-step.
Figure 14:
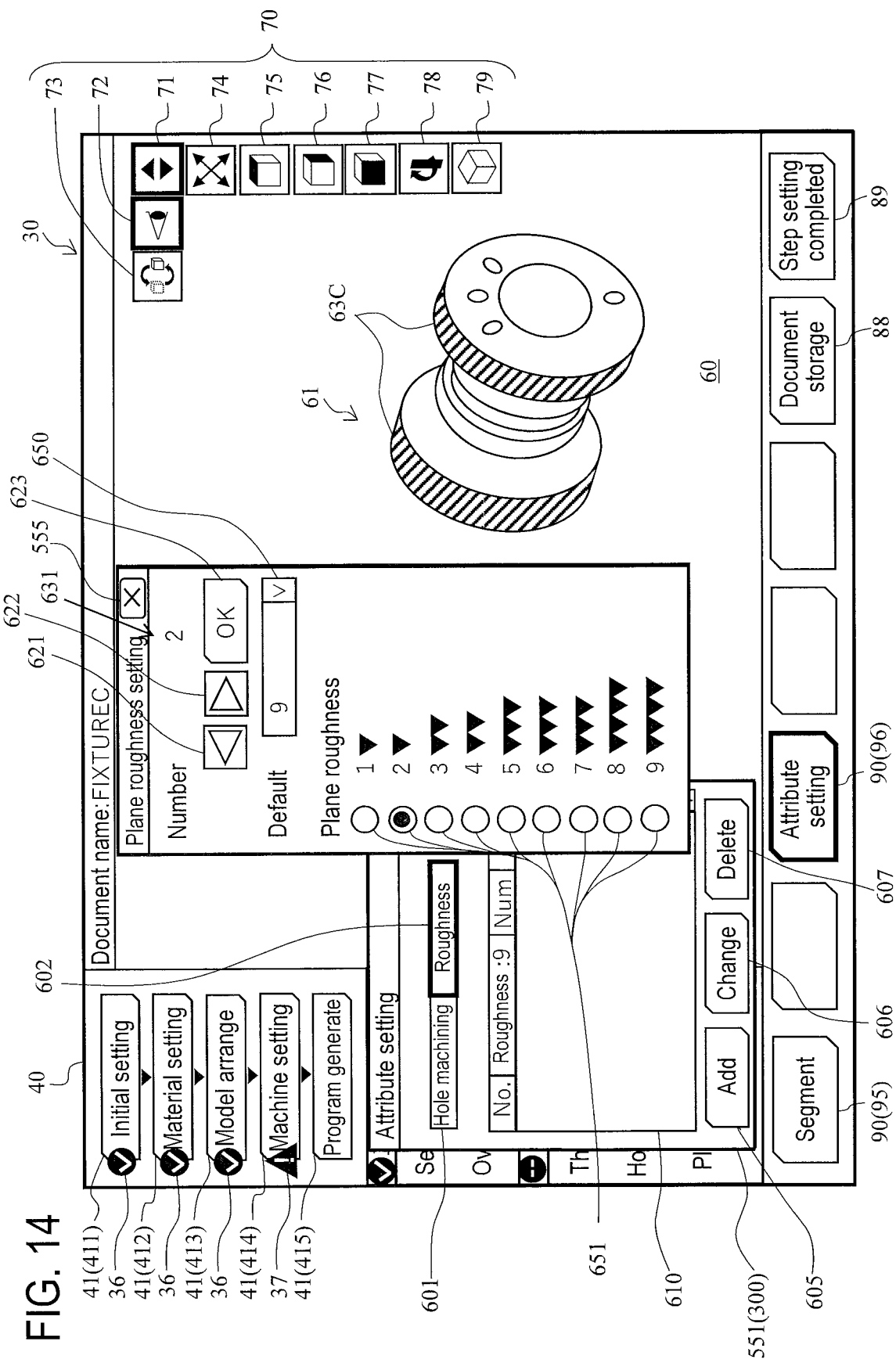
FIG. 14 illustrates an example display screen of a machining attribute setting sub-step.
Figure 15:
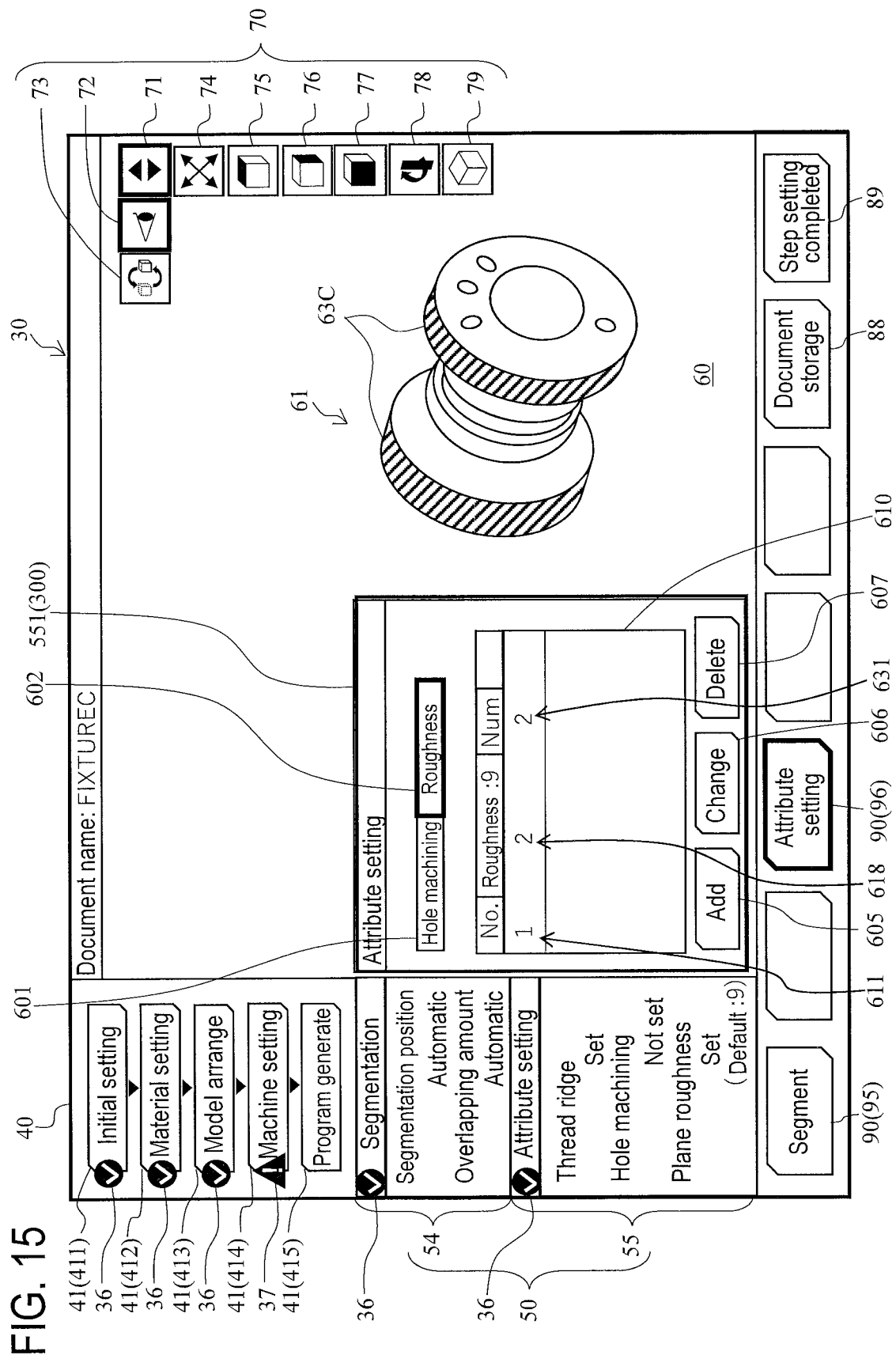
FIG. 15 illustrates an example display screen of a machining attribute setting sub-step.

FIGS. 9 to 15 illustrate display examples of the display screen 30 for the machining attribute setting sub-step 452. The machining attribute setting interface 551 is a window that includes a hole machining setting button 601 and a plane roughness setting button 602. One of the hole machining setting button 601 and the plane roughness setting button 602 is selectively activated. The hole machining setting button 601 is selected for the purpose of setting hole characteristics when the hole machining processed surface of the product is subjected to threading or finishing processing. The plane roughness setting button 602 is selected for the purpose of setting plane roughness of the turning processed surface, the surface machining processed surface, or the hole machining processed surface of the product. Thus, the fourth step (the machining setting step 414) further includes setting plane roughness of the surfaces of the product. While in FIGS. 9 to 15 the hole machining setting button 601 and the plane roughness setting button 602 are displayed in button form, these items may be displayed in any other GUI form, such as drop-down list form and radio button form. FIGS. 9 to 13 illustrate an example in which the hole machining setting button 601 is activated, and FIGS. 14 and 15 illustrate an example in which the plane roughness setting button 602 is activated.

Referring to FIGS. 9 to 13, upon activation of the hole machining setting button 601, a thread ridge setting button 603 and a hole finishing setting button 604 are displayed. One of the thread ridge setting button 603 and the hole finishing setting button 604 is selectively activated. The thread ridge setting button 603 is selected for the purpose of setting thread ridge attributes when a machining processed surface of the product is subjected to threading. The hole finishing setting button 604 is selected for the purpose of setting hole characteristics when a hole results from finishing processing, such as reaming and boring, performed on a machining processed surface of the product. Thus, the fourth step (the machining setting step 414) further includes setting characteristics of a hole formed by hole machining and/or characteristics of a thread ridge formed by threading. While in FIGS. 9 to 15 the thread ridge setting button 603 and the hole finishing setting button 604 are displayed in button form, these items may be displayed in any other GUI form, such as drop-down list form and radio button form.

Figure 9:
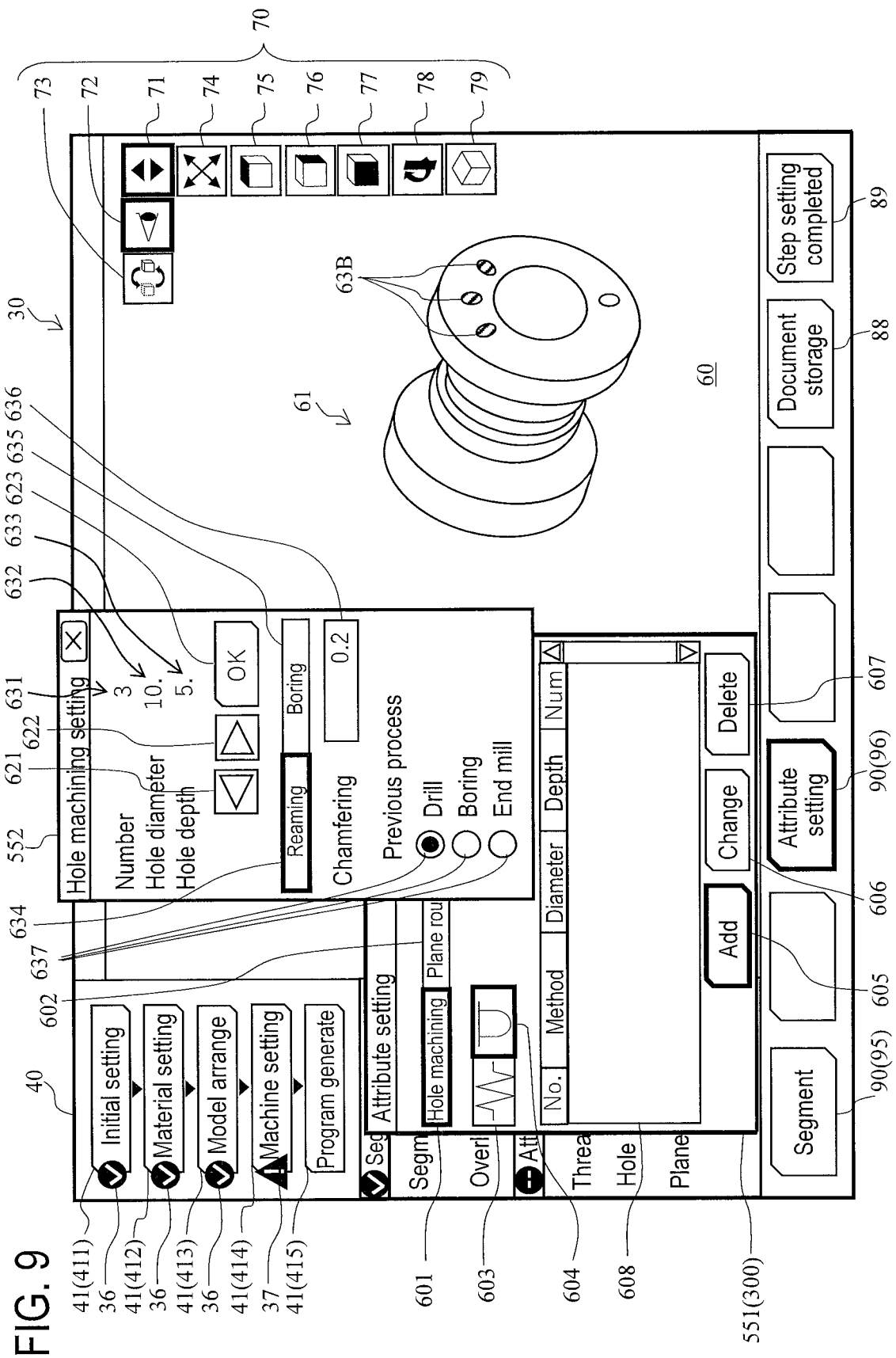
FIG. 9 illustrates an example display screen of a machining attribute setting sub-step.
Figure 10:
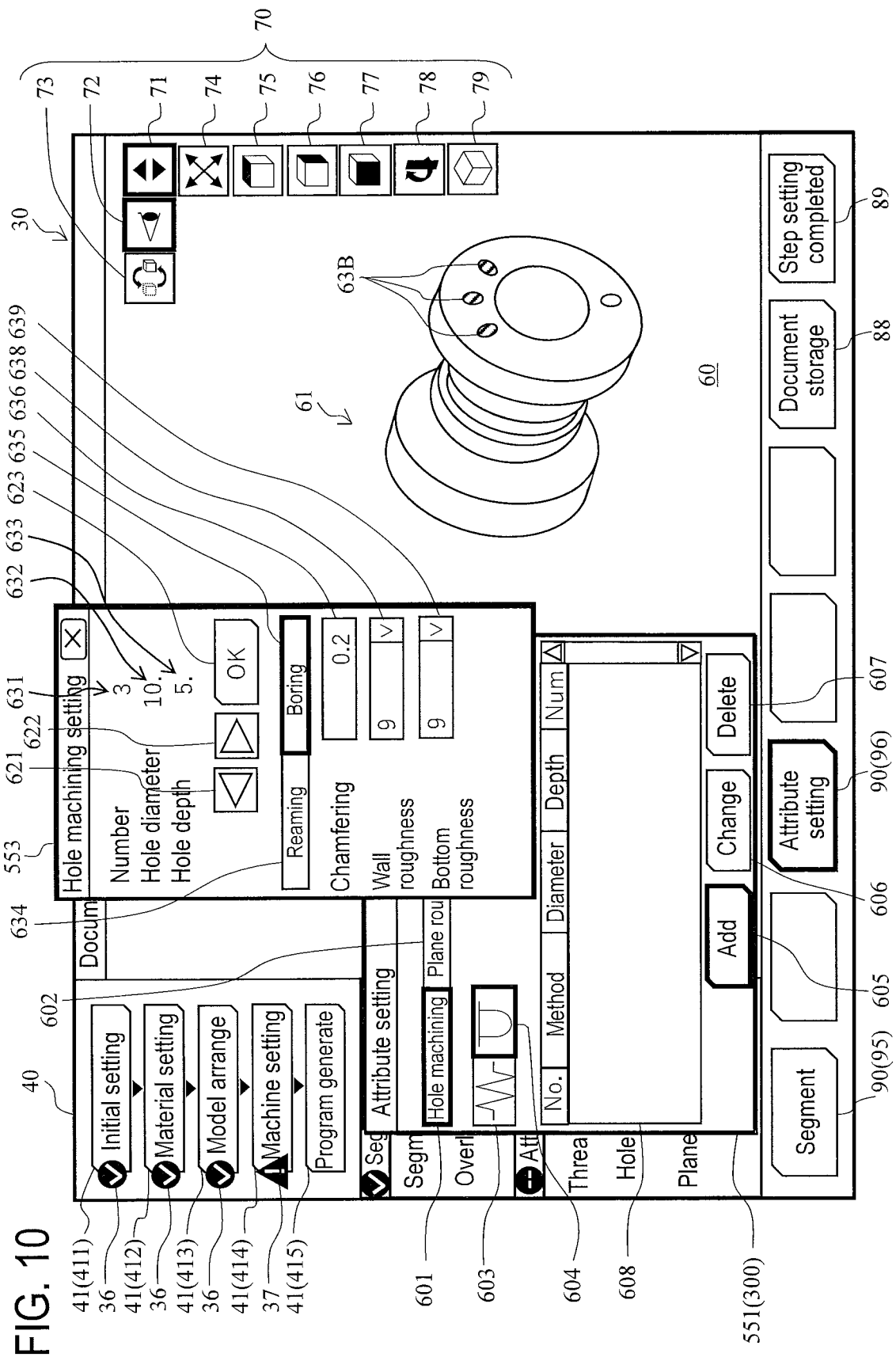
FIG. 10 illustrates an example display screen of a machining attribute setting sub-step.
Figure 11:
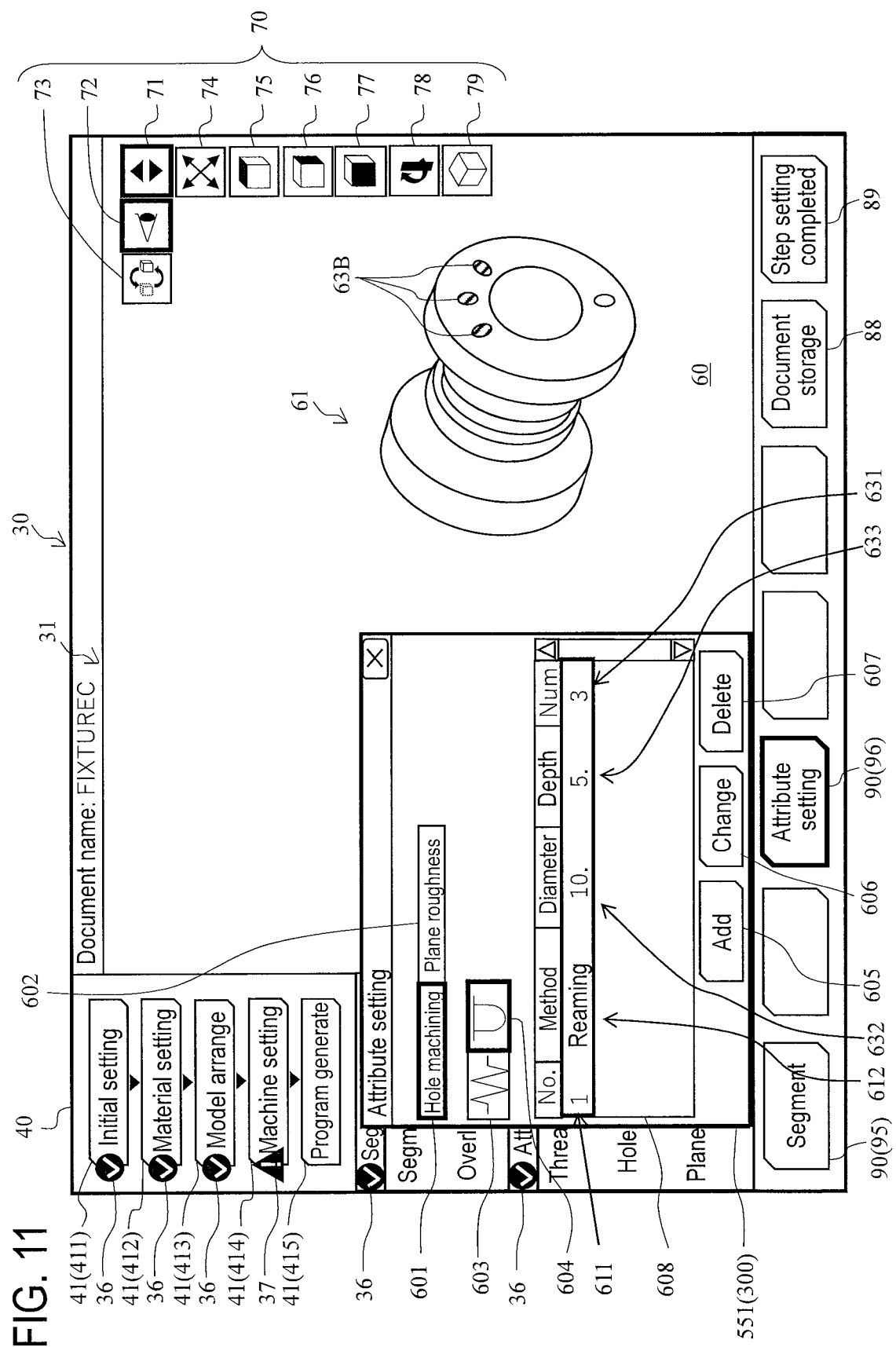
FIG. 11 illustrates an example display screen of a machining attribute setting sub-step.

Referring to FIGS. 9 to 11, upon activation of the hole finishing setting button 604, a hole finishing process list 608 and an addition button 605 are displayed. That is, the machining attribute setting interface 551 includes the hole finishing process list 608 and the addition button 605. The hole finishing process list 608 is a list for a hole finishing process, which is set at a hole machining setting window 552 (see FIG. 9) or a hole machining setting window 553 (see FIG. 10), which are separate from the hole finishing process list 608. Upon manipulation of the addition button 605 by way of an operation such as tapping and mouse-clicking with the hole finishing setting button 604 in activated state, the hole machining setting windows 552 and 553 are activated to add a new hole finishing setting to the hole finishing process list 608.

Referring to FIGS. 9 and 10, the hole machining setting windows 552 and 553 include a reaming setting button 634 and a boring setting button 635. One of the reaming setting button 634 and the boring setting button 635 is selectively activated. While in FIGS. 9 and 10 the reaming setting button 634 and the boring setting button 635 are displayed in button form, these items may be displayed in any other GUI form, such as drop-down list form and radio button form. The hole machining setting window 552, which is displayed when the reaming setting button 634 is activated, is partially different in display content from the hole machining setting window 553, which is displayed when the boring setting button 635 is activated. FIG. 9 illustrates an example in which the reaming setting button 634 is activated, and FIG. 10 illustrates an example in which the boring setting button 635 is activated.

When a new finishing processing on the hole machining processed surface is set, the reaming setting button 634 or the boring setting button 635 is activated. Then, the hole machining processed surface of the product model 61 displayed on the 3D model display window 60 is selected by way of an operation such as tapping and mouse-clicking. In this respect, the hole shapes included in the grouping made at step S103 are selectable. When there are a plurality of identical hole shapes, the plurality of hole shapes are selectable at a time. FIGS. 9 and 10 illustrate an example in which three hole machining processed surfaces 63B, which have identical shapes, are selected on the 3D model display window 60.

Referring to FIG. 9, the hole machining setting window 552, which is displayed when the reaming setting button 634 is activated, displays: number 631 of selected holes; and hole diameter 632 and hole depth 633 of the selected holes. The hole diameter 632 of the selected holes is displayed as the value of the diameter of the cylinder shape surface, which is among the hole machining processed surfaces obtained at step S102, and the hole depth 633 of the selected holes is displayed as the value of the length of the cylinder shape surface. When a hole shape included in the grouping made at step S103 has an opening defined by a truncated cone surface and when the truncated cone surface is connected with a cylinder shape surface, chamfering can also be calculated. In the hole machining setting window 552, the calculated chamfering is displayed in a text box 636. It is to be noted that when a hole shape included in the grouping made at step S103 has an opening defined by a cylinder shape surface, the chamfering is set at 0.0. The chamfering value is editable by the user's manipulation of the text box 636 by way of an operation such as tapping and mouse-clicking. The hole machining setting window 552 includes a radio button 637, which is for specifying a previous process performed previous to reaming. The previous process is selected from drilling, boring, and end milling. While drilling is specified as the previous process by default, the previous process is changeable by manipulating the radio button 637. The radio button 637 may be displayed in any other GUI faun, such as drop-down list form and button form.

The hole machining setting window 552 further includes arrow buttons 621 and 622. Upon manipulation of the arrow button 621 by way of an operation such as tapping and mouse-clicking, the machining processed surfaces of the product model 61 are selected one by one sequentially from the last selected surface of the 3D model display window 60 in a direction toward this side of the 3D model display window 60. It is to be noted, however, that only the hole machining processed surfaces, among the machining processed surface, may be selected sequentially. Upon manipulation of the arrow button 622 by way of an operation such as tapping and mouse-clicking, the machining processed surfaces of the product model 61 are selected one by one sequentially from the last selected surface of the 3D model display window 60 in a direction toward the far side of the 3D model display window 60. It is to be noted, however, that only the hole machining processed surfaces, among the machining processed surface, may be selected sequentially. It is to be noted that the directions toward this and the far sides of the 3D model display window 60 are as defined at step S19.

The hole machining setting window 552 further includes an OK button 623. Upon manipulation of the OK button 623 by way of an operation such as tapping and mouse-clicking, machining attributes of the machining method corresponding to the activated one button, which is either the reaming setting button 634 or the boring setting button 635, are stored. The machining attributes in the case where the reaming setting button 634 is activated (in the case of reaming) include: information for identifying the hole machining processed surfaces 63B; the number 631 of identical hole shapes; a machining method 612 (reaming: see FIG. 11); the hole diameter 632; the hole depth 633; the chamfering set at the text box 636; and the previous process performed previous to reaming. It is to be noted that when the surfaces finally selected by the user by way of an operation such as tapping and mouse-clicking or by manipulating the arrow buttons 621 and 622 include a surface other than a hole machining processed surface, then settings made in the hole machining setting window 552 and the hole machining setting window 553, described later, are disregarded. After the machining attributes are stored, the hole machining setting window 552 is closed, and the stored machining attributes are displayed on the hole finishing process list 608 together with attribute management number 611, as illustrated in FIG. 11.

FIG. 10 illustrates the hole machining setting window 553, which is displayed when the boring setting button 635 is activated. Identical, corresponding, or similar items in the hole machining setting window 552 and the hole machining setting window 553 are assigned the same reference numerals, and these items will not be elaborated upon here. It is to be noted that in the case of boring, stepped hole processing can be performed. Thus, when a hole machining processed surface obtained at step S103 is made up of a plurality of cylinder shape surfaces of different diameters, the cylinder shape surface on the far side is automatically selected as a cylinder shape surface subjected to boring. Then, the diameter and the height of the selected cylinder shape surface are displayed as the hole diameter 632 and the hole depth 633, respectively. The hole machining setting window 553 includes, instead of the radio button 637: a drop-down list 638, which is for defining hole wall plane roughness; and a drop-down list 639, which is for defining hole bottom plane roughness. The wall plane roughness and the bottom plane roughness are specified at the values of 1 to 9 in the order of roughness from roughest to smoothest. While in the drop-down lists 638 and 639 the value of 9 is set by default, the value is changeable by manipulating the drop-down lists 638 and 639. The drop-down lists 638 and 639 may be displayed in any other GUI form, such as radio button form. It is to be noted that the machining attributes stored when the OK button 623 of the hole machining setting window 553 is manipulated include: the information for identifying the hole machining processed surfaces 63B; the number 631 of identical hole shapes; the machining method 612 (boring); the hole diameter 632; the hole depth 633; the chamfering set at the text box 636; the wall plane roughness; and the bottom plane roughness.

Referring to FIG. 11, some of the machining attributes that have been stored are displayed on the rows of the hole finishing process list 608; namely, the attribute management number 611, the machining method 612, the hole diameter 632, the hole depth 633, and the number 631. The rows of the hole finishing process list 608 are selectable by way of an operation such as tapping and mouse-clicking. Upon selection of one row of the hole finishing process list 608, the hole machining processed surfaces 63B having the selected machining attributes are emphasized in the 3D model display window 60. Manners of emphasis include use of a different color and intermittent flashing. FIG. 11 illustrates an example in which the three hole shapes 63B associated with reaming are emphasized. The machining attribute setting interface 551 further includes a change button 606 and a delete button 607. Upon manipulation of the change button 606 by way of an operation such as tapping and mouse-clicking with one row of the hole finishing process list 608 in selected state, the hole machining setting windows 552 and 553 corresponding to the machining method 612 having the selected machining attributes are displayed, and the machining attributes can be re-edited in the windows. When a machining attribute is re-edited, the hole machining processed surfaces 63B emphasized in the 3D model display window 60 may be deleted by way of an operation such as tapping and mouse-clicking, or a hole machining processed surface 63B may be added by manipulating another hole machining processed surface. Upon manipulation of the delete button 607 by way of an operation such as tapping and mouse-clicking with one row of the hole finishing process list 608 in selected state, the selected machining attribute is deleted from the hole finishing process list 608.

Referring to FIGS. 12 and 13, upon activation of the thread ridge setting button 603, a threading process list 609 is displayed, in place of the hole finishing process list 608. That is, the machining attribute setting interface 551 includes the threading process list 609. The threading process list 609 is a list for a threading process, which is set at a thread ridge setting window 554 (see FIG. 12), which is separate from the threading process list 609. Upon manipulation of the addition button 605 with the thread ridge setting button 603 in activated state, the thread ridge setting window 554 is activated to add a new thread ridge setting to the threading process list 609. The thread ridge setting window 554 is a setting window for tapping. Identical, corresponding, or similar items in the hole machining setting window 552 and the thread ridge setting window 554 are assigned the same reference numerals, and these items will not be elaborated upon here.

When a new thread ridge is set, the thread ridge setting window 554 is activated. Then, the hole machining processed surface of the product model 61 displayed on the 3D model display window 60 is selected by way of an operation such as tapping and mouse-clicking, similarly to when a new finishing processing on the hole machining processed surface is set. FIG. 12 illustrates an example in which the three hole machining processed surfaces 63B, which have identical shapes, are selected on the 3D model display window 60, similarly to FIGS. 9 and 10.

Referring to FIG. 12, the thread ridge setting window 554 displays: the number 631 of selected holes; and an opening side diameter 641, a far side diameter 642, and a length 643 of a hole, among the selected holes, that is subjected to threading. In the case of tapping, stepped hole processing can be performed. Therefore, when a hole machining processed surface obtained at step S103 is made up of a plurality of cylinder shape surfaces or truncated cone surfaces of different diameters, the cylinder shape surface or the truncated cone surface provided at the farthest side position is automatically selected as a cylinder shape surface or a truncated cone surface subjected to tapping. Then, the opening side diameter, the far side diameter, and the cylinder-shape or truncated-cone height of the selected cylinder shape surface or truncated cone surface are displayed as the opening side diameter 641, the far side diameter 642, and the length 643, respectively.

The thread ridge setting window 554 includes radio buttons 644, which are for specifying whether to set thread shape in terms of a thread standard or unique specifications. While the thread shape is specified in terms of the thread standard by default, the thread shape is changeable by manipulating the radio buttons 644. The radio buttons 644 may be displayed in any other GUI form, such as drop-down list form and button form. When the thread shape is specified in terms of the thread standard on the radio button 644, the thread ridge setting window 554 displays: a drop-down list 645, which is for specifying the thread standard; a drop-down list 646, which is for specifying thread normal designation; a text box 647, which is for specifying thread length; the text box 636, which is for specifying chamfering; and a check box 648, which is for specifying a thread as a left-handed thread or a right-handed thread. Specifically, the thread ridge setting window 554 includes the drop-down lists 645 and 646, the text boxes 636 and 647, and the check box 648. The drop-down lists 645 and 646 and the check box 648 may be displayed in any other GUI form, such as radio button form. When the thread shape is specified in terms of unique specifications on the radio button 644, the drop-down lists 645 and 646 are replaced with: a text box for setting the outer diameter of an external thread (the diameter of the valley of an internal thread); and a text box for setting pitch. The items displayed are otherwise identical to the items displayed when the thread shape is specified in terms of the thread standard on the radio button 644.

The drop-down list 645 is an interface for selecting any one standard from metric coarse thread, metric fine pitch thread, unified coarse thread, unified fine pitch thread, parallel pipe thread, and taper pipe thread. By default, metric coarse thread is specified. The user is able to change to another standard by manipulating the drop-down list 645. The drop-down list 646 is an interface for selecting one normal designation in the thread standard specified at the drop-down list 645. By default, a normal designation determined in advance is specified. It is possible, however, to: select a normal designation at which the outer diameter of the external thread (the diameter of the valley of the internal thread) is largest among normal designations that do not exceed a thread hole outer shape defined by the opening side diameter 641, the far side diameter 642, and the length 643; and specify the normal designation by default. The user is able to, by manipulating the drop-down list 646, change to another normal designation corresponding to the thread standard specified at the drop-down list 645. When the thread shape is specified in terms of unique specifications on the radio button 644, a value corresponding to the normal designation specified by the above-described method in the metric coarse thread is automatically specified as the outer diameter of the external thread (the diameter of the valley of the internal thread). When the thread shape is specified in terms of unique specifications on the radio button 644, a pitch corresponding to the normal designation specified by the above-described method in the metric coarse thread is automatically specified as the above-described pitch.

In the text box 647, a value corresponding to the length 643 is displayed as an initial value of the thread length. The user is able to change the thread length by changing the value in the text box 647. When the value set at the text box 647 is smaller than the value of the length 643, threading is performed on the far side portion. When "true" is specified at the check box 648, the left-handed thread is specified, and when "false" is specified at the check box 648, the right-handed thread is specified. By default, the value in the check box 648 is set at "false".

The thread ridge setting window 554 further includes the arrow buttons 621 and 622 and the OK button 623. These items are identical in function to the arrow buttons 621 and 622 and the OK button 623 of the hole machining setting window 552, and will not be elaborated upon here. It is to be noted that the machining attributes stored when the OK button 623 of the thread ridge setting window 554 is manipulated include: the information for identifying the machining processed surfaces 63B; the machining method 612 (tapping); the number 631 of identical machining processed surface shapes; normal designation 616 (see FIG. 13), which is specified at the drop-down list 646; a thread length 617 (see FIG. 13), which is specified at the text box 647; the outer diameter of the external thread (the diameter of the valley of the internal thread) and the pitch calculated based on the thread standard specified at the drop-down list 645 and the normal designation 616; and the chamfering set at the text box 636.

Upon manipulation of the OK button 623 of the thread ridge setting window 554, the thread ridge setting window 554 is closed, and the stored machining attributes are displayed on the threading process list 609 together with the attribute management number 611, as illustrated in FIG. 13.

Referring to FIG. 13, some of the machining attributes that have been stored are displayed on the rows of the threading process list 609; namely, the attribute management number 611, the machining method 612, the normal designation 616, the thread length 617, and the number 631. The rows of the threading process list 609 are selectable by way of an operation such as tapping and mouse-clicking. Upon selection of one row of the threading process list 609, the hole machining processed surfaces 63B having the selected machining attributes are emphasized in the 3D model display window 60. Manners of emphasis include use of a different color and intermittent flashing. The machining attribute setting interface 551 further includes the change button 606 and the delete button 607. Upon manipulation of the change button 606 with one row of the threading process list 609 in selected state, the thread ridge setting window 554 is displayed, and the machining attributes can be re-edited in the window. When a machining attribute is re-edited, the hole machining processed surfaces 63B emphasized in the 3D model display window 60 may be deleted by way of an operation such as tapping and mouse-clicking, or a hole machining processed surface 63B may be added by manipulating another hole machining processed surface. Upon manipulation of the delete button 607 with one row of the threading process list 609 in selected state, the selected machining attribute is deleted from the threading process list 609.

FIGS. 14 and 15 illustrate the machining attribute setting interface 551 in which the plane roughness setting button 602 is activated. Identical, corresponding, or similar items in the machining attribute setting interface 551 illustrated in FIGS. 9 to 13 and the machining attribute setting interface 551 illustrated in FIGS. 14 and 15 are assigned the same reference numerals, and these items will not be elaborated upon here. Referring to FIGS. 14 and 15, upon activation of the plane roughness setting button 602, a plane roughness setting list 610 is displayed in the window of the machining attribute setting interface 551. Upon manipulation of the addition button 605, a plane roughness setting window 555 is activated to add a new plane roughness setting to the plane roughness setting list 610. In the case of boring, a plane roughness setting can also be made at the hole machining setting window 553. If, therefore, the plane roughness of a hole is set first set at the hole machining setting window 553, the plane roughness of the hole cannot be set at the plane roughness setting window 555. Contrarily, if the plane roughness of a hole is set first at the plane roughness setting window 555, the plane roughness of the hole cannot be set at the hole machining setting window 553. It is possible, however, to make effective the second plane roughness that was set at the hole machining setting window 553 or the plane roughness setting window 555 later than the first plane roughness.

When a new plane roughness is set, the plane roughness setting window 555 is activated. Then, a turning processed surface or a surface machining processed surface of the product model 61 displayed on the 3D model display window 60 is selected by way of an operation such as tapping and mouse-clicking. In this respect, a surface classified as a turning processed surface at step S101 or a surface classified as a machining processed surface at step S104 is selectable. FIG. 14 illustrates an example in which two machining processed surfaces 63C are selected in the 3D model display window 60.

Referring to FIG. 14, the plane roughness setting window 555 displays the number 631 of selected surfaces. The plane roughness setting window 555 includes: a drop-down list 650, which is for specifying default plane roughness; and a radio button 651, which is for specifying plane roughness of the selected machining processed surfaces 63C. In the drop-down list 650 and the radio button 651, the plane roughness is specified at the values of 1 to 9 in the order of roughness from roughest to smoothest. While in the drop-down list 650 the default value is set at a value specified by the user in advance, the default value is changeable by manipulating the drop-down list 650. While in the radio button 651 the initial value is set at 1, the initial value may be identical to the value set in the drop-down list 650 or is changeable by manipulating the radio button 651. The drop-down list 650 may be displayed in any other GUI form, such as radio button form. Similarly, the radio button 651 may be displayed in any other GUI form, such as drop-down list form and button form.

The plane roughness setting window 555 further includes the arrow buttons 621 and 622, and the OK button 623. These items, which will not be elaborated upon here, are identical in function to the arrow buttons 621 and 622 and the OK button 623 of the hole machining setting window 552 except that the settings made using the plane roughness setting window 555 are effective irrespective of whether the surface finally selected using the arrow buttons 621 and 622 is a hole machining processed surface. It is to be noted that the machining attributes stored when the OK button 623 of the plane roughness setting window 555 is manipulated include: information for identifying the machining processed surfaces 63C; the number 631 of identical machining processed surface shapes; plane roughness 618 of the machining processed surfaces 63C specified at the radio button 651 (see FIG. 15); and default plane roughness specified at the drop-down list 650. Upon manipulation of the OK button 623 of the plane roughness setting window 555, the plane roughness setting window 555 is closed, and the stored machining attributes are displayed on the plane roughness setting list 610 together with the attribute management number 611, as illustrated in FIG. 15.

Referring to FIG. 15, some of the machining attributes that have been stored are displayed on the rows of the plane roughness setting list 610; namely, the attribute management number 611, the plane roughness 618, and the number 631. The rows of the plane roughness setting list 610 are selectable by way of an operation such as tapping and mouse-clicking. Upon selection of one row the plane roughness setting list 610, the machining processed surfaces 63C having the selected machining attributes are emphasized in the 3D model display window 60. Manners of emphasis include use of a different color and intermittent flashing. The machining attribute setting interface 551 further includes the change button 606 and the delete button 607. Upon manipulation of the change button 606 with one row of the plane roughness setting list 610 in selected state, the plane roughness setting window 555 is displayed, and the machining attributes can be re-edited in the window. When a machining attribute is re-edited, the machining processed surfaces 63C emphasized in the 3D model display window 60 may be deleted by way of an operation such as tapping and mouse-clicking, or a machining processed surface 63C may be added by manipulating another hole machining processed surface. Upon manipulation of the delete button 607 with one row of the plane roughness setting list 610 in selected state, the selected machining attribute is deleted from the plane roughness setting list 610.

Referring again to FIG. 20, at step S29, the processor 210 (151) sets machining attributes of the workpiece in the above-described manner via the machining attribute setting interface 551 (the hole machining setting window 552, the hole machining setting window 553, the thread ridge setting window 554, and the plane roughness setting window 555). As illustrated in FIGS. 9 to 15, the processor 210 (151) performs processing of displaying a computer graphics image (the 3D model display window 60) that represents the shape of the product (the product model 61) and that corresponds to the setting step (the machining attribute setting sub-step 452 of the machining setting step 414). The display 240 (154) displays the computer graphics image (the 3D model display window 60) that represents the shape of the product (the product model 61) and that corresponds to the setting step. While in FIGS. 9 to 15 the workpiece model 62 is not displayed, the workpiece model 62 may be displayed in such a manner that the shape of the product is displayed with the surfaces 63A, 63B, and 63C in non-selectable state. When an internal hole shape of the product model 61 is displayed, the internal hole shape may be displayed in wire frame form.

The processor 210 (151) performs processing of displaying the setting status (the setting step status display window 50) of the setting-information associated with the setting step. The display 240 (154) displays the setting status (the setting step status display window 50) of the setting-information associated with the setting step. In FIGS. 4 and 15, the setting step status display window 50 is displaying the setting status 54 of the process segmentation sub-step 451 and the setting status 55 of the machining attribute setting sub-step 452.

Specifically, the setting step status display window 50 is displaying the following items as the setting status 54: whether the exterior reference segmentation position 64 and the interior reference segmentation position 67 are set by "Automatic" (in which case the positions are initially set as default) or set by "Manual" (in which case the initially set positions are changed using the process segmentation setting interface 541); and whether the first exterior margin Me1, the second exterior margin Me2, the first interior margin Mi1, and the second interior margin Mi2 are set by "Automatic" (in which case the margins are initially set as default) or set by "Manual" (in which case the initially set margins are changed using the process segmentation setting interface 541).

The setting step status display window 50 is displaying, as the setting status 55: whether a thread ridge setting has been made; whether a hole machining setting has been made; and whether a plane roughness setting has been made (what is the default value of plane roughness). Further, in FIG. 15, the setting step status display window 50 is displaying the information 36 indicating that setting in the machining attribute setting sub-step 452 is completed. There is some kind of machining work whose machining attributes need not be set in the machining attribute setting sub-step 452. For most kinds of machining work, however, it is presumably necessary to set their machining attributes. The processor 210 (151), therefore, determines that setting in the machining attribute setting sub-step 452 is completed at the time when one machining attribute is set.

At step S30, the processor 210 (151) performs processing of displaying the step transition interface 89, which is for a transition from the setting step (the machining setting step 414) to the next step (the program generation step 415). The display 240 (154) displays the step transition interface 89, which is for the transition from the setting step (the machining setting step 414) to the next step (the program generation step 415). Upon manipulation of the step transition interface 89, the processor 210 (151) makes a determination, via the setting interface, as to whether all of the setting-information corresponding to the setting step (the machining setting step 414) has been set. When, at the time when the step transition interface 89 is manipulated, the determination is that not all of the setting-information corresponding to the setting step (the program generation step 415) has been set (No at step S30), the transition to the next step (the program generation step 415) is not permitted. Specifically, the display 240 (154) makes an error display, requesting process segmentation re-setting and/or machining attribute re-setting (step S31). After the end of step S31, the procedure returns to step S30. When all of the setting-information corresponding to the machining setting step 414 has been set (Yes at step S30), the procedure proceeds to step S32.

Figure 16:
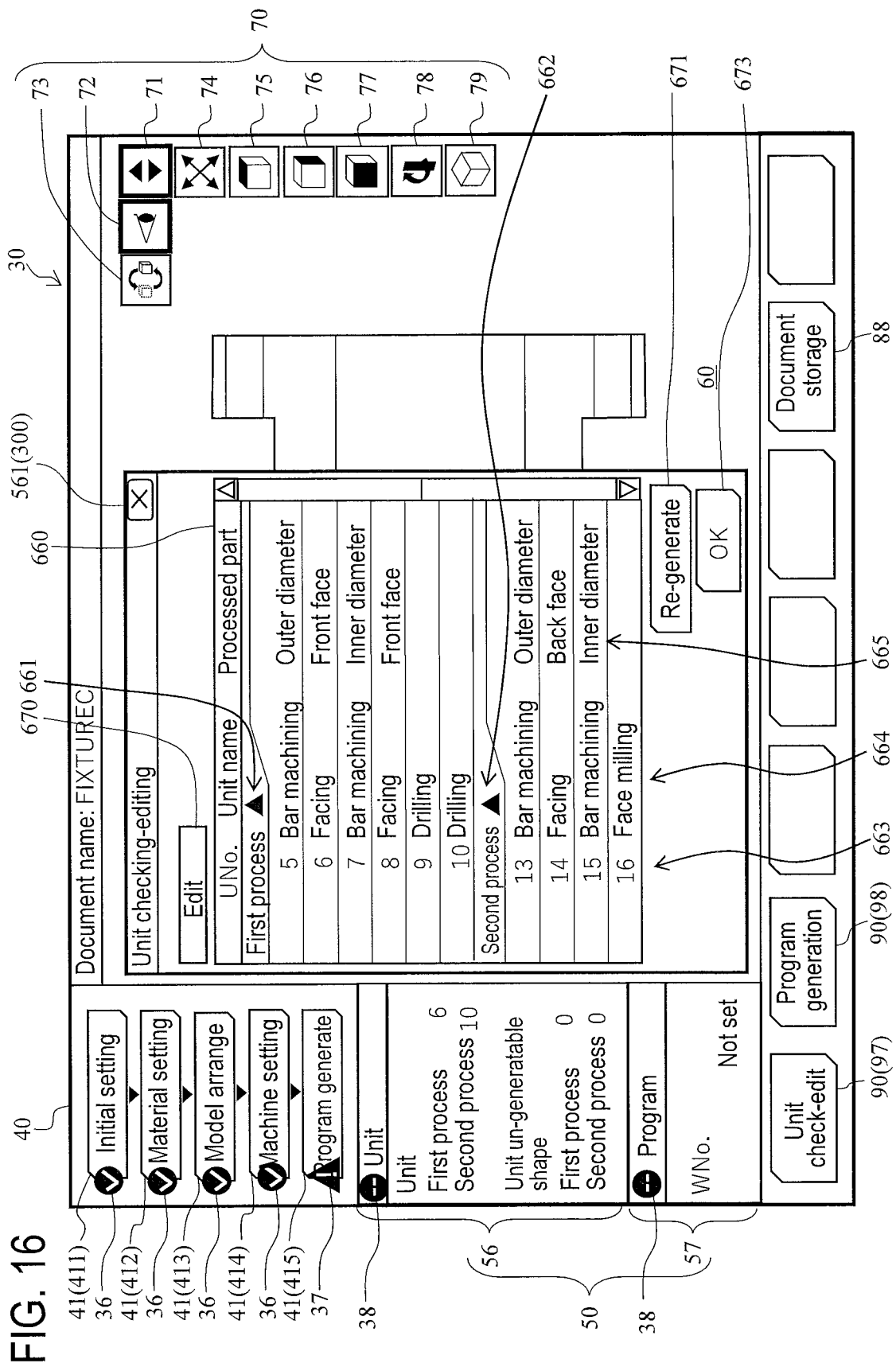
FIG. 16 illustrates an example display screen of a program generation step.

At step S32, when the determination is that all of the setting-information corresponding to the setting step (the machining setting step 414) has been set, the processor 210 (151) performs processing of displaying the information 36 indicating that the setting in the setting step is completed. When the determination is that all of the setting-information corresponding to the setting step (the machining setting step 414) has been set, the display 240 (154) displays the information 36 indicating that the setting in the setting step is completed. Specifically, as illustrated in FIG. 16, the information 36 is displayed on the button 41 for the machining setting step 414 in the step status display window 40. Next, at step S33, the processor 210 (151) selects, from the plurality of steps, a setting step whose setting-information should be set. At step S33, the processor 210 (151) selects the program generation step 415 as the setting step.

At step S34, the processor 210 (151) performs processing of displaying the call interface 90, which is for calling the setting interface 300. The display 240 (154) displays the call interface 90, which is for calling the setting interface 300. Specifically, at the program generating step 415, the processor 210 (151) performs processing of displaying: a unit checking-editing call interface 97, which is for calling a unit checking-editing interface 561; and a program generation call interface 98, which is for calling a program generation interface. While in FIG. 16 the unit checking-editing call interface 97 and the program generation call interface 98 are displayed in the form of a button, these interfaces may be displayed in any other GUI form.

The unit checking-editing interface 561 is an interface for checking the content of the machining unit output to the machining program 157 and editing the content as necessary. The program generation interface is an interface for: checking the number (workpiece number) for identifying the machining program 157 to be generated; and generating the machining program 157.

Generation of Machining Unit Extra Data

Figure 22:
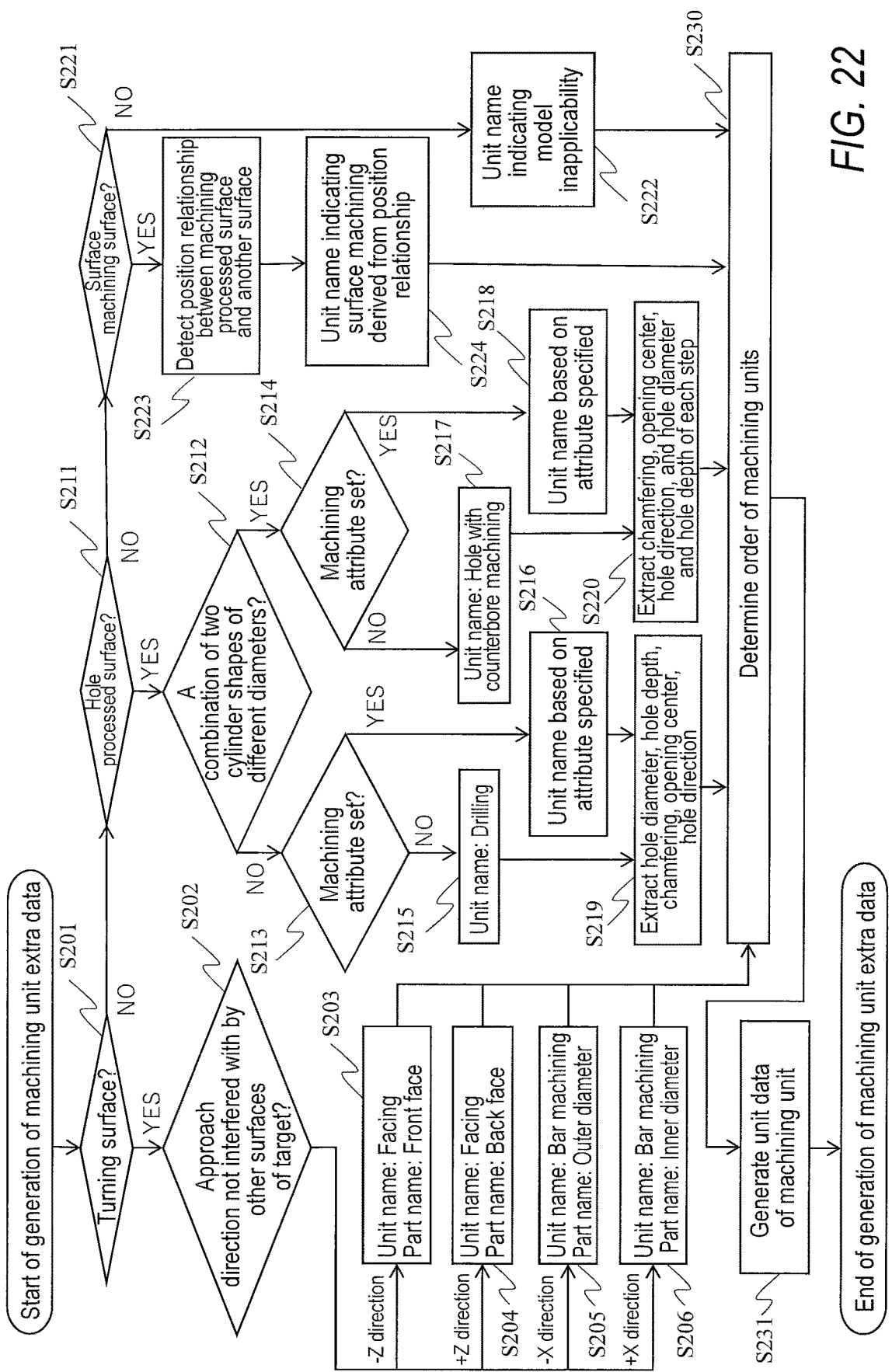
FIG. 22 is a flowchart of generation of machining unit extra data.

Next, at step S35, machining unit extra data is generate. The step S35 may not necessarily be performed after step S34 but may be performed at any timing after step S32 and before step S36. FIG. 22 is a flowchart of generation of machining unit extra data at step S35. The machining unit extra data includes, among the items included in the machining unit, unit data defined before the tool sequence and the shape sequence. The machining unit extra data also includes setting-information that is set at the initial setting step 411, the material setting step 412, the model arrangement step 413, and the machining setting step 414 and that is used to generate the tool sequence and the shape sequence but is not stored in the unit data.

At step S201, the processor 210 (151) determines whether a machining processed surface classified at step S27 is a turning processed surface (step S201). When the machining processed surface is determined as a turning processed surface (Yes at step S201), the processor 210 (151) obtains an approach direction in which the tool approaches the machining processed surface such that the tool is not interfered with by any other surface of the product (step S202). When the approach direction is the Z axis negative direction of the workpiece coordinate system, the processor 210 (151) gives facing unit to the unit name of the machining unit for the machining processed surface and gives front surface to the machining processed part name (step S203). When the approach direction is the Z axis positive direction of the workpiece coordinate system, the processor 210 (151) gives facing unit to the unit name of the machining unit for the machining processed surface and gives back face to the machining processed part name (step S204). When the approach direction is the X axis negative direction of the workpiece coordinate system, the processor 210 (151) gives bar machining unit to the unit name of the machining unit for the machining processed surface and gives outer diameter to the machining processed part name (step S205). When the approach direction is the X axis positive direction of the workpiece coordinate system, the processor 210 (151) gives bar machining unit to the unit name of the machining unit for the machining processed surface and gives inner diameter to the machining processed part name (step S206).

When at step S201 the machining processed surface is not determined as a turning processed surface (No at step S201), the processor 210 (151) determines whether the machining processed surface is a hole machining processed surface (step S211). When the machining processed surface is determined as a hole machining processed surface (Yes at step S211), the processor 210 (151) determines whether the machining processed surface is a combination of two kinds of cylinder shapes of different diameters included in the grouping made at step S103 (step S212). The processor 210 (151) also determines whether machining attributes of the machining processed surface have been set at step S29 (steps S213 and S214).

When the machining processed surface is not determined as a combination of two kinds of cylinder shapes of different diameters and when machining attributes are not determined as having been set (No at steps S212 and S213), the processor 210 (151) gives drilling unit to the unit name of the machining unit for the machining processed surface (step S215). When the machining processed surface is not determined as a combination of two kinds of different diameters and when machining attributes are determined as having been set (No at step S212, Yes at step S213), the processor 210 (151) gives, to the machining unit for the machining processed surface, a unit name that is based on the machining attributes specified (step S216). By referring to the machining method 612 corresponding to the machining processed surface having the stored machining attributes, the processor 210 (151) is capable of obtaining information necessary for unit name generation. For example, when the machining method 612 is tapping, the processor 210 (151) gives tapping unit to the unit name. When the machining method 612 is reaming, the processor 210 (151) gives reaming unit to the unit name. When the machining method 612 is boring, the processor 210 (151) gives boring unit to the unit name. When plane roughness is specified, the processor 210 (151) gives circular milling unit to the unit name. The circular milling unit is a machining unit is for performing, in hole machining, finishing processing on the surface of a hole using an end mill.

When the machining processed surface is determined as a combination of two kinds of cylinder shapes of different diameters and when machining attributes are not determined as having been set (Yes at step S212, No at step S214), the processor 210 (151) gives hole-with-counterbore machining unit to the unit name of the machining unit for the machining processed surface (step S217). When the machining processed surface is determined as a combination of two kinds of cylinder shapes of different diameters and when machining attributes are determined as having been set (Yes at steps S212 and S214), the processor 210 (151) gives, to the unit name of the machining unit for the machining processed surface, a stepped unit name that is based on the machining attributes specified (step S218). For example, when the machining method 612 is tapping, the processor 210 (151) gives hole-with-counterbore tapping unit to the unit name. When the machining method 612 is boring, the processor 210 (151) gives stepped boring unit to the unit name. When plane roughness is specified, the processor 210 (151) gives circular milling unit to the unit name. In this circular milling unit, a stepped hole is set.

After the end of step S215 or S216, the processor 210 (151), in the case of a drilling unit, calculates the hole diameter and the hole depth from the cylinder shape of the cylinder shape surface included in the grouping made at step S103. Further, when a hole shape included in the grouping made at step S103 has an opening defined by a truncated cone surface and when the truncated cone surface is connected with a cylinder shape surface, the processor 210 (151) also detects chamfering. Also, the processor 210 (151) obtains the center axis of the cylinder shape in the drilling unit and in all the units whose unit names are set at step S216, and obtains: opening center position, which is the center of the opening; and the extending direction (hole direction) of the hole (step S219). After the end of step S217 or S218, the processor 210 (151) obtains the chamfering, the opening center position, and the hole direction, similarly to step S219. Further, the processor 210 (151) calculates, based on the cylinder shape of a cylinder shape surface included in the grouping made at step S103, hole diameters and hole depths of two kinds of different holes (step S220).

When at step S211 the machining processed surface is not determined as a hole machining processed surface (No at step S211), the processor 210 (151) determines whether the machining processed surface is a surface machining processed surface (step S221). When the machining processed surface is not determined as a surface machining processed surface (No at step S221), the machining processed surface is a model inapplicability curved surface. In this case, the processor 210 (151) gives, to the unit name of the machining unit for the machining processed surface, a unit name indicating model inapplicability (for example, un-developable unit) (step S222). When at step S211 the machining processed surface is determined as a surface machining processed surface (Yes at step S221), the processor 210 (151) detects a connection relationship between this machining processed surface and another surface (step S223). Then, the processor 210 (151) gives, to the unit name associated with this machining processed surface, a unit name indicating a surface machining derived from the connection relationship (step S224). For example, when the machining processed surface is a flat surface with no depressions and protrusions, the processor 210 (151) gives face milling unit to the unit name associated with the machining processed surface. When the machining processed surface is a flat surface depressed below other surfaces, the processor 210 (151) gives pocket milling unit to the unit name associated with the machining processed surface.

After the machining processed surface have undergone all the processings at step S201 to S224, the processor 210 (151) determines the order of, in the machining program 157, the machining units that are assigned the respective unit names as described above (step S230). The is order is determined according to the following rule.

(1) The order is turning, surface machining, and hole machining.
(2) Turning is determined in the order of distance from farthest to closest relative to the turning rotation axis (the rotation axis A3).
(3) Surface machining is determined in the order of machining depth from shallowest to deepest.

Additionally, it is possible to: determine the order of the machining units so that the machining of the first exterior machining region Re1 and the machining of the first interior machining region Ri1 defined at the process segmentation sub-step 451 can be performed continuously; and determine the order of the machining units so that the machining of the second exterior machining region Re2 and the machining of the second interior machining region Rig can be performed continuously.

After the end of step S230, the processor 210 (151) generates unit data of the machining unit (step S231). First, for each of the machining units whose order has been determined, the processor 210 (151) defines the names and the machining processed part names at steps S203 to 206, S215 to S218, S222, and S224. Then, for the bar machining unit, the processor 210 (151) determines a cutting start position based on the unit order of the machining unit such that the cutting start position is easily approachable from the previous machining unit. Then, the processor 210 (151) generates unit data of the bar machining unit by adding the cutting start position and finishing allowance of the workpiece stored as the machine constant data 162. When the generated bar machining unit includes a plane roughness set as a machining attribute, the processor 210 (151) stores the plane roughness in the memory 220 (152) as machining unit extra data such that the plane roughness is correlated with the generated unit data of the bar machining unit. When the generated bar machining unit includes no plane roughness set as a machining attribute, the processor 210 (151) stores a plane roughness having a default value in the memory 220 (152) as machining unit extra data such that the plane roughness having the default value is correlated with the generated unit data of the bar machining unit. Further, the processor 210 (151) stores, as machining unit extra data in the memory 220 (152), shape data of a turning processed surface extracted at step S101 such that the shape data is correlated with the generated unit data of the bar machining unit.

For the facing unit, the processor 210 (151) generates unit data of the facing unit by adding the finishing allowance of the workpiece stored as the machine constant data 162. When the generated facing unit includes a plane roughness set as a machining attribute, the processor 210 (151) stores the plane roughness in the memory 220 (152) as machining unit extra data such that the plane roughness is correlated with the generated unit data of the facing unit. When the generated facing unit includes no plane roughness set as a machining attribute, the processor 210 (151) stores a plane roughness having a default value in the memory 220 (152) as machining unit extra data such that the plane roughness having the default value is correlated with the generated unit data of the facing unit. Further, the processor 210 (151) stores, as machining unit extra data in the memory 220 (152), the shape data of the turning processed surface extracted at step S101 such that the shape data is correlated with the generated unit data of the facing unit.

For the face milling unit/pocket milling unit, the processor 210 (151) adds, to unit data of the face milling unit/pocket milling unit, the distance between the Z axis of the workpiece coordinate system and the surface machining processed surface set at the model arrangement step 413. The distance is added as the distance (depth) between the workpiece origin of the workpiece coordinate system and the surface machining processed surface. The processor 210 (151) adds, to the unit data of the face milling unit/pocket milling unit, the distance between: a surface that is one of the machining processed surface formed by the turning machining process and the surface of the workpiece model 62 and that is positioned inner than the other surface; and the surface machining processed surface. The distance is added as the amount of machining (machining allowance) to the surface machining processed surface. When the surface machining processed surface includes a plane roughness set as a machining attribute, the processor 210 (151) adds the set plane roughness to the unit data of the face milling unit/pocket milling unit as the plane roughness of the surface machining processed surface. When the surface machining processed surface includes no plane roughness set as a machining attribute, the processor 210 (151) adds a default plane roughness to the unit data of the face milling unit/pocket milling unit as the plane roughness of the surface machining processed surface. The processor 210 (151) adds the finishing allowance of the workpiece stored as the machine constant data 162 to the unit data of the face milling unit/pocket milling unit. In this manner, the processor 210 (151) generates the unit data of the face milling unit/pocket milling unit. Further, the processor 210 (151) stores shape data of the surface machining processed surface extracted at step S104 in the memory 220 (152) as machining unit extra data such that the shape data is correlated with the generated unit data of the face milling unit/pocket milling unit.

For the drilling unit, the processor 210 (151) generates unit data of the drilling unit by adding the hole diameter, the hole depth, and the chamfering obtained at step S219 to the unit name obtained at step S215. The processor 210 (151) stores, as machining unit extra data, the opening center and the hole direction obtained at step S219 in the memory 220 (152) such that the opening center and the hole direction are correlated with the generated unit data of the drilling unit. For the hole-with-counterbore machining unit, the processor 210 (151) generates unit data of the hole-with-counterbore machining unit by adding the hole diameters, the hole depths, and the chamferings of the two kinds of different holes obtained at step S220 to the unit name obtained at step S217. The processor 210 (151) stores the opening center and the hole direction obtained at step S220 in the memory 220 (152) as machining unit extra data such that the opening center and the hole direction are correlated with the generated unit data of the hole-with-counterbore machining unit. For the circular milling unit, the processor 210 (151) generates unit data of the circular milling unit by adding the hole diameter, the hole depth, and the chamfering obtained at step S219 to the unit obtained at step S216. Then, the processor 210 (151) stores the plane roughness set as a machining attribute in the memory 220 (152) as machining unit extra data such that the plane roughness is correlated with the generated unit data of the circular milling unit. Alternatively, the processor 210 (151) generates the unit data of the circular milling unit by adding the hole diameters, the hole depths, and the chamferings of the two kinds of different holes obtained at step S220 to the unit name obtained at step S218. Then, the processor 210 (151) stores the plane roughness set as a machining attribute in the memory 220 (152) as machining unit extra data such that the plane roughness is correlated with the generated unit data of the circular milling unit.

For the boring unit, the processor 210 (151) generates unit data of the boring unit by adding the hole diameter, the hole depth, the chamfering, the wall plane roughness, and the bottom plane roughness set as machining attributes to the unit name obtained at step S216. For the stepped boring unit, the processor 210 (151) generates unit data of the stepped boring unit by adding, to the unit name obtained at step S218, the hole diameter and the hole depth of the larger hole obtained at step S220 and the hole diameter, the hole depth, the chamfering, the wall plane roughness, and the bottom plane roughness set as machining attributes. For the tapping unit, the processor 210 (151) generates unit data of the tapping unit by adding, to the unit name obtained at step S216, the normal designation, the thread length, the outer diameter of the external thread (the diameter of the valley of the internal thread), the pitch, and the chamfering set as machining attributes. For the hole-with-counterbore tapping unit, the processor 210 (151) generates unit data of the hole-with-counterbore tapping unit by adding, to the unit name obtained at step S218, the hole diameter and the hole depth of the counterbore obtained at step S220 and the normal designation, the thread length, the outer diameter of the external thread (the diameter of the valley of the internal thread), the pitch, and the chamfering set as machining attributes. For the reaming unit, the processor 210 (151) generates unit data of the reaming unit by adding, to the unit name obtained at step S216, the hole diameter, the hole depth, the chamfering, and the kind of the previous machining set as machining attributes. The processor 210 (151) stores the opening center and the hole direction obtained at step S220 and the plane roughness set as a machining attribute in the memory 220 (152) as machining unit extra data such that the opening center, the hole direction, and the plane roughness are correlated with the generated unit data of the boring unit, the stepped boring unit, the tapping unit, the hole-with-counterbore tapping unit, and the reaming unit.

At step S36, the processor 210 (151) performs processing of displaying the setting interface 300 for setting setting-information corresponding to the setting step (the program generation step 415). The display 240 (154) displays the setting interface 300 for setting the setting-information corresponding to the setting step (the program generation step 415) which has been selected from the plurality of steps and whose setting-information should be set. When the setting-information associated with the setting step is not set yet, the processor 210 (151) performs processing of automatically displaying the setting interface 300. When the setting-information associated with the setting step is not set yet, the display 240 (154) automatically displays the setting interface 300. At step S36, when the content of the machining unit output to the machining program 157 is not checked yet, the processor 210 (151) performs processing of automatically displaying the unit checking-editing interface 561. When the content of the machining unit output to the machining program 157 is not checked yet, the display 240 (154) automatically displays the unit checking-editing interface 561. When the content of the machining unit output to the machining program 157 is already checked, the unit checking-editing interface 561 may be called by the unit checking-editing call interface 97.

Figure 17:
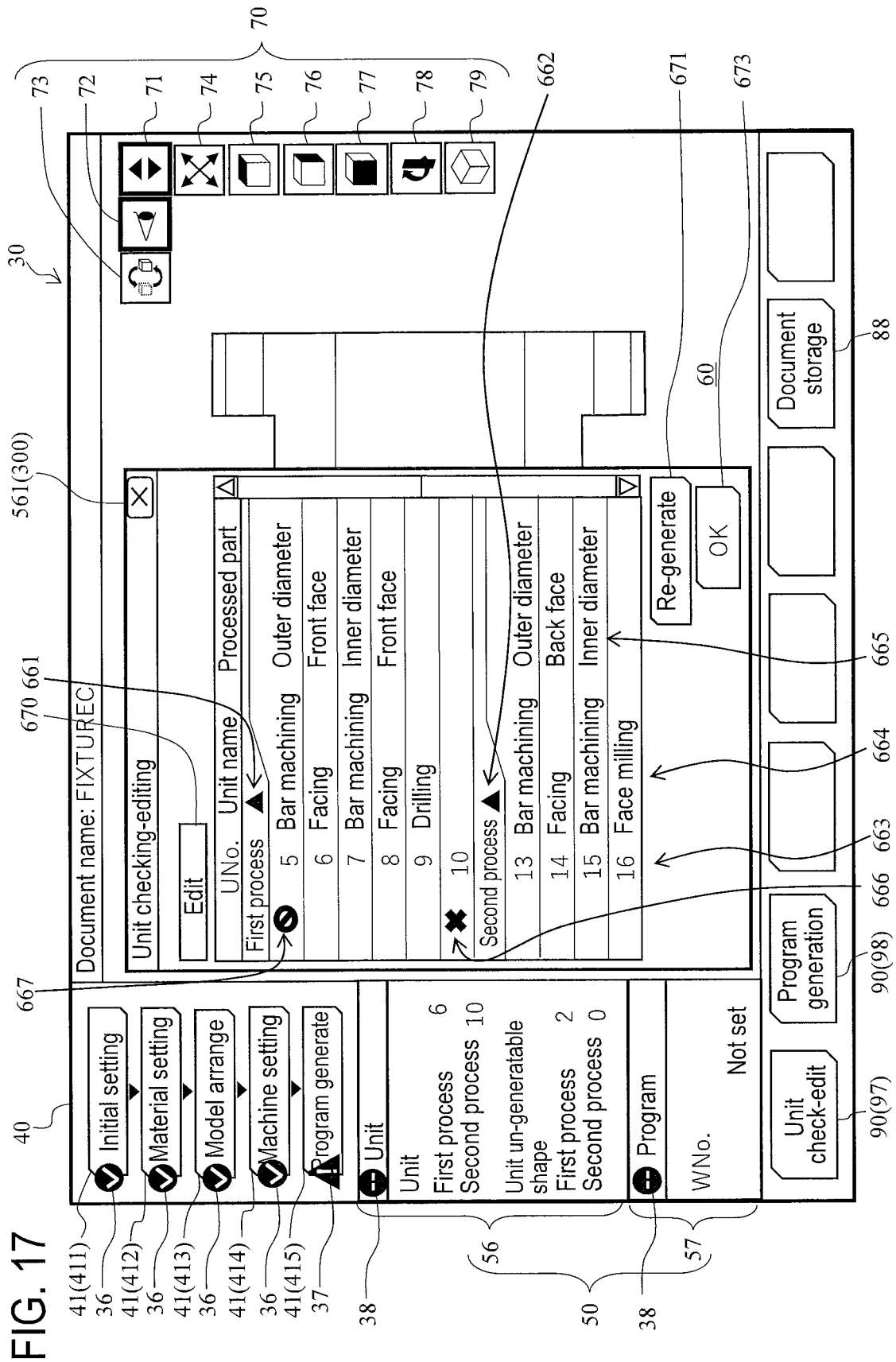
FIG. 17 illustrates an example display screen of a program generation step.
Figure 18:
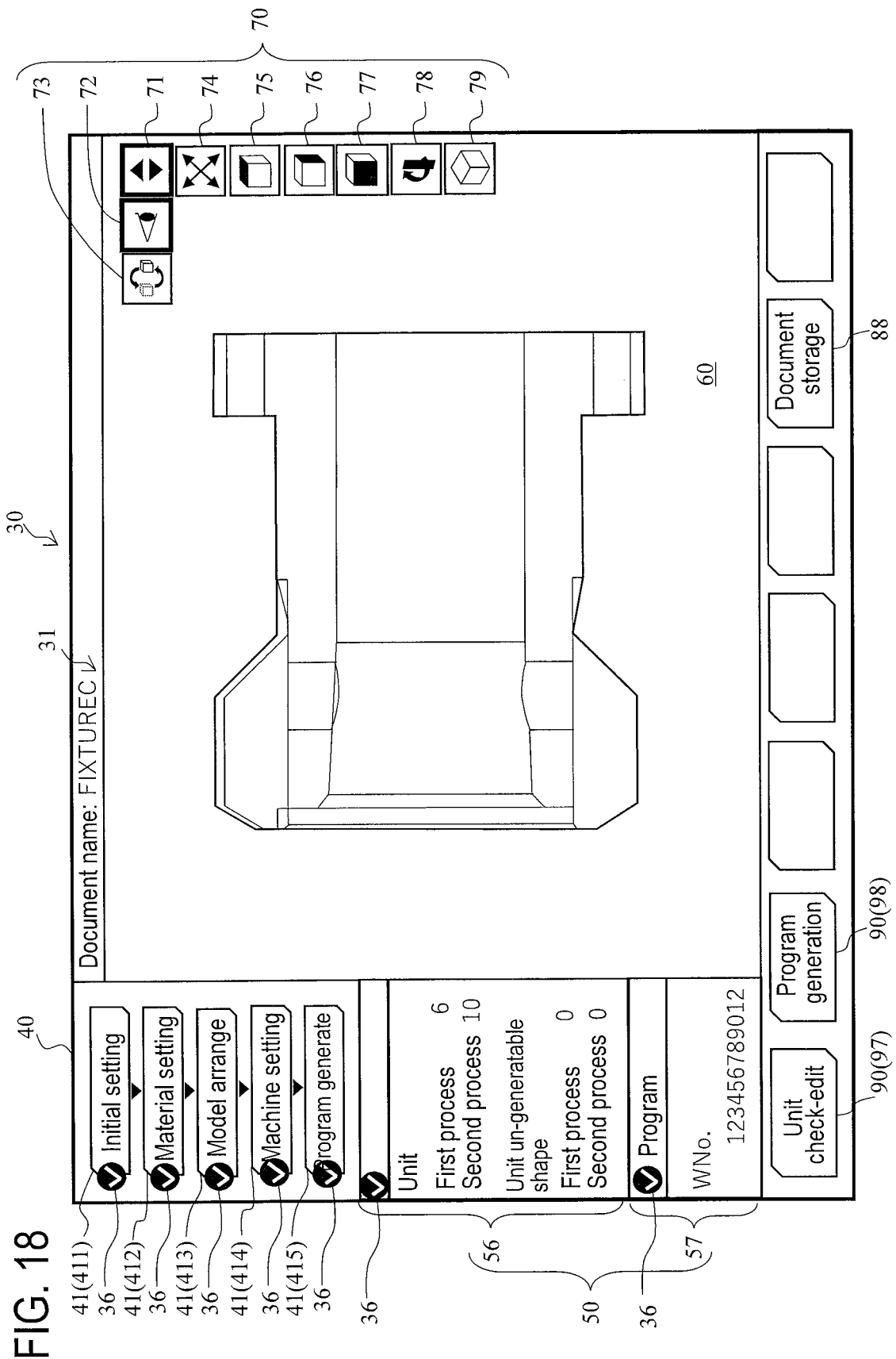
FIG. 18 illustrates an example display screen of a program generation step.

FIGS. 16 to 18 are display examples of the display screen 30 for the program generation step 415. The unit checking-editing interface 561 is displaying the unit names and the machining processed parts of the machining units whose unit data have been generated at step S35 in the order of time from first to last to be machined. The machining units are performed such that the machining units machined at the first process at step S230 are performed continuously, and then the machining units machined at the second process are performed continuously. For this purpose, the unit checking-editing interface 561 includes an accordion menu 660, in which an aggregation of the machining units at the first process is openable and closable by manipulating the arrow button 661 and an aggregation of the machining units at the second process is openable and closable by manipulating the arrow button 662. FIGS. 16 and 17 illustrate a state in which the accordion menu 660 is displaying both a list of the machining units at the first process and a list of the machining units at the second process. In this state, upon manipulation of the arrow buttons 661 and 662 by way of an operation such as tapping and mouse-clicking, the list of the machining units at the first process and the list of the machining units at the second process are closed, and the arrow buttons 661 and 662 are pointed in the opposite arrow direction. It is to be noted that the list of the machining units at the first process and the list of the machining units at the second process may not necessarily be displayed in accordion menu form.

Each of the rows of the list of the machining units at the first process and the list of the machining units at the second process corresponds to one machining unit. In each row of the list, a unit number 663, a unit name 664, and a machining processed part 665 are displayed. When an edit button 670 is manipulated by way of an operation such as tapping and mouse-clicking, a row of the list is selected by way of an operation such as tapping and mouse-clicking. In this state, operations including the following can be performed: change the machining order; change the machined shape; change the unit name 664; change the machining processed part 665; add, delete, combine, or divide a machining unit(s); and invalidate a machining unit (which is output to the machining program 157 as an invalid machining unit). Editing of a machining unit will not be elaborated upon here. Upon manipulation of a unit re-generation button 671 by way of an operation such as tapping and mouse-clicking after a machining unit is edited, the unit data of the machining unit and the machining unit extra data are re-generated based on the content of the editing.

FIG. 16 illustrates a successful example in which the unit data of all the machining units are automatically generated. FIG. 17 illustrates an unsuccessful example in which the unit data of some machining units are not automatically generated because step S222 was performed. FIG. 17 illustrates an unsuccessful example in which the unit data of the machining unit having the unit number 10 is not generated. Referring to FIG. 17, the machining unit having the unit number 10 is attached with a pictorial symbol 666, which indicates that automatic generation of the unit data was unsuccessful, while nothing is attached to the unit name 664 and the machining processed part 665. The user may edit such machining unit by pressing the edit button 670 or perform a machining by calling from the machining unit a machining program described in another G code. Also in FIG. 17, the machining unit having the unit number 5 is invalidated by the user. Referring to FIG. 17, the machining unit having the unit number 5 is attached with a pictorial symbol 667, which indicates invalidation. The invalidated machining unit is not output to the machining program 157. This makes it easier to output the machining program 157 in which the product model 61 is partially changed. It is to be noted that the pictorial symbols 666 and 667 will not be limited to those illustrated in FIG. 17.

Referring again to FIG. 20, at step S37, the processor 210 (151) receives an input of a machining unit checking-editing via the unit checking-editing interface 561, as described above. In FIGS. 16 and 17, when a row of the list is selected in the editing of a machining unit, the machining processed part of the machining unit corresponding to the selected row is displayed on the 3D model display window 60 for the purpose of assisting editing work, which is not described in detail. Thus, the processor 210 (151) performs processing of displaying a computer graphics image (the 3D model display window 60) that represents the shape of the workpiece (the workpiece model 62) and the shape of the product (the product model 61) and that corresponds to the setting step (the program generation step 415). The display 240 (154) displays a computer graphics image (the 3D model display window 60) that represents the shape of the workpiece (the workpiece model 62) and the shape of the product (the product model 61) and that corresponds to the setting step.

At step S38, the processor 210 (151) receives an event indicating that the unit checking-setting is completed. As illustrated in FIGS. 16 and 17, the unit checking-editing interface 561 further includes an OK button 673. Upon manipulation of the OK button 673 by way of an operation such as tapping and mouse-clicking, the processor 210 (151) receives the manipulated event unit as an event that is done with unit checking-setting. Upon manipulation of the OK button 673, the window of the unit checking-editing interface 561 is closed. In the meantime until the OK button 673 is manipulated (No at step S38), the unit checking-editing interface 561 is displayed (step S37).

Upon manipulation of the OK button 673 (Yes at step S38), the processor 210 (151), at step S39, performs processing of displaying the setting interface 300 for setting setting-information corresponding to the setting step (the program generation step 415). The display 240 (154) displays the setting interface 300 for setting the setting-information corresponding to the setting step (the program generation step 415) which has been selected from the plurality of steps and whose setting-information should be set. Specifically, when the machining program 157 is not generated yet, the processor 210 (151) performs processing of automatically displaying the program generation interface. When the machining program 157 is not generated yet, the display 240 (154) automatically displays the program generation interface. When the machining program 157 is already generated, the processor 210 (151) performs processing of displaying the program generation interface via the program generation call interface 98. When the machining program 157 is already generated, the display 240 (154) displays the program generation interface via the program generation call interface 98.

At step S40, the output destination of the program is specified by the user by selecting or generating, via the program generation interface, the number (workpiece number) for identifying the machining program 157 to be generated. The program generation interface will not be elaborated upon by way of illustration. Upon specification of the output destination of the program in this manner, the processor 210 (151), at step S41, outputs the machining program 157 to the output destination.

Figure 23:
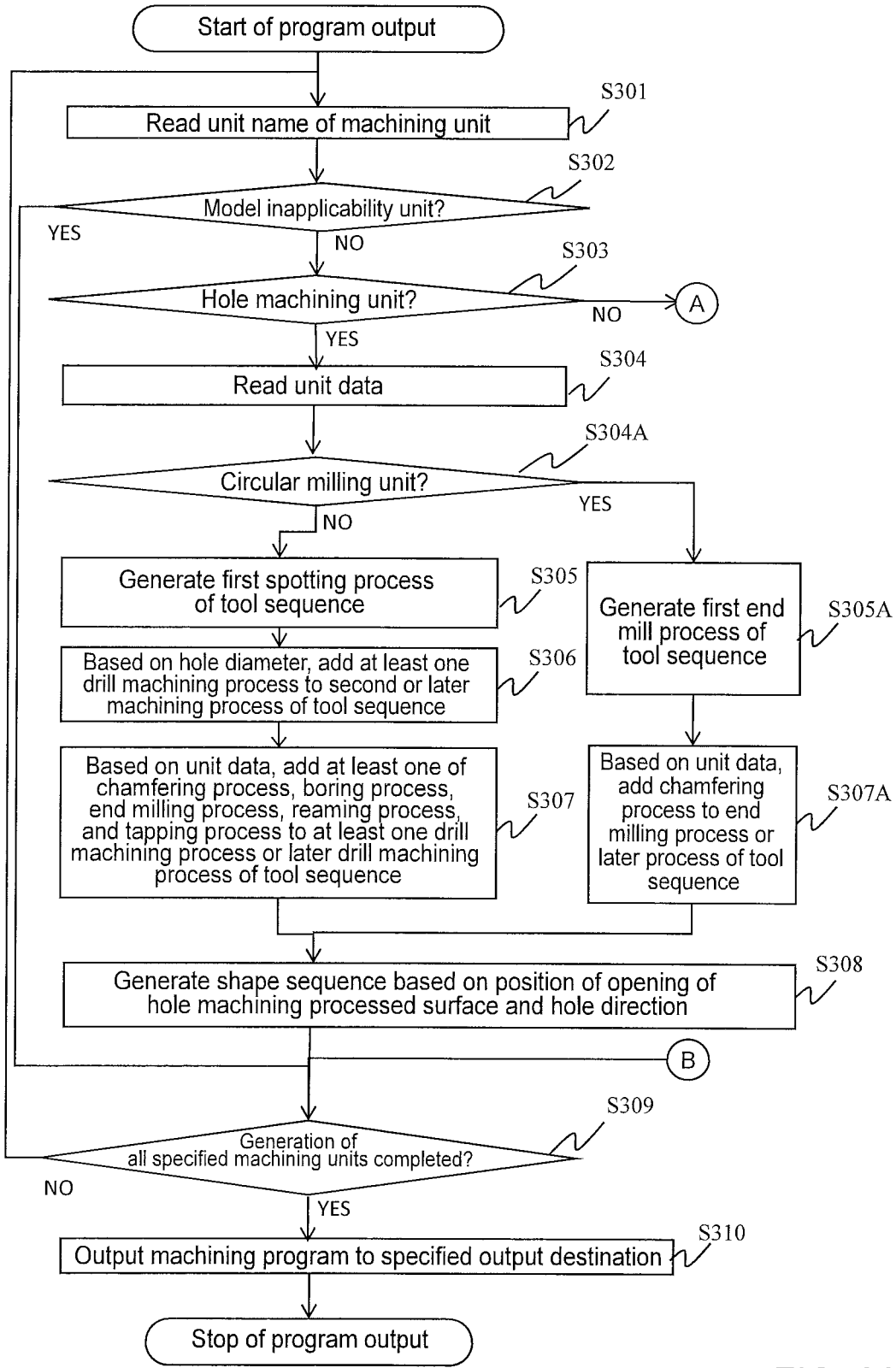
FIG. 23 is a flowchart of processing of automatically generating a machining program.

FIG. 23 is a flowchart of processing of automatically generating the machining program 157 associated with step S41. First, the processor 210 (151) reads the unit name of the machining unit from the unit data of the machining unit (step S301). When this unit name is a unit name indicating model inapplicability (Yes at step S302), the machining unit cannot be automatically generated, and the procedure proceeds to step S309. When the unit name is not a unit name indicating model inapplicability (No at step S302), the processor 210 (151) determines whether the unit name is a unit name indicating hole machining (step S303). Examples of a unit name indicating hole machining include drilling unit, hole-with-counterbore machining unit, circular milling unit, boring unit, stepped boring unit, tapping unit, hole-with-counterbore tapping unit, and reaming unit.

When the determination is that the unit name is a unit name indicating hole machining (Yes at step S303), the processor 210 (151) reads, from the unit data of the machining unit of hole machining, data of the hole diameter, the hole depth, and the chamfering (step S304). When the machining unit is a hole-with-counterbore machining unit, a stepped boring unit, a hole-with-counterbore tapping unit, or a stepped circular milling unit, the processor 210 (151) reads data of the hole diameters and the hole depths of the larger diameter hole and the smaller diameter hole. Then, the processor 210 (151) determines whether the unit name is a circular milling unit (step S304A). When the unit name is not a circular milling unit (No at step S304A), the processor 210 (151) generates a first spotting process of the tool sequence (step S305). In generating the first spotting process, the processor 210 (151) determines a nominal diameter optimal for a spot tool. The nominal diameter preferably has a value obtained by adding the chamfering value to the value of the hole diameter. It is to be noted, however, that when the hole is such a hole that the hole depth is smaller than the hole diameter, a value that is equal to or less than the hole depth and that is as large as possible is determined as the nominal diameter. The processor 210 (151) selects, from the tool information 158, a spot tool having the determined nominal diameter. The machining-program generation program 221 (156) has a table of the machining speed and the feed speed in the spotting process such that the machining speed and the feed speed are correlated with the material of the spot tool stored in the tool information 158 and the material of the workpiece stored in the material information 161. By referring to the table, the processor 210 (151) automatically determines the machining speed and the feed speed in the spotting process. Then, the processor 210 (151) generates, as the first machining process of the tool sequence, identification information for identifying the selected spot tool and a spotting process in which the selected nominal diameter and the determined machining speed and feed speed are set.

Next, the processor 210 (151) adds at least one drill machining process to the second or later machining process of the tool sequence based on the hole diameter (step S306). Specifically, the processor 210 (151) automatically determines the number of the drill machining process as 1, 2, or 3 by determining which of three ranges determined in advance the hole diameter belongs to. Upon determination of the number of the drill machining process, the processor 210 (151) determines the drill nominal diameter in each drill machining process so that the amount of machining becomes approximately uniform. The processor 210 (151) selects, from the tool information 158, a drill having the determined nominal diameter. The machining-program generation program 221 (156) also has a table of the machining speed and the feed speed in the drill machining process such that the machining speed and the feed speed are correlated with the material of the drill stored in the tool information 158 and the material of the workpiece stored in the material information 161. By referring to the table, the processor 210 (151) automatically determines the machining speed and the feed speed in each drill machining process. Then, the processor 210 (151) generates at least one drill machining process including: identification information for identifying the selected drill; and the determined nominal diameter, machining speed, and feed speed. Then, the processor 210 (151) adds the at least one drill machining process to the tool sequence.

Next, the processor 210 (151) adds the machining process to the at least one drill machining process or later drill machining process based on the unit data of the machining unit (step S307). Specifically, when a chamfering cannot be made using the spot tool, as when the hole is such a hole that the hole depth is smaller than the hole diameter, the processor 210 (151) selects, from the tool information 158, a chamfering tool that does not interfere with other machining processed surfaces. The machining-program generation program 221 (156) has a table of the machining speed and the feed speed in a chamfering process such that the machining speed and the feed speed are correlated with the material of the chamfering tool stored in the tool information 158 and the material of the workpiece stored in the material information 161. By referring to the table, the processor 210 (151) automatically determines the machining speed and the feed speed in the chamfering process. The processor 210 (151) generates a chamfer machining process in which the following are set: tool identification information for identifying the selected chamfering tool; the nominal diameter of the chamfering tool; the machining amount corresponding to the chamfering amount in the unit data of the machining unit; and the determined machining speed and feed speed. Then, the processor 210 (151) adds the chamfer machining process to the tool sequence.

When the unit name of the machining unit is hole-with-counterbore machining unit, hole-with-counterbore tapping unit, or stepped boring unit, the processor 210 (151) selects, from the tool information 158, an end mill for machining the diameter of a hole that is one of two holes having different diameters and that has a larger diameter. The machining-program generation program 221 (156) has a table of the machining speed and the feed speed in an end milling process such that the machining speed and the feed speed are correlated with the material of the end mill stored in the tool information 158 and the material of the workpiece stored in the material information 161. By referring to the table, the processor 210 (151) automatically determines the machining speed and the feed speed in the end milling process. Further, the processor 210 (151) calculates, by solving a mathematical formula determined in advance, a cutting amount per machining based on the nominal diameter of the selected end mill. The processor 210 (151) generates an end milling process in which the following are set: tool identification information for identifying the selected end mill; the nominal diameter of the end mill; the calculated cutting amount per machining; the determined machining speed and feed speed; and the plane roughness stored as machining unit extra data. Then, the processor 210 (151) adds the end milling process to the tool sequence.

When the unit name of the machining unit is boring unit or stepped boring unit, the processor 210 (151) selects, from the tool information 158, a number of boring tools (at least one boring tool) that is based on the wall plane roughness defined in the unit header of the boring unit. The machining-program generation program 221 (156) has a table of the machining speed and the feed speed in the boring process such that the machining speed and the feed speed are correlated with the material of the boring tool stored in the tool information 158 and the material of the workpiece stored in the material information 161. By referring to the table, the processor 210 (151) automatically determines the machining speed and the feed speed in the boring process for the at least one boring tool. The processor 210 (151) obtains, from the tool information 158, a cutting amount per machining determined in advance for the at least one boring tool. The processor 210 (151) generates at least one boring process in which the following are set: identification information for identifying the selected at least one boring tool; the nominal diameter of the selected at least one boring tool; the obtained cutting amount per machining; the determined machining speed and feed speed; and the plane roughness stored as machining unit extra data. Then, the processor 210 (151) adds the at least one boring process to the tool sequence. It is to be noted that the end milling process may be added before the boring process.

When the unit name of the machining unit is reaming unit, the processor 210 (151) adds a machining process in accordance with the previous process defined in the unit header of the reaming unit. When the previous process is specified as drill, the processor 210 (151) adds the drill machining process, as described above, and then selects, from the tool information 158, a reaming tool having a nominal diameter smaller than the hole diameter. The machining-program generation program 221 (156) has a table of the machining speed and the feed speed in the reaming process such that the machining speed and the feed speed are correlated with the material of the reaming tool stored in the tool information 158 and the material of the workpiece stored in the material information 161. By referring to the table, the processor 210 (151) automatically determines the machining speed and the feed speed in the reaming process. The processor 210 (151) obtains, from the tool information 158, a cutting amount per machining determined in advance for the reaming tool. The processor 210 (151) generates a reaming process in which the following are set: identification information for identifying the selected reaming tool; the nominal diameter of the selected reaming tool; the obtained cutting amount per machining; the determined machining speed and feed speed; and the plane roughness stored as machining unit extra data. Then, the processor 210 (151) adds the reaming process to the tool sequence. The case where the previous process is specified as boring or end mill is different from the case where the previous process is specified as drill in that the boring process or the end milling process is added between the at least one drill machining process and the reaming process in the above-described manner.

When the unit name of the machining unit is tapping unit, the processor 210 (151) selects, from the tool information 158, a tap tool that matches the outer diameter (the diameter of the valley of the internal thread), the pitch, and the thread depth of the external thread defined in the unit data of the tapping unit. The machining-program generation program 221 (156) has a table of the machining speed and the feed speed in the tapping process such that the machining speed and the feed speed are correlated with the material of the tap tool stored in the tool information 158 and the material of the workpiece stored in the material information 161. By referring to the table, the processor 210 (151) automatically determines the machining speed and the feed speed in the tapping process. The processor 210 (151) generates a tapping process in which the following are set: identification information for identifying the selected tap tool; the nominal diameter of the selected tap tool; the pitch (=cutting amount per machining) defined in the unit data; the determined machining speed and feed speed; and the plane roughness stored as machining unit extra data. Then, the processor 210 (151) adds the tapping process to the tool sequence.

When the unit name is circular milling unit (Yes at step S304A), the processor 210 (151) generates a first end milling process of the tool sequence (step S305A). In generating the first end milling process, the processor 210 (151) determines, based on the hole diameter, a nominal diameter optimal for an end mill. Then, the processor 210 (151) selects an end mill from the tool information 158. The machining-program generation program 221 (156) has a table of the machining speed and the feed speed in the end milling process such that the machining speed and the feed speed are correlated with the material of the end mill stored in the tool information 158 and the material of the workpiece stored in the material information 161. By referring to the table, the processor 210 (151) automatically determines the machining speed and the feed speed in the end milling process. Further, the processor 210 (151) calculates, by solving a mathematical formula determined in advance, a cutting amount per machining based on the nominal diameter of the selected end mill. The processor 210 (151) generates an end milling process in which the following are set: tool identification information for identifying the selected end mill; the nominal diameter of the end mill; the calculated cutting amount per machining; the determined machining speed and feed speed; and the plane roughness stored as machining unit extra data. Then, the processor 210 (151) adds the end milling process to the tool sequence.

Next, when chamfering is set in the unit data of the machining unit, at step S307A, the processor 210 (151) selects, from the tool information 158, a chamfering tool does not interfere with other machining processed surfaces. The machining-program generation program 221 (156) has a table of the machining speed and the feed speed in the chamfering process such that the machining speed and the feed speed are correlated with the material of the chamfering tool stored in the tool information 158 and the material of the workpiece stored in the material information 161. By referring to the table, the processor 210 (151) automatically determines the machining speed and the feed speed in the chamfering process. The processor 210 (151) generates a chamfer machining process in which the following are set: tool identification information for identifying the selected chamfering tool; the nominal diameter of the chamfering tool; a cutting amount corresponding to the chamfering in the unit data of the machining unit; and the determined machining speed and feed speed. Then, the processor 210 (151) adds the chamfer machining process to the tool sequence.

After step S307 or step S307A, the processor 210 (151) generates a shape sequence based on the hole opening center position and the hole direction that are extracted at step S219 or S220 and stored as machining unit extra data (step S308).

Figure 24:
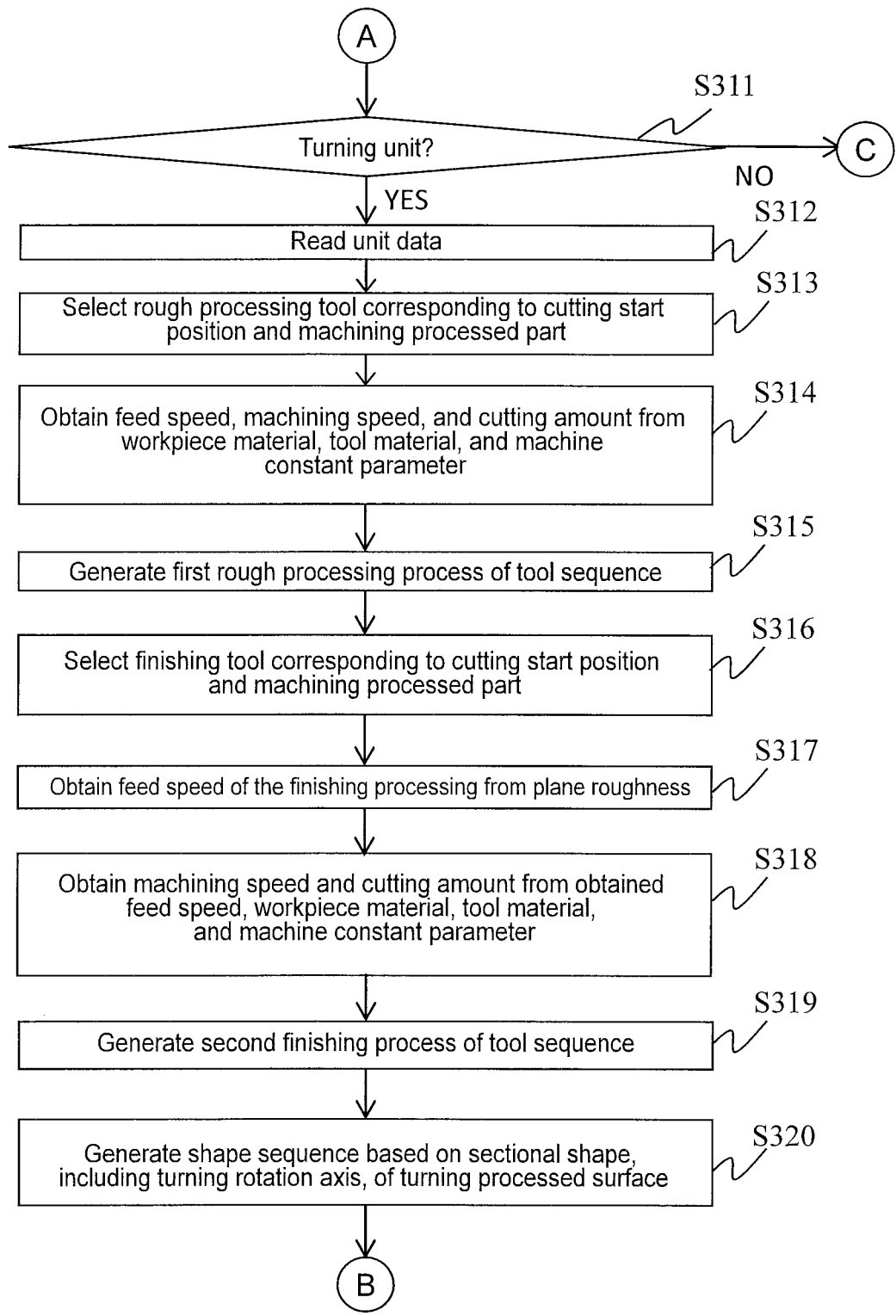
FIG. 24 is a flowchart of the processing of automatically generating the machining program.

When at step S303 the determination is that the unit name is different from a unit name indicating hole machining (No at step S303), the processor 210 (151), at step S311 in FIG. 24, determines whether the unit name is a unit name indicating turning (step S311). Examples of a unit name indicating turning include bar machining unit and facing unit. When the determination is that the unit name is a unit name indicating turning (Yes at step S311), the processor 210 (151) reads the machining processed part name of the unit data. Then, the processor 210 (151) reads, from the unit data of the machining unit of turning, the cutting start position in the workpiece coordinate system and the dimensions of the finishing allowance in the X axis direction and the Z axis direction of the workpiece coordinate system (step S312).

Next, the processor 210 (151) selects, from the tool information 158, a rough processing tool corresponding to the cutting start position and the machining processed part (step S313). For example, when the machining processed part is an inner diameter, an axial offset, a radial offset, and a cutting edge width that avoid interference with the workpiece W1 (workpiece) are obtained from the coordinates of the cutting start position. Then, a rough processing tool having the obtained axial offset, radial offset, and cutting edge width is selected. When the machining unit belongs to the first step, a rough processing tool having an indexing angle of 0 degrees is selected. Contrarily, when the machining unit belongs to the second step, a rough processing tool having an indexing angle of 180 degrees is selected. Further, a spindle rotation direction and a blade orientation effective for the rotation directions, determined in advance, of the first spindle 122 and the second spindle 123 are determined. In light of this, a rough processing tool having characteristics of the determined effective spindle rotation direction and characteristics of the determined blade orientation is selected.

Then, the processor 210 (151) obtains the feed speed, the machining speed, and the cutting amount of the rough processing from the material of the workpiece (the workpiece W1), the material of the tool, and the machine constant parameter stored as the machine constant data 162 (step S314). Specifically, the machining-program generation program 221 (156) has a table of the machining speed and the feed speed in the rough processing such that the machining speed and the feed speed are correlated with the tool material of stored in the tool information 158 and the material of the workpiece stored in the material information 161. By referring to the table, the processor 210 (151) is able to automatically obtain the machining speed Vc and the feed speed f from the workpiece material and the tool material. Then, the processor 210 (151) is able to calculate the cutting amount a in the rough processing by solving $a=(4500\times\eta\times HP)/(x\times f\times Vc)$, where Vc is the machining speed, f is the feed speed, x is the specific machining resistance of the workpiece stored as the material information 161, and $\eta$ and HP are the mechanical efficiency and the mechanical horsepower, respectively, of the machine tool 100 stored as the machine constant data 162. Details of the processing at step S314 are disclosed in JP1-246042A, filed by the Applicants.

After the end of step S314, the processor 210 (151) generates, as the first machining process of the tool sequence, a rough processing process in which the following are set (step S315): identification information for identifying the rough processing tool selected at step S313; the normal designation of the selected rough processing tool; and the machining speed, the feed speed, and the and cutting amount obtained at step S314. Next, by a method similar to the method at step S313, the processor 210 (151) selects, from the tool information 158, a finishing tool corresponding to the cutting start position and the machining processed part (step S316).

Next, by referring to the plane roughness stored as machining unit extra data, the processor 210 (151) obtains the feed speed of the finishing processing (step S317). The plane roughness stored as machining unit extra data, that is, the plane roughness set at a value from 1 to 9 on the plane roughness setting interface, corresponds to actual levels of plane roughness, μ(μm). The machining-program generation program 221 (156) stores a table showing a relationship between the 1 to 9 levels of plane roughness and μ. When a plane roughness is set for the turning processed surface, the processor 210 (151) refers to the value to obtain an actual level of plane roughness μ. When a plane roughness is not set, the processor 210 (151) refers to a default value to obtain an actual level of plane roughness μ. Then, the processor 210 (151) obtains the blade-edge curvature radius, R, of the selected finishing tool from the tool information 158. Then, using the obtained curvature radius R and the obtained plane roughness μ, the processor 210 (151) calculates the feed speed f of the finishing processing by solving a mathematical formula determined in advance.

Next, the processor 210 (151) obtains the machining speed and the cutting amount of the finishing processing from the obtained feed speed, the material of the workpiece, the material of the tool, and the machine constant parameter (step S318). Specifically, the machining-program generation program 221 (156) includes a table in which the machining speed in the finishing processing is correlated with the material of the tool stored in the tool information 158, the material of the workpiece stored in the material information 161, and the feed speed f of the finishing processing. By referring to the table, the processor 210 (151) is able to automatically obtain the machining speed Vc from the feed speed f of the finishing processing, the material of the workpiece, and the material of the tool. Then, the processor 210 (151) is able to calculate the cutting amount a in the rough processing by solving a=(4500×η×HP)/(x×f×Vc), where Vc is the machining speed, f is the feed speed, x is the specific machining resistance, η is the mechanical efficiency, and HP is the mechanical horsepower. Details of the processing at step S318 are disclosed in JP 1-246042A, filed by the Applicants.

After the end of step S318, the processor 210 (151) generates a finishing process in which the following are set: identification information for identifying the finishing tool selected at step S316; the normal designation of the selected rough processing tool; the feed speed obtained at step S317; and the machining speed and the cutting amount obtained at step S318. Then, the processor 210 (151) adds the finishing process to the tool sequence (step S319). After step S319, the processor 210 (151) generates a shape sequence based on a sectional shape, including the turning rotation axis (the rotation axis A3), of the turning processed surface extracted at step S101 and stored as machining unit extra data (step S320).

Figure 25:
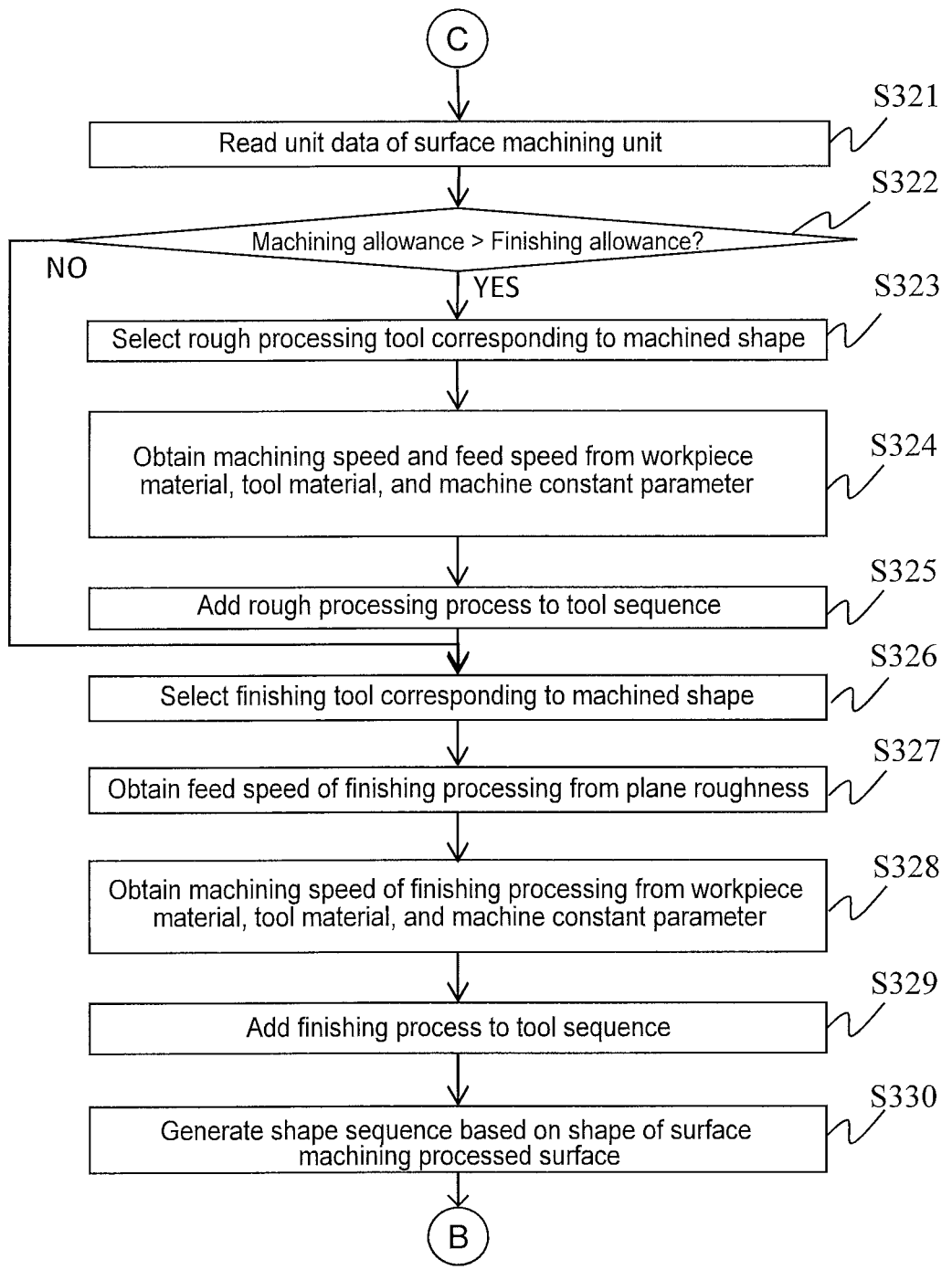
FIG. 25 is a flowchart of the processing of automatically generating the machining program.

When at step S311 the determination is that the unit name is different from a unit name indicating turning (No at step S311), the machining unit is regarded as a face machining unit. In FIG. 25, the processor 210 (151) reads, from the unit data of the machining unit of surface machining: the distance (depth) between the workpiece origin of the workpiece coordinate system and the surface machining processed surface; the amount of machining (machining allowance) relative to the surface machining processed surface; the finishing allowance; and the plane roughness of the surface machining processed surface (step S321). Next, the processor 210 (151) determines whether the machining allowance is greater than the finishing allowance (step S322). When the machining allowance is equal to or less than the finishing allowance (No at step S322), the procedure proceeds to step S326. When the machining allowance is greater than the finishing allowance (Yes at step S322), the procedure proceeds to step S323.

At step S323, the processor 210 (151) selects a rough processing tool corresponding to the machined shape. It is to be noted that the processor 210 (151) may select a rough processing tool that does not interfere with other machining processed surfaces. The machining-program generation program 221 (156) has a table of the machining speed and the feed speed in the rough processing process such that the machining speed and the feed speed are correlated with the material of the rough processing tool stored in the tool information 158 and the material of the workpiece stored in the material information 161. By referring to the table, the processor 210 (151) automatically determines the machining speed and the feed speed in the rough processing process (step S324). The processor 210 (151) determines the cutting amount based on a value obtained by subtracting the finishing allowance from the machining allowance or based on a maximum cutting amount determined in advance for the rough processing tool. Then, the processor 210 (151) calculates, from a machining pattern determined in advance, an approach position at which the machined shape is machined efficiently. Then, the processor 210 (151) generates a rough processing process that includes: identification information for identifying the selected rough processing tool; the nominal diameter of the rough processing tool; the machining pattern; the approach position; the determined cutting amount; and the machining speed and feed speed. Then, the processor 210 (151) adds the rough processing process to the tool sequence (step S325).

At step S326, by a method similar to the method at step S323, the processor 210 (151) selects a finishing tool corresponding to the machined shape. Next, by referring to the plane roughness stored as the unit data of the machining unit, the processor 210 (151) obtains the feed speed of the finishing processing (step S327). The machining-program generation program 221 (156) stores, in its table, a feed coefficient Kf, which corresponds to the plane roughness stored as unit data, that is, the plane roughness set at a value from 1 to 9 on the plane roughness setting interface. The processor 210 (151) obtains the feed coefficient Kf from the plane roughness stored as unit data of the machining unit. When the tool diameter, D, of the finishing tool is smaller than a predetermined threshold, the processor 210 (151) calculates the finishing feed speed, Ff1, in the radial direction by solving a predetermined equation based on the feed coefficient Kf, the tool diameter D, and the teeth count, Z, of the finishing tool. When the tool diameter D of the finishing tool is equal to or more than the predetermined threshold, the processor 210 (151) calculates the finishing feed speed Ff1 in the radial direction by solving a predetermined equation based on the feed coefficient Kf and the teeth count Z of the finishing tool. The finishing feed speed, Ff2, in the axial direction is calculated by multiplying the finishing feed speed Ff1 in the radial direction by a predetermined proportional coefficient.

Next, the processor 210 (151) obtains the machining speed of the finishing processing from the obtained feed speed, the material of the workpiece, the material of the tool, and the machine constant parameter (step S328). Specifically, the machining-program generation program 221 (156) includes a table in which the machining speed in the finishing processing is correlated with: the material of the tool stored in the tool information 158; the material of the workpiece stored in the material information 161; and the feed speed Ff1 or Ff2 of the finishing processing. By referring to the table, the processor 210 (151) is able to automatically obtain the machining speed Vc from the feed speed Ff1 or Ff2 of the finishing processing, the material of the workpiece, and the material of the tool. The processor 210 (151) determines the cutting amount based on the finishing allowance. Then, the processor 210 (151) calculates an approach position by a method similar to the method at step S325. Then, the processor 210 (151) a generates a finishing process that includes: identification information for identifying the selected finishing tool; the nominal diameter of the finishing tool; the machining pattern determined in advance; the approach position; and the determined cutting amount, machining speed, feed speed. Then, the processor 210 (151) adds the finishing process to the tool sequence (step S329). After step S329, the processor 210 (151) generates a shape sequence based on a shape of the surface machining processed surface extracted at step S104 and stored as machining unit extra data (step S330). The shape is as seen from a direction along a normal line of the surface machining processed surface.

Referring again to FIG. 23, after the end of steps S308, S320, and S330, or when the unit name is a unit name indicating model inapplicability (Yes at step S302), then the processor 210 (151) determines whether all the machining units are prepared (step S309). When the determination is that not all the machining units are prepared yet (No at step S309), the procedure returns to step S301. When the determination is that all the machining units are prepared (Yes at step S309), the processor 210 (151) prepares other units including a common unit and a basic coordinate unit, and outputs the machining program 157 to the output destination specified at step S40 (step S310).

Modifications of Tool Data Screen

A basic description of the display screen 30 has been provided above. It is to be noted that the above-described names of the machining units have been provided for exemplary purposes, and that those machining units having identical machining content may have different names. It is also to be noted that the above-described machining method for generating a program has been provided for describing an example in which a product shape is a typical shape; it is also possible to deal with a more complex shape by setting an additional shape recognition and an additional machining unit. In one example, such a method may be included that performs threading (thread grinding) by turning and/or machining of a face of a complex shape by bar machining. Further, the above-described embodiment is regarding a case where when a surface attribute is set in hole machining, a circular milling unit is selected. When, however, a hole machining attribute in boring and/or tapping is not set and when a plane roughness attribute is set, the plane roughness attribute may be disregarded. Further, when the machining-program generation program 221 (156) ends before the machining program 157 is generated; when the content of work under way is stored and ended; and when the machining-program generation program 221 (156) is activated again, then the setting screen of the work may be displayed again. Also, the ratio of settings, among all the settings, whose work has ended may be additionally displayed.

In the flowcharts illustrated in FIGS. 19 to 25, the order in which the steps are performed may be changed insofar as the result of the steps remains changed. Also, in FIG. 20, steps S33 to 34 and steps S36 to 40 may be omitted. In this case, the machining program 157 is output based on data set at the time of completion of the machining setting step 414.

Operations and Effects of this Embodiment

In this embodiment, in a first aspect of the present disclosure, a method for displaying a tool load of a machine tool, the machine tool 100, and the machining-program generation program 221 (156) includes: displaying a plurality of steps (411 to 415) in which setting-information based on which the machine tool (100) is configured to be controlled to machine a workpiece to make a product; selecting, from the plurality of steps (411 to 415), a setting step in which the setting-information is input; displaying the setting interface 300 via which the setting-information corresponding to the setting step (selected information) is set; determining whether inputting the selected information has been completed via the setting interface (300); and displaying the information (36) indicating that the setting in the setting step is completed, when inputting the selected information is determined to have been set.

According to a second aspect of the present disclosure, in the input assistance method according to the first aspect, tool information about a tool attached to the machine tool is obtained. A machining program is automatically generated based on the tool information that is obtained and based on the setting-information. The machining program is for controlling the machine tool to machine the workpiece so as to make the product.

According to a third aspect of the present disclosure, in the input assistance method according to the first aspect or the second aspect, the plurality of steps include: a first step in which a shape of the product is input; a second step in which a shape of the workpiece and a material of the workpiece are input; a third step in which information regarding how to contain an entirety of the product in the workpiece is input; and a fourth step in which a part of the workpiece which is to be held by the machine tool is set.

According to a fourth aspect of the present disclosure, in the input assistance method according to the third aspect, when machining of the workpiece includes at least one of a hole machining and a threading, at least one of characteristic is set in the fourth step, the at least one characteristic including at least one of: a characteristic of a hole generated by the hole machining; and a characteristic of a thread ridge of a thread generated by the threading.

According to a fifth aspect of the present disclosure, in the input assistance method according to the third aspect or the fourth aspect, a plane roughness of a surface of the product is set in the fourth step.

According to a sixth aspect of the present disclosure, in the input assistance method according to any one of the third to fifth aspects, the plurality of steps include only the first step, the second step, the third step, and the fourth step.

According to a seventh aspect of the present disclosure, in the input assistance method according to any one of the first to sixth aspects, the setting steps are automatically selected based on an order determined in advance.

According to an eighth aspect of the present disclosure, in the input assistance method according to the seventh aspect, a step transition interface to be manipulated to make a transition from the setting step to a next step is displayed. In the input assistance method, when the step transition interface is manipulated, the transition to the next step is not made when all of the setting-information is not determined to have been set.

According to a ninth aspect of the present disclosure, in the input assistance method according to any one of the first to eighth aspects, if the setting-information corresponding to the setting step has not been set, the setting interface is automatically displayed.

According to a tenth aspect of the present disclosure, in the input assistance method according to the first aspect or the ninth aspect, a setting status of the setting-information corresponding to the setting step is displayed.

According to an eleventh aspect of the present disclosure, in the input assistance method according to any one of the first to tenth aspects, a computer graphics image is displayed, the computer graphics image showing at least one of: a shape of the workpiece corresponding to the setting step; and a shape of the product corresponding to the setting step is displayed.

According to a twelfth aspect of the present disclosure, in the input assistance method according to the eleventh aspect incorporating the second aspect, a surface of the workpiece that is not machinable by the machining program that is automatically generated is displayed in the computer graphics image.

According to a thirteenth aspect of the present disclosure, in the input assistance method according to any one of the first to twelfth aspects, a call interface via which the setting interface is called is displayed without displaying a call interface via which another interface than the setting interface is called, another selected information corresponding to another step than the setting step being set via the another interface.

A machine tool according to a fourteenth aspect of the present disclosure includes a display and a processor. The display is configured to display: a plurality of steps in which setting-information based on which the machine tool is configured to be controlled to machine a workpiece so as to make a product is input; and a setting interface via which a selected information corresponding to a setting step is input, the setting step being selected from the plurality of steps. The processor is configured to determine whether inputting the selected information has been completed. When inputting the selected information is determined to have been completed, the display is configured to display information indicating that inputting the selected information is determined to have been completed.

According to a fifteenth aspect of the present disclosure, in the machine tool according to the fourteenth aspect, the processor is configured to obtain tool information about a tool attached to the machine tool. The processor is configured to automatically generate a machining program based on the tool information that is obtained and based on the setting-information, after the setting-information have been input. The machining program is for controlling the machine tool to machine the workpiece so as to make the product, after the setting-information have been input.

According to a sixteenth aspect of the present disclosure, in the machine tool according to the fourteenth aspect or the fifteenth aspect, the plurality of steps include: a first step in which a shape of the product is input; a second step in which a shape of the workpiece and a material of the workpiece are input; a third step in which information regarding how to contain an entirety of the product in the workpiece is input; and a fourth step in which a part of the workpiece which is to be held by the machine tool is input.

According to a seventeenth aspect of the present disclosure, in the machine tool according to the sixteenth aspect, when machining of the workpiece includes at least one of a hole machining and a threading, at least one characteristic is set in the fourth step, the at least one characteristic including at least one of: a characteristic of a hole generated by the hole machining; and a characteristic of a thread ridge of a thread generated by the threading.

According to an eighteenth aspect of the present disclosure, in the machine tool according to the sixteenth aspect or the seventeenth aspect, a plane roughness of a surface of the product is set in the fourth step.

According to a nineteenth aspect of the present disclosure, in the machine tool according to any one of the sixteenth to eighteenth aspects, the plurality of steps include only the first step, the second step, the third step, and the fourth step.

According to a twentieth aspect of the present disclosure, in the machine tool according to any one of the fourteenth to nineteenth aspects, the processor automatically selects the setting step based on an order determined in advance.

According to a twenty-first aspect of the present disclosure, in the machine tool according to the twentieth aspect, the display is configured to display a step transition interface to be manipulated to make a transition from the setting step to a next step. In the machine tool, the transition to the next step is not made when the all of the setting-information corresponding to the setting step is determined to have been set.

According to a twenty-second aspect of the present disclosure, in the machine tool according to any one of the fourteenth to twenty-first aspects, if the setting-information corresponding to the setting step has not been set, the display automatically displays the setting interface.

According to a twenty-third aspect of the present disclosure, in the machine tool according to the fourteenth aspect or the twenty-second aspect, the display is configured to display a setting status of the setting-information corresponding to the setting step.

According to a twenty-fourth aspect of the present disclosure, in the machine tool according to any one of the fourteenth to twenty-third aspects, the display is configured to display a computer graphics image showing at least one of: a shape of the workpiece corresponding to the setting step; and a shape of the product corresponding to the setting step.

According to a twenty-fifth aspect of the present disclosure, in the machine tool according to the twenty-fourth aspect incorporating the fifteenth aspect, the display is configured to display, in the computer graphics image, a surface of the workpiece that is not machinable by the machining program that is automatically generated.

In a twenty-sixth aspect according to the present disclosure, in the machine tool according to any one of the fourteenth to twenty-fifth aspects, the display displays a call interface for calling the setting interface. In the machine tool, an interface for calling an interface for setting setting-information corresponding to a step other than the setting step is not displayed.

According to a twenty-seventh aspect of the present disclosure, a program for a machine tool performs processing includes displaying a plurality of steps in which setting-information based on which a machine tool is configured to be controlled to machine a workpiece so as to make a product is input; selecting, among the plurality of steps, a setting step in which a selected information is to be input, the selected information of the plurality of steps constituting the setting-information; displaying a setting interface via which the selected information is input; determining whether inputting the selected information has been completed; and displaying information indicating that inputting the selected information has been completed, when inputting the selected information is determined to have been completed.

According to a twenty-eighth aspect of the present disclosure, in the program according to the first aspect, tool information about a tool attached to the machine tool is obtained. A machining program is automatically generated based on the tool information that is obtained and based on the setting-information. The machining program is for controlling the machine tool to machine the workpiece so as to make the product.

According to a twenty-ninth aspect of the present disclosure, in the program according to the twenty-seventh aspect or the twenty-eighth aspect, the plurality of steps include: a first step in which a shape of the product is set; a second step in which a shape of the workpiece and a material of the workpiece are set; a third step in which information for identifying a part of the workpiece which the product occupies is set; and a fourth step in which a part of the workpiece which is to be held by the machine tool and a machining direction in which the workpiece is machined are set.

According to a thirtieth aspect of the present disclosure, in the program according to the twenty-ninth aspect, when machining of the workpiece includes at least one of a hole machining and a threading, at least one of characteristic is set in the fourth step, the at least one characteristic including at least one of: a characteristic of a hole generated by the hole machining; and a characteristic of a thread ridge of a thread generated by the threading.

According to a thirty-first aspect of the present disclosure, in the program according to the twenty-ninth aspect or the thirtieth aspect, a plane roughness of a surface of the product is set in the fourth step.

According to a thirty-second aspect of the present disclosure, in the program according to any one of the twenty-ninth to thirty-first aspects, the plurality of steps include only the first step, the second step, the third step, and the fourth step.

According to a thirty-third aspect of the present disclosure, in the program according to any one of the twenty-seventh to thirty-second aspects, the setting step is automatically selected based on an order determined in advance.

According to a thirty-fourth aspect of the present disclosure, in the program according to the thirty-third aspect, a step transition interface to be manipulated to make a transition from the setting step to a next step is displayed. In the input assistance method, when the step transition interface is manipulated, the transition to the next step is not made when inputting the selected information has not been completed.

According to a thirty-fifth aspect of the present disclosure, in the program according to any one of the twenty-seventh to thirty-fourth aspects, if the setting-information corresponding to the setting step has not been set, the setting interface is automatically displayed.

According to a thirty-sixth aspect of the present disclosure, in the program according to the twenty-seventh aspect or the thirty-fifth aspect, a setting status of the selected information is displayed.

According to a thirty-seventh aspect of the present disclosure, in the program according to any one of the twenty-seventh to thirty-sixth aspects, a computer graphics image is displayed, the computer graphics image showing at least one of: a shape of the workpiece corresponding to the setting step; and a shape of the product corresponding to the setting step is displayed.

According to a thirty-eighth aspect of the present disclosure, in the program according to the thirty-seventh aspect incorporating the twenty-eighth aspect, a surface of the workpiece that is not machinable by the machining program that is automatically generated is displayed in the computer graphics image.

According to a thirty-ninth aspect of the present disclosure, in the program according to any one of the twenty-seventh to thirty-eighth aspects, a call interface via which the setting interface is called is displayed without displaying an call interface via which another interface than the setting interface is called, another selected information corresponding to another step than the setting step being set via the another interface.

The input assistance method according to the first aspect for a machine tool, the machine tool according to the fourteenth aspect, and the program according to the twenty-seventh aspect for a machine tool ensure that a user is notified of progress of work involved with machining program preparation.

The second aspect, the fifteenth aspect, and the twenty-eighth aspect ensure that a machining program is automatically generated, reducing the user's burden of performing coding.

The third aspect, the sixteenth aspect, and the twenty-ninth aspect eliminate the need for setting details of motions that a tool makes to obtain a shape of a product. This further reduces the user's burden of generating a machining program.

Generally, in three-dimensional shape data describing a shape of a product, a shape of a hole of the product is rarely specified in detail. In this respect, the fourth aspect, the seventeenth aspect, and the thirtieth aspect ensure that the user is able to set a hole machining accurately by referring to such three-dimensional shape data.

In three-dimensional shape data describing a shape of a product, the product cannot be specified in terms of plane roughness. In this respect, the fifth aspect, the eighteenth aspect, and the thirty-first aspect ensure that the user is able to set a surface machining accurately.

In the sixth aspect, the nineteenth aspect, and the thirty-second aspect, there are only four steps, the above-described first to fourth steps, that should be set. This further reduces the user's burden.

In the seventh aspect, the twentieth aspect, and the thirty-third aspect, by setting an order in advance, setting-information is set such that setting-information that should be set in advance in each of a plurality of steps is set. This eliminates such an inefficient setting that during a setting of a step, the setting is switched to a setting of another step, and the setting of the another step is performed previously.

The eighth aspect, the twenty-first aspect, and the thirty-fourth aspect minimizes omission of a setting in each of the setting steps.

The ninth aspect, the twenty-second aspect, and the thirty-fifth aspect ensure that after transition to a setting step, it is not necessary to make a manipulation to activate the setting interface. This further improves user's convenience.

The tenth aspect, the twenty-third aspect, and the thirty-sixth aspect ensure that the user is able to refer to a setting status. This further minimizes omission of a setting.

The eleventh aspect, the twenty-fourth aspect, and the thirty-seventh aspect ensure that the user is able to check, in the form of computer graphics, a shape of a workpiece, a shape of a product, and a shape of a part to be cut off the workpiece. This further improves user's convenience. The above aspects also ensure that when hole characteristics, thread ridge characteristics, and plane roughness of holes and surfaces are set, three-dimensional images are used. This further improves user's convenience.

The twelfth aspect, the twenty-fifth aspect, and the thirty-eighth aspect ensure that the user is able to refer to a three-dimensional image to check whether there is a portion to which a machining program cannot be generated automatically; or, when such portion exists, check the portion. This further improves user's convenience.

The thirteenth aspect, the twenty-sixth aspect, and the thirty-ninth aspect ensure that after a setting step has been set, a setting interface is called to modify the content of the setting that has been made. The above aspects also ensure that an interface for calling an interface for setting setting-information corresponding to a step other than a setting step is not displayed. This prevents the user from making a mal-manipulation.

The technique disclosed in the present application ensures that when, for example, a user inputs information necessary for machining a product, the user is notified of input progress.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:

1. An input assistance method for a machine tool, comprising:
    displaying a plurality of steps simultaneously on a display screen in which setting-information based on which the machine tool is configured to be controlled to machine a workpiece so as to make a product is input, the plurality of steps comprising:
        a first step in which a shape of the product is input;
        a second step in which a shape of the workpiece and a material of the workpiece are input;
        a third step in which information regarding how to contain an entirety of the product in the workpiece is input; and
        a fourth step in which a holding portion of the workpiece which is to be held by the machine tool is input;
    selecting, among the plurality of steps, a setting step in which a selected information is to be input, the selected information of the plurality of steps constituting the setting-information;
    displaying a setting interface on the display screen via which the selected information is input;
    determining whether inputting the selected information has been completed;
    displaying step status information on the display screen with the display of the plurality of steps, the step status information indicating that inputting the selected information has been completed when inputting the selected information is determined to have been completed; and
    displaying graphical user interface parts arranged at respective locations on the display screen with the step status information and the plurality of steps, the respective locations being substantially fixed regardless of which of the plurality of steps is selected as the setting step, the graphical user interface parts selectively representing a call interface via which the setting interface is called without representing a call interface via which another setting interface than the setting interface is called, another selected information corresponding to another step than the setting step being set via the another setting interface.

2. The input assistance method according to claim 1, wherein a cutting direction in which the workpiece is to be cut is input in the fourth step.

3. The input assistance method according to claim 1, further comprising:
    obtaining tool information about a tool attached to the machine tool; and
    generating, based on the tool information that is obtained and based on the setting-information, a machining program for controlling the machine tool to machine the workpiece so as to make the product, after the setting-information have been input.

4. The input assistance method according to claim 1, wherein when machining of the workpiece comprises at least one of a hole machining and a threading, at least one characteristic is input in the fourth step, the at least one characteristic including at least one of:
    a characteristic of a hole generated by the hole machining; and
    a characteristic of a thread ridge of a thread generated by the threading.

5. The input assistance method according to claim 1, wherein a plane roughness of a surface of the product is set in the fourth step.

6. The input assistance method according to claim 1, wherein the plurality of steps comprise only the first step, the second step, the third step, and the fourth step.

7. The input assistance method according to claim 1, wherein the setting step is automatically selected based on an order determined in advance.

8. The input assistance method according to claim 7, further comprising:
    displaying a step transition interface to be manipulated to make a transition from the setting step to a next step,
    wherein when the step transition interface is manipulated, the transition to the next step is not made when the inputting the selected information has not been completed.

9. The input assistance method according to claim 1, wherein if the selected information has not been input, the setting interface is automatically displayed.

10. The input assistance method according to claim 1, further comprising:
    displaying a setting status of the selected information.

11. The input assistance method according to claim 1, further comprising:
    displaying a computer graphics image showing at least one of:

a shape of the workpiece corresponding to the setting step; and
a shape of the product corresponding to the setting step.

12. The input assistance method according to claim 3, further comprising:
displaying a computer graphics image showing at least one of:
a shape of the workpiece corresponding to the setting step; and
a shape of the product corresponding to the setting step; and
displaying, in the computer graphics image, a surface of the workpiece that is not machinable by the machining program that is automatically generated.

13. The input assistance method according to claim 2, further comprising:
obtaining tool information about a tool attached to the machine tool; and
generating, based on the tool information that is obtained and based on the setting-information, a machining program for controlling the machine tool to machine the workpiece so as to make the product, after the setting-information have been input.

14. The input assistance method according to claim 2, when machining of the workpiece comprises at least one of a hole machining and a threading, at least one characteristic is input in the fourth step, the at least one characteristic including at least one of:
a characteristic of a hole generated by the hole machining; and
a characteristic of a thread ridge of a thread generated by the threading.

15. The input assistance method according to claim 1,
wherein the displaying of the information on the display screen with the display of the plurality of steps includes displaying of the information on the display screen for each of the plurality of steps showing status of completion of input of the selected information for each of the plurality of steps, and
wherein the information includes:
a first indicator indicating that inputting of the selected information has been completed when inputting the selected information is determined to have been completed; and
a second indicator indicating that inputting of the selected information has not been completed when inputting the selected information is determined to have not been completed, the second indicator being different from the first indicator.

16. A machine tool comprising:
a display configured to display:
a plurality of steps simultaneously on a display screen in which setting-information based on which the machine tool is configured to be controlled to machine a workpiece so as to make a product is input; and
a setting interface on the display screen via which a selected information corresponding to a setting step is to be input, the setting step being selected from the plurality of steps;
a processor configured to determine whether inputting the selected information has been completed;
the display being configured to display step status information on the display screen with the display of the plurality of steps, the step status information indicating that inputting the selected information has been completed when inputting the selected information is determined to have been completed; and
the display being configured to display graphical user interface parts arranged at respective locations on the display screen with the step status information and the plurality of steps, the respective locations being substantially fixed regardless of which of the plurality of steps is selected as the setting step, the graphical user interface parts selectively representing a call interface via which the setting interface is called without representing a call interface via which another setting interface than the setting interface is called, another selected information corresponding to another step than the setting step being set via the another setting interface.

17. The machine tool according to claim 16,
wherein the display is configured to display the information on the display screen for each of the plurality of steps showing status of completion of input of the selected information for each of the plurality of steps, and
wherein the information includes:
a first indicator indicating that inputting of the selected information has been completed when inputting the selected information is determined to have been completed; and
a second indicator indicating that inputting of the selected information has not been completed when inputting the selected information is determined to have not been completed, the second indicator being different from the first indicator.

18. The machine tool according to claim 16, wherein the plurality of steps comprises:
a first step in which a shape of the product is input;
a second step in which a shape of the workpiece and a material of the workpiece are input;
a third step in which information regarding how to contain an entirety of the product in the workpiece is input; and
a fourth step in which a holding portion of the workpiece which is to be held by the machine tool is input.

19. The machine tool according to claim 18, wherein a cutting direction in which the workpiece is to be cut is input in the fourth step.

20. A non-transitory computer-readable storage medium storing a program for causing a computer to execute processing comprising:
displaying a plurality of steps simultaneously on a display screen in which setting-information based on which a machine tool is configured to be controlled to machine a workpiece so as to make a product is input;
selecting, among the plurality of steps, a setting step in which a selected information is to be input, the selected information of the plurality of steps constituting the setting-information;
displaying a setting interface on the display screen via which the selected information is input;
determining whether inputting the selected information has been completed;
displaying step status information on the display screen with the display of the plurality of steps, the step status information indicating that inputting the selected information has been completed when inputting the selected information is determined to have been completed; and
displaying graphical user interface parts arranged at respective locations on the display screen with the step status information and the plurality of steps, the respective locations being substantially fixed regardless of which of the plurality of steps is selected as the setting step, the graphical user interface parts selectively representing a call interface via which the setting interface is called without representing a call interface via which another setting interface than the setting interface is called, another selected information corresponding to another step than the setting step being set via the another setting interface.

21. The non-transitory computer-readable storage medium according to claim 20,
wherein the plurality of steps comprises:
a first step in which a shape of the product is input;
a second step in which a shape of the workpiece and a material of the workpiece are input;
a third step in which information regarding how to contain an entirety of the product in the workpiece is input; and
a fourth step in which a holding portion of the workpiece which is to be held by the machine tool is input, and
wherein a cutting direction in which the workpiece is to be cut is input in the fourth step.

22. The non-transitory computer-readable storage medium according to claim 16,
wherein the displaying of the information on the display screen with the display of the plurality of steps includes displaying of the information on the display screen for each of the plurality of steps showing status of completion of input of the selected information for each of the plurality of steps, and
wherein the information includes:
a first indicator indicating that inputting of the selected information has been completed when inputting the selected information is determined to have been completed; and
a second indicator indicating that inputting of the selected information has not been completed when inputting the selected information is determined to have not been completed, the second indicator being different from the first indicator.

23. An input assistance method for a machine tool, the method comprising:
displaying a plurality of steps simultaneously on a display screen in which setting-information based on which the machine tool is configured to be controlled to machine a workpiece so as to make a product is input;
selecting, among the plurality of steps, a setting step in which a selected information is to be input, the selected information of the plurality of steps constituting the setting-information;
displaying a setting interface on the display screen via which the selected information is input;
determining whether inputting the selected information has been completed;
displaying step status information on the display screen with the display of the plurality of steps, the step status information indicating that inputting the selected information has been completed when inputting the selected information is determined to have been completed; and
displaying graphical user interface parts arranged at respective locations on the display screen with the step status information and the plurality of steps, the respective locations being substantially fixed regardless of which of the plurality of steps is selected as the setting step, the graphical user interface parts selectively representing a call interface via which the setting interface is called without representing a call interface via which another setting interface than the setting interface is called, another selected information corresponding to another step than the setting step being set via the another setting interface.

24. The input assistance method according to claim 23,
wherein the displaying of the information on the display screen with the display of the plurality of steps includes displaying of the information on the display screen for each of the plurality of steps showing status of completion of input of the selected information for each of the plurality of steps, and
wherein the information includes:
a first indicator indicating that inputting of the selected information has been completed when inputting the selected information is determined to have been completed; and
a second indicator indicating that inputting of the selected information has not been completed when inputting the selected information is determined to have not been completed, the second indicator being different from the first indicator.

* * * * *